(12) United States Patent
Ota et al.

(10) Patent No.: US 11,803,170 B2
(45) Date of Patent: *Oct. 31, 2023

(54) GRAPH DISPLAY DEVICE, GRAPH DISPLAY METHOD, AND RECORDING MEDIUM

(71) Applicant: OMRON Corporation, Kyoto (JP)

(72) Inventors: Yuya Ota, Kyotanabe (JP); Reiko Hattori, Kyoto (JP); Kosuke Tsuruta, Sakai (JP)

(73) Assignee: OMRON Corporation, Kyoto (JP)

( * ) Notice: Subject to any disclaimer, the term of this patent is extended or adjusted under 35 U.S.C. 154(b) by 449 days.

This patent is subject to a terminal disclaimer.

(21) Appl. No.: 17/269,996

(22) PCT Filed: Feb. 20, 2020

(86) PCT No.: PCT/JP2020/006720
§ 371 (c)(1),
(2) Date: Feb. 19, 2021

(87) PCT Pub. No.: WO2020/184130
PCT Pub. Date: Sep. 17, 2020

(65) Prior Publication Data
US 2021/0325840 A1   Oct. 21, 2021

(30) Foreign Application Priority Data
Mar. 13, 2019   (JP) ................................ 2019-045741

(51) Int. Cl.
*G05B 19/05* (2006.01)
(52) U.S. Cl.
CPC ......... *G05B 19/054* (2013.01); *G05B 19/056* (2013.01); *G05B 2219/1105* (2013.01)

(58) Field of Classification Search
CPC ........................ G05B 19/054; G05B 19/056
(Continued)

(56) References Cited

U.S. PATENT DOCUMENTS

| 6,173,208 | B1* | 1/2001 | Park | G05B 19/056 700/83 |
| 2014/0304551 | A1* | 10/2014 | Nakai | G06F 11/3692 714/38.1 |

(Continued)

FOREIGN PATENT DOCUMENTS

| JP | H11338521 | 12/1999 |
| JP | 2005520243 | 7/2005 |

(Continued)

OTHER PUBLICATIONS

"Search Report of Europe Counterpart Application", dated Oct. 20, 2022, p. 1-p. 10.

(Continued)

*Primary Examiner* — Jigneshkumar C Patel
(74) *Attorney, Agent, or Firm* — JCIPRNET

(57) ABSTRACT

A graph display device according to one aspect of the present invention generates a first directed graph, which contains a plurality of first nodes respectively representing device variables, edges representing the existence of a dependency relation, and a block representing a function, and a second directed graph, which contains a plurality of first nodes, edges, a block, and a plurality of second nodes arranged in the block and respectively representing function parameters. In response to an instruction from a user the display device switches between displaying the generated first directed graph and displaying the generated second directed graph.

11 Claims, 27 Drawing Sheets

(58) Field of Classification Search
USPC .......................................................... 700/17
See application file for complete search history.

(56) References Cited

U.S. PATENT DOCUMENTS

| | | | | |
|---|---|---|---|---|
| 2018/0314225 A1* | 11/2018 | Bisse | ..................... | G05B 19/05 |
| 2020/0012250 A1* | 1/2020 | Ogawa | ................. | G05B 19/045 |

FOREIGN PATENT DOCUMENTS

| | | |
|---|---|---|
| JP | 2008310390 | 12/2008 |
| JP | 2009163662 | 7/2009 |
| JP | 2013225251 | 10/2013 |
| JP | 2018206362 | 12/2018 |

OTHER PUBLICATIONS

"Office Action of Japan Counterpart Application" with English translation thereof, dated Jul. 12, 2022, p. 1-p. 8.
"International Search Report (Form PCT/ISA/210) of PCT/JP2020/006720," dated Apr. 21, 2020, with English translation thereof, pp. 1-4.
"Written Opinion of the International Searching Authority (Form PCT/ISA/237) of PCT/JP2020/006720," dated Apr. 21, 2020, with English translation thereof, pp. 1-8.

* cited by examiner

221

Program 0/Section 0

```
A1 := D1;
Inst_MyFB(Enable:=D3, Arg1:=A1, Arg2:=Var1);
D2 := Inst_MyFB.Out1;
Inst_StdFB2(Execute := D3, Input := Var2);
D4 := Inst_StdFB2.Out1;
```
— 2211

My_FB

```
Exe := Enable;
inst_StdFB1(Execute:=Exe, Input1:=Arg1, Input2:=Arg2);
Out1 := inst_StdFB1.Out;
tmp2 := Arg2;
Out2 := Exe AND tmp2;
```
— 2212

| Program 0/Section 0 | My_FB |
|---|---|
| (<br>(:= A1 D1)<br>(CAL (Inst_MyFB<br>  ((:= Enable _tmpPF0)<br>    (:= Arg1 A1)<br>    (:= Arg2 Var1)))<br>(:= D2 Inst_MyFB.Out1)<br>(CAL (Inst_StdFB2<br>  ((:= Execute _tmpPF0)<br>    (:= Input Var2)))<br>(:= D4 Inst_StdFB2.Out1)<br>) | (<br>(:= Exe Enable)<br>(CAL (Inst_StdFB1<br>  ((:= EN TRUE)<br>    (:= Execute _tmpPF0)<br>    (:= Input1 Arg1)<br>    (:= Input2 Arg2)))<br>(:= Out1 inst_StdFB1.Out)<br>(:= tmp2 Arg2)<br>(:= Out2 (AND Exe tmp2))<br>) |

FIG. 8

| NO | PARENT | DEVICE | FOCUS | DIRECTION | VARIABLE | PROGRAM | INSTANCE | FUNCTION | PARAMETER | IO |
|---|---|---|---|---|---|---|---|---|---|---|
| 1 | - | D1 | D1 | ↑ | A1 | Program 0/ Section 0 | Inst_MyFB | My_FB | Arg1 | INPUT |
| 2 | 1 | D1 | Arg1 | = | Arg1 | My_FB | Inst_StdFB1 | Std_FB1 | Input1 | INPUT |
| 3 | - | D2 | D2 | ↓ | Out1 | Program 0/ Section 0 | Inst_MyFB | My_FB | Out1 | OUTPUT |
| 4 | 3 | D2 | Out1 | = | Out1 | My_FB | Inst_StdFB1 | Std_FB1 | Out1 | OUTPUT |
| 5 | - | D3 | D3 | = | D3 | Program 0/ Section 0 | Inst_MyFB | My_FB | Enable | INPUT |
| 6 | 5 | D3 | Enable | ↑ | Exe | My_FB | Inst_StdFB1 | Std_FB1 | Execute | INPUT |
| 7 | - | D3 | D3 | = | D3 | Program 0/ Section 0 | Inst_StdFB2 | Std_FB2 | Execute | INPUT |
| 8 | - | D4 | D4 | = | D4 | Program 0/ Section 0 | Inst_StdFB2 | Std_FB2 | Out1 | OUTPUT |

| ID | FB | PAR_X | PAR_Y |
|---|---|---|---|
| 1 | Std_FB1 | Execute | Out |
| 2 | Std_FB1 | Input1 | Out |
| 3 | Std_FB1 | Input2 | Out |
| 4 | Std_FB2 | Execute | Out1 |
| 5 | Std_FB2 | Execute | Out2 |
| 6 | Std_FB2 | Input | Out2 |

| DEVICE | INSTANCE | DEP | ID | TRACE |
|---|---|---|---|---|
| D1 | Inst_StdFB1 | PAR_X | 2 | 1,2 |
| D2 | Inst_StdFB1 | PAR_Y | 1 | 3,4 |
| D2 | Inst_StdFB1 | PAR_Y | 2 | 3,4 |
| D2 | Inst_StdFB1 | PAR_Y | 3 | 3,4 |
| D3 | Inst_StdFB1 | PAR_X | 1 | 5,6 |
| D3 | Inst_StdFB2 | PAR_X | 4 | 7 |
| D3 | Inst_StdFB2 | PAR_X | 5 | 7 |
| D4 | Inst_StdFB2 | PAR_Y | 4 | 8 |

|  | D1 | D2 | D3 | D4 |
|---|---|---|---|---|
| D1 | 0 | 1 | 0 | 0 |
| D2 | 0 | 0 | 0 | 0 |
| D3 | 0 | 1 | 0 | 1 |
| D4 | 0 | 0 | 0 | 0 |

FIG. 15

GRAPH DISPLAY DEVICE, GRAPH DISPLAY METHOD, AND RECORDING MEDIUM

CROSS-REFERENCE TO RELATED APPLICATION

This application is a 371 of international application of PCT application serial no. PCT/JP2020/006720, filed on Feb. 20, 2020, which claims the priority benefit of Japan application no. 2019-045741, filed on Mar. 13, 2019. The entirety of each of the above-mentioned patent applications is hereby incorporated by reference herein and made a part of this specification.

TECHNICAL FIELD

The present invention relates to a graph display device, a graph display method, and a recording medium.

BACKGROUND ART

Production lines in plants or the like are configured with a plurality of devices (mechanisms) such as conveyors and robot arms. If an abnormality occurs in any of the devices in the production lines, there is a likelihood that manufacturing of products may be stopped and this may lead to extensive damage. Therefore, maintenance workers periodically look around the production lines to check whether or not an abnormality or signs thereof have occurred in plants or the like.

In a case in which occurrence of an abnormality or signs thereof is detected in a production line, there may be a case in which a true reason for the abnormality is present in the device before the abnormality is detected. It is thus important to ascertain dependency relations among the devices in the production line in order to specify the true reasons for the abnormality. However, since the number of devices configuring a production line increases, and operation conditions of each device may change on a daily basis, it is difficult to accurately ascertain dependency relations among all the devices.

Therefore, skilled maintenance workers ascertain dependency relations among a plurality of devices configuring production lines and detect abnormality or signs thereof occurring in the production lines on the basis of their own experiences and intuition. In order to enable non-skilled maintenance workers to perform such maintenance operations, there has been a demand for development of techniques for visualizing dependency relations among a plurality of devices configuring a production line.

Thus, Patent Literature 1 proposes an information processing device for visualizing relations among control algorithms and input/output machines defined in a control program. Specifically, the information processing device proposed by Patent Literature 1 specifies which of the input/output machines and signals are to be input/output by each of variables for inputting/outputting signals described in a control program and generates a directed graph indicating dependency relations among the variables on the basis of a result of the specification. According to the invention disclosed in Patent Literature 1, it is possible to ascertain the dependency relations among the input/output machines configuring a production line using the generated directed graph.

CITATION LIST

Patent Literature

[Patent Literature 1]
Japanese Unexamined Patent Application Publication No. 2013-225251

SUMMARY OF INVENTION

Technical Problem

The present inventors discovered that there are the following problems in the related art as in Patent Literature 1 in which dependency relations among devices configuring a production line are derived from a control program. In other words, one or more functions (function blocks) are generally used to define various commands in a control program. The functions are a group of commands to execute defined arithmetic operation processing on the basis of arguments provided to input parameters and output a result of the arithmetic operations to output parameters. In the related art, utilization of the functions is not taken into consideration. Therefore, there is a problem that it is difficult to ascertain what kind of dependency relations device variables corresponding to devices have via functions in the control program in a case in which the functions are used in the control program.

The present invention was made in view of such circumstances in one aspect, and an objective thereof is to provide a technology for appropriately ascertaining dependency relations among device variables via functions in a control program.

Solution to Problem

The present invention employs the following configurations to solve the aforementioned problems.

In other words, a graph display device according to an aspect of the present invention includes: an information acquisition unit that acquires dependency relation information indicating dependency relations among device variables and dependency relations of the device variables with respect to an input parameter and an output parameter of a function and function information indicating a dependency relation between the input parameter and the output parameter of the function specified in a control program, the control program including a plurality of commands for controlling operations of a plurality of devices included in a production line, the plurality of commands including the function and a plurality of variables the plurality of variables including the plurality of device variables each corresponding to the devices; a graph generation unit that generates a first directed graph, which comprises a plurality of first nodes respectively representing the device variables, edges representing existence of the dependency relations, and a block that represents the function and is connected to a first node representing a device variable with a dependency relation with respect to an input parameter or an output parameter of the function that is being expressed via the edges and a second directed graph, which comprises the plurality of first nodes, the edges, the block, and a plurality of second nodes that are arranged in the block and respectively represent the input parameter and the output parameter of the function that is being expressed, on the basis of the acquired dependency relation information and the function information, the second nodes being connected to the first nodes representing device variables with dependency relations with the input parameter and the output parameter that are being expressed via the edges, second nodes representing an input parameter and an output parameter that mutually have a dependency relation in the function that is being expressed being connected to each other via the edges; and a display control unit that causes a display unit to switch between displaying the generated first directed graph and displaying the generated second directed graph in response to an instruction from a user.

In the graph display device with this configuration, the first directed graph and the second directed graph are generated. The first directed graph is generated to include the plurality of first nodes respectively expressing the device variables, the edges representing the existence of the dependency relation, and the blocks representing the functions. According to the first directed graph, it is possible to indicate the dependency relation of the device variables with respect to parameters of the functions in the control program. On the other hand, the second directed graph is generated to further include a plurality of second nodes that are arranged in the blocks in addition to the plurality of first nodes, the edges, and the blocks and respectively represent the parameters of the functions. The second nodes are connected to the first nodes via the edges representing device variables with each parameter that is being represented and has a dependency relation. Also, the second nodes respectively representing input parameters and output parameters that mutually have dependency relations are also connected via the edges. Therefore, according to the second directed graph, it is possible to indicate the dependency relations among parameters in the functions along with the dependency relations of the device variables with respect to the parameters of the functions in the control program. The graph display device according to the configuration causes the display device to switch between displaying the first directed graph and displaying the second directed graph in response to an instruction from the user. In this manner, it is possible to appropriately ascertain the dependency relations among the device variables via the functions in the control program.

Note that the control program includes a group of a series of commands for controlling operations of the plurality of devices included in the production line. The group of the series of commands include instances of one or more functions and a plurality of variables. The functions are configured with a group of commands to execute defined information processing. For example, the functions are configured with a group of commands that execute defined arithmetic operation processing on the basis of given input parameters and output results of the arithmetic operations to output parameters. The "functions" may be referred to as "function blocks". The input parameters (input variables) are parameters to give input values (arguments) to the functions. The output parameters (output variables) are parameters to receive arithmetic operation results (return values) of the functions. The functions may be defined to include one or more input parameters and one or more output parameters. Also, the input parameters and the output parameters may be provided as common parameters. The common parameters may be referred to as "input/output parameters". The functions may be defined to include one or more input/output parameters. Note that including one input/output parameter may be handled as being the same as including one input parameter and one output parameter. As the input/output parameter, alignment may be used. Note that the input parameter and the output parameter will also simply be referred to as "parameters" below.

As types of the functions, there are two types of functions, that is, user defined functions and standard functions. The user defined functions are functions defined by a user in the control program. Details of the user defined functions are described in the control program. Therefore, it is possible to specify dependency relations among inputs and outputs in the user defined functions through dependency analysis performed on the control program. On the other hand, the standard functions are functions prepared as standards in the system. Details of the standard functions are provided separately from the control program by a definition file (library) or the like. Therefore, it is not possible to specify the dependency relations among inputs and outputs in the standard functions through dependency analysis performed on the control program. The control program may include at least one or more instances of the standard functions.

The device variables correspond to devices (mechanisms) included in a production line and are used in a control program to define some commands for corresponding devices. However, the types of the variables used in the control program may not be limited to the device variables. For the control program, different variables other than the device variables may be used. The different variables may be used to define some commands for the production line, for example. The control program may be divided into a plurality of subprograms. The number of subprograms may not be limited, in particular, and may be appropriately determined in accordance with an embodiment. In this case, it is possible to provide two types (attributes) of the variables, namely inner variables and outer variables. The inner variables are variables used in one subprogram. The outer variables are variables commonly used among a plurality of subprograms. The device variables are one type of outer variables out of these. Also, at least any of the plurality of subprograms may be divided into one or more sections. The number of sections may not be limited, in particular, and may be appropriately determined in accordance with an embodiment.

The type of the production line may not be limited in particular, as long as it is possible to produce something. The type of the devices may not be limited, in particular, and may be appropriately selected in accordance with an embodiment. The devices may be, for example, conveyors, robot arms, servo motors, cylinders, suction pads, cutter devices, sealing devices, and the like. Also, the devices may be, for example, composite devices such as molding machines, printing machines, mounting machines, reflow furnaces, or substrate inspection devices. Moreover, the devices may include, in addition to devices that accompany some physical operations as described above, devices that perform internal processing such as devices that detect some information using various sensors, devices that acquire data from various sensors, devices that detect some information from acquired data, or devices that perform information processing on acquired data, for example. One device may be configured with one device or a plurality of devices or may be configured with a part of a device. One device may be configured with a plurality of devices. Also, a case in which one same device executes a plurality of kinds of processing may be regarded as a case in which different devices execute each kind of processing. In a case in which one same device executes first processing and second processing, for example, the device that executes the first processing may be regarded as a first device while the device that executes the second processing may be regarded as a second device.

The nodes (joints) express variables. An edge (branch) couples two nodes. Coupling of the nodes with the edge indicates that devices corresponding to the joints have a dependency relation. At this time, a start point of an arrow of the edge indicates a source of dependence while an end point of the arrow indicates a target of dependence. The "existence of a dependency relation" means that a result of an operation of a device as a source of dependence is related to an operation of a device as a target of dependence. The blocks represent functions. The blocks are handled similarly to the nodes.

In the graph device according to the aforementioned aspect, the plurality of commands may include a plurality of functions, and the plurality of functions may include a standard function prepared as a standard and a user defined function that is different from the standard function and is defined by the user in the control program. Also, each of the first directed graph and the second directed graph may be generated such that a first block representing the standard function from among the plurality of functions is indicated in a first form and a second block representing the user defined function is indicated in a second form that is different from the first form from among the plurality of blocks. With this configuration, it is possible to indicate the dependency relations among the device variables via the functions such that the types of the functions are distinguished.

In the graph display device according to the aforementioned aspect, the plurality of variables may include a local variable that is different from each of the device variables and is used between an input parameter and an output parameter that mutually have a dependency relation within the user defined function. Also, the graph generation unit may generate the second directed graph such that switching display is able to be performed between a first display form indicating the plurality of second nodes in the second block and a second display form further indicating a third node that represents the local variable, that is arranged between the second nodes respectively representing the input parameter and the output parameter that mutually have the dependency relation in the second block representing the user defined function, and that is connected to each of second nodes via the edges. With this configuration, it is possible to indicate the dependency relations among the device variables via the user defined function in the control program in association with the internal structure of the user defined function.

In the graph display device according to the aforementioned aspect, the plurality of functions may include a standard function that is used between an input parameter and an output parameter that mutually have a dependency relation within the user defined function. Also, the graph generation unit may generate the second directed graph such that switching display is able to be performed between a first display form indicating the plurality of second nodes in the second block and a third display form further indicating a first block representing the standard function used within the user defined function such that the first block is arranged between the second nodes respectively representing the input parameter and the output parameter that mutually have the dependency relation in the second block representing the user defined function and the first block is connected to each of the second nodes via the edges. With this configuration, it is possible to indicate the dependency relations among the device variables via the user defined function in the control program in association with the internal structure of the user defined function.

In the graph display device according to the aforementioned aspect, the plurality of functions may further include a different user defined function used between an input parameter and an output parameter that mutually have a dependency relation within the user defined function. Also, the graph generation unit may generate the second directed graph such that switching display is able to be performed between a first display form indicating the plurality of second nodes in the second block and a fourth display form further indicating an another second block representing the different user defined function used within the user defined function such that the another second block is arranged between the second nodes respectively representing the input parameter and the output parameter that mutually have the dependency relation in the second block representing the user defined function and the another second block is connected to each of the second nodes via the edges. With this configuration, it is possible to indicate the dependency relations among the device variables via the user defined function in the control program in association with the internal structure of the user defined function.

As another aspect of the graph display device according to each of the aforementioned forms, an aspect of the present invention may be an information processing method that realizes each of the aforementioned configurations, a program, or a storage medium that stores such a program in such a manner that a computer or the like can read the program. Here, the storage medium that can be read by a computer or the like is a medium that accumulates information such as a program using an electrical, magnetic, optical, mechanical, or chemical effect.

For example, a graph display method according to an aspect of the present invention is an information processing method that causes a computer to execute: acquiring dependency relation information indicating dependency relations among device variables and dependency relations of the device variables with respect to an input parameter and an output parameter of a function and function information indicating a dependency relation between the input parameter and the output parameter of the function specified in a control program, the control program including a plurality of commands for controlling operations of a plurality of devices included in a production line, the plurality of commands including the function and a plurality of variables the plurality of variables including the plurality of device variables each corresponding to the devices; generating a first directed graph, which comprises a plurality of first nodes respectively representing the device variables, edges representing existence of the dependency relations, and a block that represents the function and is connected to a first node representing a device variable with a dependency relation with respect to an input parameter or an output parameter of the function that is being expressed via the edges and a second directed graph, which comprises the plurality of first nodes, the edges, the block, and a plurality of second nodes that are arranged in the block and respectively represent the input parameter and the output parameter of the function that is being expressed, on the basis of the acquired dependency relation information and the function information, the second nodes being connected to the first nodes representing device variables with dependency relations with the input parameter and the output parameter that are being expressed via the edges, second nodes representing an input parameter and an output parameter that mutually have a dependency relation in the function that is being expressed being connected to each other via the edges; and causing a display unit to switch between displaying the generated first directed graph and displaying the generated second directed graph in response to an instruction from a user.

For example, a non-transitory computer readable recording medium according to an aspect of the present invention stores a graph display program, which is a program that causes a computer to execute: acquiring dependency relation information indicating dependency relations among device variables and dependency relations of the device variables with respect to an input parameter and an output parameter of a function and function information indicating a dependency relation between the input parameter and the output parameter of the function specified in a control program, the control program including a plurality of commands for controlling operations of a plurality of devices included in a production line, the plurality of commands including the function and a plurality of variables the plurality of variables including the plurality of device variables each corresponding to the devices; generating a first directed graph, which comprises a plurality of first nodes respectively representing the device variables, edges representing existence of the dependency relations, and a block that represents the function and is connected to a first node representing a device variable with a dependency relation with respect to an input parameter or an output parameter of the function that is being expressed via the edges and a second directed graph, which comprises the plurality of first nodes, the edges, the block, and a plurality of second nodes that are arranged in the block and respectively represent the input parameter and the output parameter of the function that is being expressed, on the basis of the acquired dependency relation information and the function information, the second nodes being connected to the first nodes representing device variables with dependency relations with the input parameter and the output parameter that are being expressed via the edges, second nodes representing an input parameter and an output parameter that mutually have a dependency relation in the function that is being expressed being connected to each other via the edges; and causing a display unit to switch between displaying the generated first directed graph and displaying the generated second directed graph in response to an instruction from a user.

Advantageous Effects of Invention

According to the present invention, it is possible to appropriately ascertain dependency relations among device variables via functions in a control program.

BRIEF DESCRIPTION OF DRAWINGS

FIG. 7 illustrates an example of a control program according to the embodiment.

FIG. 8 illustrates an example of an abstract syntax tree obtained from the control program in FIG. 7.

FIG. 12 illustrates an example of data indicating a pattern of a dependency relation obtained through dependency analysis performed on the control program in FIG. 7.

FIG. 14A schematically illustrates an example of function structure information according to the embodiment.

FIG. 14B illustrates an example of intermediate data obtained in a process of specifying dependency relations among device variables in the analysis device according to the embodiment.

FIG. 15 illustrates an example of specification result data indicating dependency relations among device variables specified by the analysis device according to the embodiment.

DESCRIPTION OF EMBODIMENTS

Hereinafter, an embodiment according to an aspect of the present invention (hereinafter, also referred to as a "present embodiment") will be described on the basis of the drawings. However, the present embodiment described below is merely an illustration of the present invention in any senses. It is a matter of course that various improvements and modifications can be made without departing from the scope of the present invention. In other words, specific configurations in accordance with an embodiment may be appropriately employed to implement the present invention. Note that although data appearing in the present embodiment will be described using a natural language, specifically, the data is designated by a pseudo language, commands, parameters, a machine language, or the like that can be recognized by a computer.

§ 1 Application Example

Figure 1:
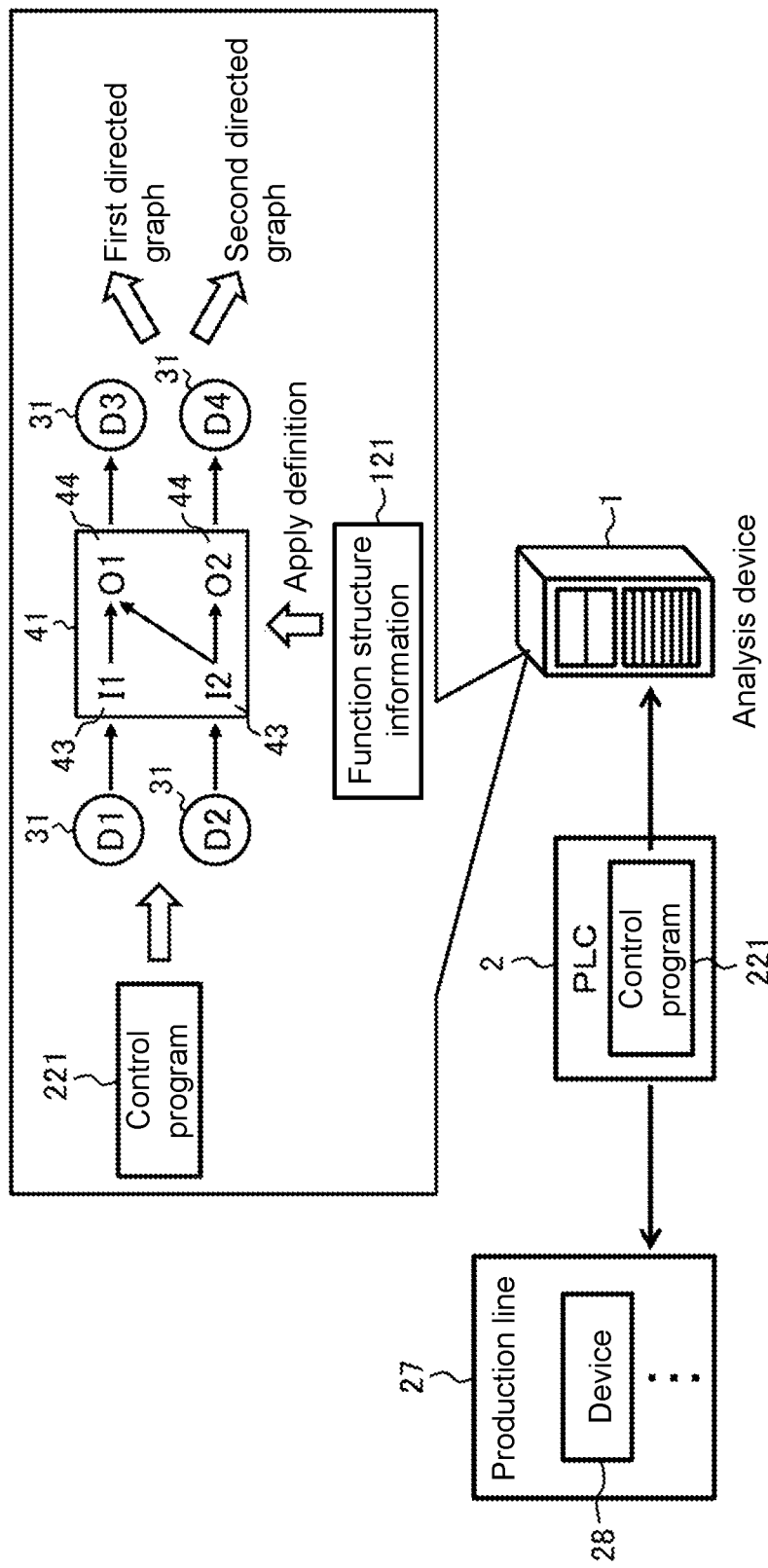
FIG. 1 schematically illustrates an example of a situation to which the present invention is applied.

First, an example of a situation to which the present invention is applied will be described using FIG. 1 first. FIG. 1 schematically illustrates an example of an application situation of an analysis device 1 according to the present embodiment. The analysis device 1 according to the present embodiment is an example of the "graph display device" according to the present invention. In the example in FIG. 1, a situation in which a programmable logic controller (PLC) 2 that is a different computer from the analysis device 1 is present and the PLC 2 controls operations of a plurality of devices 28 configuring a production line 27 on the basis of a control program 221 is assumed.

The analysis device 1 according to the present embodiment is a computer configured to specify, from the control program 221, dependency relations among the plurality of devices 28 included in the production line 27, generate a directed graph indicating the specified dependency relations, and display the generated directed graph. Specifically, the analysis device 1 acquires the control program 221 including a plurality of commands (a group of a series of commands) for controlling operations of the plurality of devices 28 included in the production line 27. The plurality of commands defined in the control program 221 include instances of one or more functions and a plurality of variables.

The functions are configured with a group of commands for executing defined information processing. For example, the functions are configured with a group of commands that execute defined arithmetic operation processing on the basis of provided input parameters and output results of the arithmetic operations to output parameters. The "functions" may be referred to as "function blocks". The input parameters (input variables) are parameters for providing input values (arguments) to the functions. The output parameters (output variables) are parameters for receiving results of the arithmetic operations (return values) of the functions.

The functions may be defined to include one or more input parameters and one or more output parameters. Also, the input parameters and the output parameters may be provided as common parameters. The common parameters may be referred to as "input/output parameters". The functions may be defined to include one or more input/output parameters. Alignment may be used as the input/output parameters. Note that including one input/output parameter may be handled as being the same as including one input parameter and one output parameter.

As the types of the functions, two types of functions, namely user defined functions and standard functions are present. The user defined functions are functions defined by a user within the control program. Details of the user defined functions are described in the control program. On the other hand, the standard functions are functions prepared as standards in the system. Details of the standard functions are provided separately from the control program by a definition file (library) or the like. Instances of the one or more functions in the control program 221 may include instances of one or more standard functions 41.

Also, the plurality of variables include a plurality of device variables 31 respectively corresponding to the devices 28. The device variables 31 correspond to the devices 28 included in the production line 27 and are used in the control program 221 to define some command for the corresponding devices 28. However, the type of the variables used in the control program 221 may not be limited to the device variables 31. Different variables other than the device variables 31 may be used for the control program 221. The different variables are used to define some commands for the production line 27, for example. The control program 221 may be divided into a plurality of subprograms. In this case, it is possible to provide two types (attributes) of variables, namely inner variables and outer variables. The inner variables are variables used within one subprogram. The outer variables are variables commonly used among a plurality of subprograms. The outer variables are one type of outer variables among these.

The type of the production line 27 may not be limited, in particular, as long as it is possible to produce something. The types of the devices 28 may not be particularly limited and may be appropriately selected in accordance with an embodiment. The devices 28 may be, for example, conveyors, robot arms, servo motors, cylinders, suction pads, cutter devices, sealing devices, and the like. Also, the devices 28 may be, for example, composite devices such as molding machines, printing machines, mounting machines, reflow furnaces, and substrate inspection devices. Moreover, the devices 28 may include, in addition to devices that accompany some physical operations as described above, devices that perform internal processing such as devices that detect some information from various sensors, devices that acquire data from various sensors, devices that detect some information from acquired data, and devices that perform information processing on acquired data. One device 28 may be configured with one or a plurality of devices or may be configured with a part of a device. One device may be configured with a plurality of devices 28. Also, a case in which one same device executes a plurality of kinds of processing may be regarded as a case in which different devices 28 execute each kind of processing. In a case in which one same device executes first processing and second processing, for example, the device that executes the first processing may be regarded as a first device while the device that executes the second processing may be regarded as a second device.

The analysis device 1 according to the present embodiment extracts a pattern of dependency relations of the device variables 31 for the input parameters or the output parameters of the instances of the functions through execution of dependency analysis on the acquired control program 221. The extracted pattern may include a pattern of a dependency relation among device variables 31 for an input parameter 43 or an output parameter 44 of an instance of the standard functions 41. However, since details (inner structure) of the standard functions 41 are not described in the control program 221, it is not possible to derive the dependency relation between the input parameter 43 and the output parameter 44 of the instance of the standard functions 41 through dependency analysis on the control program 221.

Thus, the analysis device 1 according to the present embodiment provides, as external information, a definition of the dependency relation between the input parameter 43 and the output parameter 44 of the standard functions 41, which cannot be derived through dependency analysis on the control program 221. In other words, the analysis device 1 acquires function structure information 121 that defines dependency relations between input parameters and output parameters of the standard functions. Then, the analysis device 1 specifies the dependency relation between the input parameter 43 and the output parameter 44 of the instance of the standard functions 41 included in the control program 221 on the basis of the function structure information 121.

It is assumed that one device variable among the plurality of device variables 31 has a dependency relation with an input parameter of an instance of a certain function from among the one or more functions included in the control program 221 in the pattern of the extracted dependency relation. Also, it is assumed that a different device variable has a dependency relation with an output parameter of the same function that has a dependency relation with the input parameter. In this case, the analysis device 1 according to the present embodiment certifies that the one device variable has a dependency relation with the different device variable.

In other words, it is assumed that a first device variable (the one device variable) from among the plurality of device variables 31 has a dependency relation with an input parameter of any of the one or more functions included in the control program 221 and a second device variable (the different device variable) has a dependency relation with an output parameter of any of the functions. In this case, if the input parameter and the output parameter belong to the same functions (in other words, the first device variable and the second device variable have dependency relations with a common function) and there is a dependency relation between the input parameter and the output parameter, the analysis device 1 certifies that there is a dependency relation between the first device variable and the second device variable.

In a case in which the control program 221 includes instances of user defined functions, dependency relations between input parameters and output parameters in the instances of the user defined functions are specified through dependency analysis performed on the control program 221. On the other hand, the dependency relation between the input parameter 43 and the output parameter 44 in the instance of the standard functions 41 is provided by the function structure information 121. Therefore, the analysis device 1 can specify dependency relations among the device variables 31 through the aforementioned certifying processing.

The result of specifying the dependency relation between the input parameter and the output parameter in the instance of the user defined function through dependency analysis and the function structure information 121 are an example of the function information indicating the dependency relation between the input parameter and the output parameter of the function. Also, the result of specifying the dependency relations among the device variables 31 and the extracted pattern of the dependency relations are an example of the dependency relation information indicating the dependency relations among the device variables 31 and the dependency relation of each device variable with respect to the input parameter or the output parameter of the function specified from the control program 221. The analysis device 1 according to the present embodiment acquires the dependency relation information and the function information through the aforementioned series of processes.

Then, the analysis device 1 generates a first directed graph (such as a directed graph 52, which will be described later) containing a plurality of first nodes respectively representing the device variables 31, edges representing existence of dependency relations, and a block that represents a function and is connected to a first node representing a device variable with a dependency relation with respect to an input parameter or an output parameter of the function that is being expressed via the edges, on the basis of the acquired dependency relation information. Also, the analysis device 1 generates a second directed graph (such as a directed graph 55, which will be described later) containing the plurality of first nodes, the edges, the block, and a plurality of second nodes on the basis of the acquired dependency relation information and the function information. The plurality of second nodes are arranged in the block and respectively represent the input parameter and the output parameter of the instance of the function that is being expressed. The analysis device 1 causes a display device to switch between displaying the generated first directed graph and displaying the generated second directed graph in response to an instruction from the user.

In the example in FIG. 1, a device variable "D1" has a dependency relation with an input parameter "I1" of an instance of a standard function 41. A device variable "D2" has a dependency relation with an input parameter "I2" of an instance of the standard function 41. A device variable "D3" has a dependency relation with an output parameter "O1" of the instance of the standard function 41. A device variable "D4" has a dependency relation with an output parameter "O2" of the instance of the standard function 41. A pattern of these dependency relations is extracted through dependency analysis. Also, the function structure information 121 provides a definition that there is a dependency relation between the input parameter "I1" and the output parameter "O1" and there is a dependency relation between the input parameter "I2" and each of the output parameters "O1" and "O2".

Therefore, in the example in FIG. 1, the analysis device 1 can specify the dependency relations among the device variables 31 like specification of existence of the dependency relation between the device variable "D1" and the device variable "D3" and existence of the dependency relation between the device variable "D2" and each of the device variables "D3" and "D4". Note that FIG. 1 merely illustrates an example of the dependency relations among the device variables 31. The number of device variables 31, the number of other variables, the number of instances of the functions, the number of parameters of the functions, and existence of dependency relations may be appropriately set.

As described above, according to the present embodiment, the dependency relation between the input parameter 43 and the output parameter 44 of the standard function 41 comes into light using the function structure information 121, and it is thus possible to specify the dependency relations among the plurality of device variables 31 with the standard function 41 interposed therebetween. Therefore, according to the present embodiment, it is possible to appropriately derive the dependency relations among the plurality of devices 28 configuring the production line 27 from the control program 221 even in a case in which the control program 221 includes the standard function 41 as illustrated as an example in FIG. 1.

In addition, it is possible to indicate the dependency relation of each device variable 31 with respect to each parameter of the function in the control program 221 according to the first directed graph out of the directed graphs that are being displayed in the present embodiment. On the other hand, according to the second directed graph, it is possible to indicate the dependency relations among the parameters in the function along with the dependency relation of each device variable 31 with respect to each parameter of the function in the control program 221. Therefore, it is possible to appropriately ascertain the dependency relations among the device variables 31 via the function in the control program 221 using the first directed graph and the second directed graph displayed in a switched manner.

§ 2 Configuration Example

[Hardware Configuration]
<Analysis Device>

Figure 2:
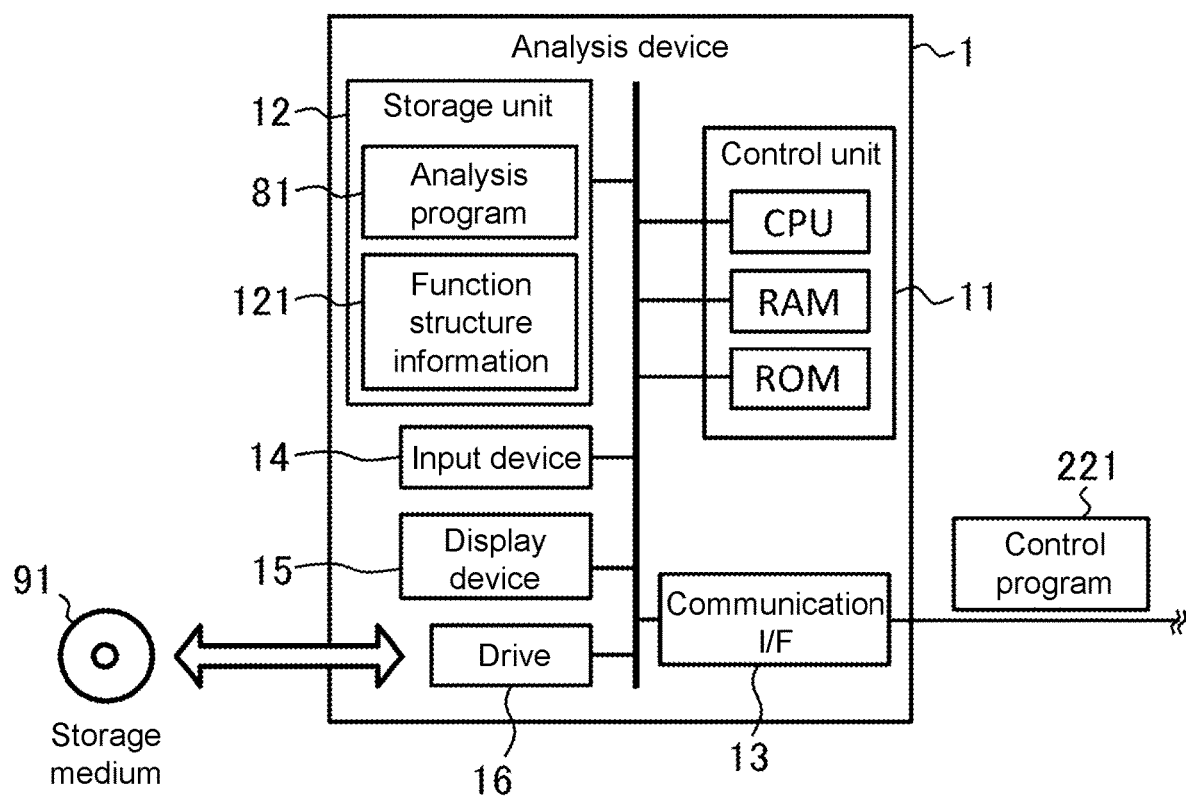
FIG. 2 schematically illustrates an example of a hardware configuration of an analysis device according to an embodiment.

Next, an example of a hardware configuration of the analysis device 1 according to the present embodiment will be described using FIG. 2. FIG. 2 schematically illustrates an example of the hardware configuration of the analysis device 1 according to the present embodiment.

As illustrated in FIG. 2, the analysis device 1 according to the present embodiment is a computer in which a control unit 11, a storage unit 12, a communication interface 13, an input device 14, a display device 15, and a drive 16 are electrically connected to each other. Note that in FIG. 2, the communication interface is represented as a "communication I/F".

The control unit 11 includes a central processing unit (CPU) that is a hardware processor, a random access memory (RAM), a read only memory (ROM), and the like and is configured to execute information processing on the basis of a program and various kinds of data. The storage unit 12 is an example of a memory and is configured with an auxiliary storage device such as a hard disk drive or a solid state drive, for example. In the present embodiment, the storage unit 12 stores various kinds of information such as an analysis program 81 and function structure information 121.

The analysis program 81 is a program for causing the analysis device 1 to execute a series of information processes (FIGS. 5A to 6, FIGS. 10A to 11B, FIG. 13A, and FIG. 13B) of specifying the dependency relations among the plurality of devices 28 from the control program 221, generating directed graphs indicating the specified dependency relations, and displaying the generated directed graphs. The analysis program 81 includes a group of a series of commands for the information processing. The analysis program 81 is an example of the "graph display program" according to the present invention. The function structure information 121 indicates definitions of the dependency relations between the input parameters and the output parameters of the standard functions. Details will be described later.

The communication interface 13 is, for example, a wired local area network (LAN) module, a wireless LAN module, or the like and is an interface to perform wired or wireless communication via a network. The analysis device 1 can perform data communication with the PLC 2 via the network using the communication interface 13 and acquire the control program 221. Note that the type of the network may be appropriately selected from the Internet, a wireless communication network, a mobile communication network, a telephone network, and a dedicated network, for example.

The input device 14 is a device for performing inputs, such as a mouse or a keyboard, for example. Also, the display device 15 is an example of the output device and is, for example, a display. An operator can operate the analysis device 1 via the input device 14 and the display device 15. Note that the display device 15 may be a touch panel display. In this case, the input device 14 may be omitted.

The drive 16 is, for example, a CD drive or a DVD drive and is a drive device for reading a program stored in the storage medium 91. The type of the drive 16 may be appropriately selected in accordance with the type of the storage medium 91. At least any of the analysis program 81, the function structure information 121, and the control program 221 may be stored in the storage medium 91.

The storage medium 91 is a medium that accumulates information such as a program using an electrical, magnetic, optical, mechanical, or chemical effect such that a computer or other devices or machines can read recorded information such as the program. The analysis device 1 may acquire at least any of the analysis program 81, the function structure information 121, and the control program 221 from the storage medium 91.

Here, FIG. 2 illustrates a disc-type storage medium such as a CD or a DVD as an example of the storage medium 91. However, the type of the storage medium 91 is not limited to the disc type and may be a type other than the disc type. As a storage medium of a type other than the disc type, it is possible to exemplify a semiconductor memory such as a flash memory, for example.

Note that in regard to the specific hardware configuration of the analysis device 1, it is possible to appropriately omit, replace, and add components in accordance with an embodiment. For example, the control unit 11 may include a plurality of hardware processors. The hardware processors may be configured with microprocessors, field-programmable gate arrays (FPGAs), digital signal processors (DSPs), or the like. The storage unit 12 may be configured with the RAM and the ROM included in the control unit 11. At least any of the communication interface 13, the input device 14, the display device 15, and the drive 16 may be omitted. The analysis device 1 may further include, for example, an output device other than the display device 15, such as a speaker. The analysis device 1 may be configured with a plurality of computers. In this case, the hardware configurations of the computers may or may not be the same. Also, the analysis device 1 may be a general-purpose information processing device such as a desktop PC (personal computer) or a tablet PC, a genera-purpose server device, or the like as well as an information processing device designed to be dedicated for services to be provided.

<PLC>

Figure 3:
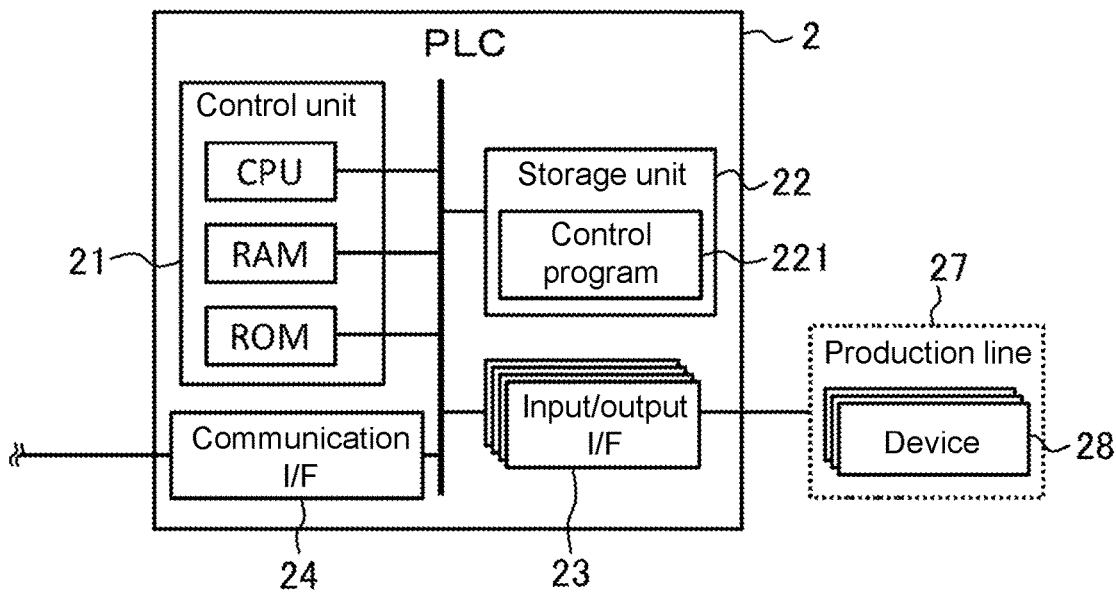
FIG. 3 schematically illustrates an example of a hardware configuration of a control device (PLC) according to the embodiment.

Next, an example of a hardware configuration of the PLC 2 that controls operations of the production line 27 will be described using FIG. 3. FIG. 3 schematically illustrates an example of the hardware configuration of the PLC 2 according to the present embodiment.

As illustrated in FIG. 3, the PLC 2 is a computer in which a control unit 21, a storage unit 22, input/output interfaces 23, and a communication interface 24 are electrically connected to each other. In this manner, the PLC 2 is configured to control operations of the devices 28 of the production line 27. Note that in FIG. 3, the input/output interface and the communication interface are represented as an "input/output I/F" and a "communication I/F".

The control unit 21 includes a CPU, a RAM, a ROM, and the like and is configured to execute information processing on the basis of a program and various kinds of data. The storage unit 22 is configured with a RAM or a ROM, for example, and stores various kinds of information such as the control program 221. The control program 221 is a program for controlling operations of the production line 27. The control program 221 includes a plurality of commands (a group of a series of commands) for controlling operations of the plurality of devices 28 included in the production line 27.

The input/output interfaces 23 are interfaces for connection to external devices and are appropriately configured in accordance with the external devices to be connected. In the present embodiment, the PLC 2 is connected to the production line 27 via the input/output interfaces 23. The number of input/output interfaces 23 may not be limited, in particular, and may be appropriately selected in accordance with an embodiment.

The communication interface 24 is, for example, a wired LAN module, a wireless LAN module, or the like and is an interface to perform wired or wireless communication. The PLC 2 can perform data communication with the analysis device 1 using the communication interface 24.

Note that in regard to a specific hardware configuration of the PLC 2, it is possible to appropriately omit, replace, and add components in accordance with an embodiment. For example, the control unit 21 may include a plurality of processors. The storage unit 22 may be configured with the RAM and the ROM included in the control unit 21. The storage unit 22 may be configured with an auxiliary storage device such as a hard disk drive or a solid state drive. Also, the PLC 2 may be replaced with a general-purpose information processing device such as a desktop PC or a tablet PC as well as an information processing device designed to be dedicated for services to be provided.

[Software Configuration]

Figure 4:
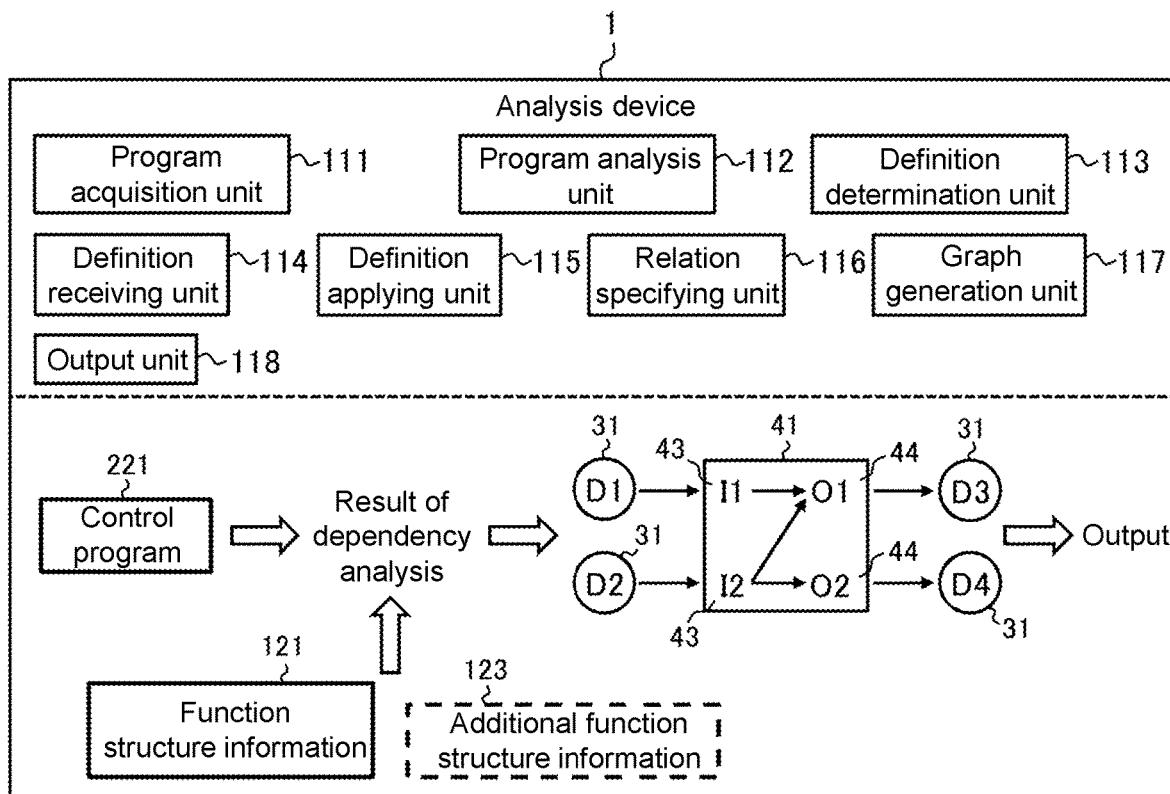
FIG. 4 schematically illustrates an example of a software configuration of the analysis device according to the embodiment.

Next, an example of a software configuration of the analysis device 1 according to the present embodiment will be described using FIG. 4. FIG. 4 schematically illustrates an example of the software configuration of the analysis device 1 according to the present embodiment.

The control unit 11 of the analysis device 1 develops, in the RAM, the analysis program 81 stored in the storage unit 12. Then, the control unit 11 interprets and executes the analysis program 81 developed in the RAM using the CPU to control each component. In this manner, the analysis device 1 according to the present embodiment operates as a computer including, as software modules, a program acquisition unit 111, a program analysis unit 112, a definition determination unit 113, a definition receiving unit 114, a definition applying unit 115, a relation specifying unit 116, a graph generation unit 117, and an output unit 118 as illustrated in FIG. 4. In other words, each software module of the analysis device 1 is realized by the control unit 11 (CPU) in the present embodiment.

The program acquisition unit 111 acquires the control program 221 including a plurality of commands for controlling operations of the plurality of devices 28 included in the production line 27. The plurality of commands include instances of one or more functions and a plurality of variables. The one or more functions may include one or more standard functions 41 prepared as standards. The plurality of variables include a plurality of device variables 31 respectively corresponding to the devices 28.

The program analysis unit 112 extracts a pattern of the dependency relations of the device variables 31 for the input parameters or the output parameters of the instances of the function through execution of dependency analysis on the control program 221. The definition determination unit 113 refers to the function structure information 121 that defines the dependency relations between the input parameters and the output parameters of the standard functions and determines whether or not instances of one or more undefined standard functions, for which no dependency relations are defined by the function structure information 121, is included in the control program 221. In a case in which it is determined that instances of one or more undefined standard functions are included in the control program 221, the definition receiving unit 114 receives an input of additional function structure information 123 that defines dependency relations between input parameters and output parameters of the undefined standard functions.

The definition applying unit 115 specifies the dependency relation between the input parameter 43 and the output parameter 44 of instances of one or more standard functions 41 included in one or more functions on the basis of the function structure information 121. Also, in a case in which the instances of the one or more undefined standard functions are included in the control program 221, the definition applying unit 115 specifies the dependency relations between the input parameters and the output parameters of the instances of the one or more undefined standard functions from among the standard functions 41 included in the control program 221 on the basis of the input additional function structure information 123.

The relation specifying unit 116 specifies the dependency relations among the device variables 31 by certifying that in the extracted pattern of the dependency relations, one device variable that belongs to the same function from among the one or more functions and has a dependency relation with an input parameter has a dependency relation with another device variable that has a dependency relation with an output parameter that has a dependency relation with the input parameter. The result of specifying the dependency relation between the input parameter and the output parameter of the instance of the user defined function through the dependency analysis, the function structure information 121, and the additional function structure information 123 are an example of the function information. A result of specifying the pattern of the extracted dependency relations and the dependency relations among the device variables 31 is an example of the dependency relation information. The program acquisition unit 111 to the relation specifying unit 116 are an example of the "information acquisition unit" according to the present invention. In other words, dependency relation information indicating the dependency relations among the device variables 31 and the dependency relations of the device variables with respect to input parameters and output parameters of functions specified from the control program 221 and function information indicating the dependency relations between the input parameters and the output parameters of functions are acquired by the program acquisition unit 111 to the relation specifying unit 116.

The graph generation unit 117 generates directed graphs indicating the specified dependency relations among the device variables 31 on the basis of the result of specifying the dependency relations. The output unit 118 outputs information related to the result of specifying the dependency relations among the device variables 31. In the present embodiment, the graph generation unit 117 can generate a first directed graph that includes a plurality of first nodes respectively representing the device variables 31, edges representing existence of dependency relations, and blocks that represent functions and are connected to the first nodes representing the device functions with dependency relations with input parameters or output parameters of functions that are being expressed via edges, on the basis of the acquired dependency relation information. Also, the graph generation unit 117 can generate a second directed graph including the plurality of first nodes, the edges, the blocks and a plurality of second nodes on the basis of the acquired dependency relation information and the function information. Also, the output unit 118 can output the generated first directed graph and second directed graph as information related to the result of specifying the dependency relations among the device variables 31. As an example of the output processing, the output unit 118 can cause the display device 15 to switch between displaying the generated first directed graph and displaying the generated second directed graph in response to an instruction from the user. The output unit 118 is an example of the "display control unit" according to the present invention.

Each software module of the analysis device 1 will be described in detail in an operation example, which will be described below. Note that in the present embodiment, an example in which all the software modules of the analysis device 1 are realized by a general-purpose CPU is described. However, some or all of the aforementioned software modules may be realized by one or a plurality of dedicated hardware processors. Also, in regard to the software configuration of the analysis device 1, software modules may be appropriately omitted, replaced, and added in accordance with an embodiment.

§ 3 Operation Example

Figure 5A:
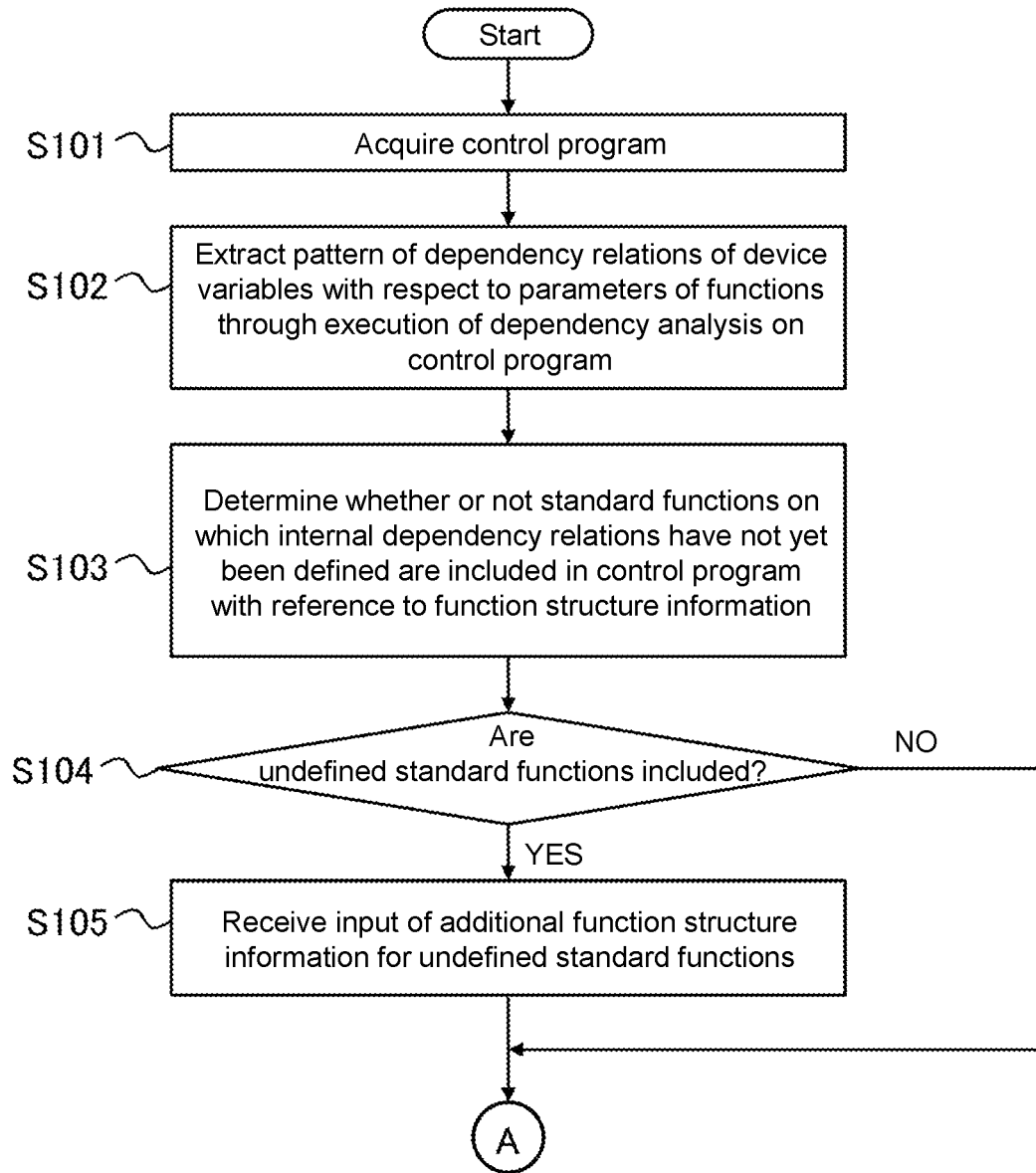
FIG. 5A illustrates an example of a processing procedure of the analysis device according to the embodiment.
Figure 5B:
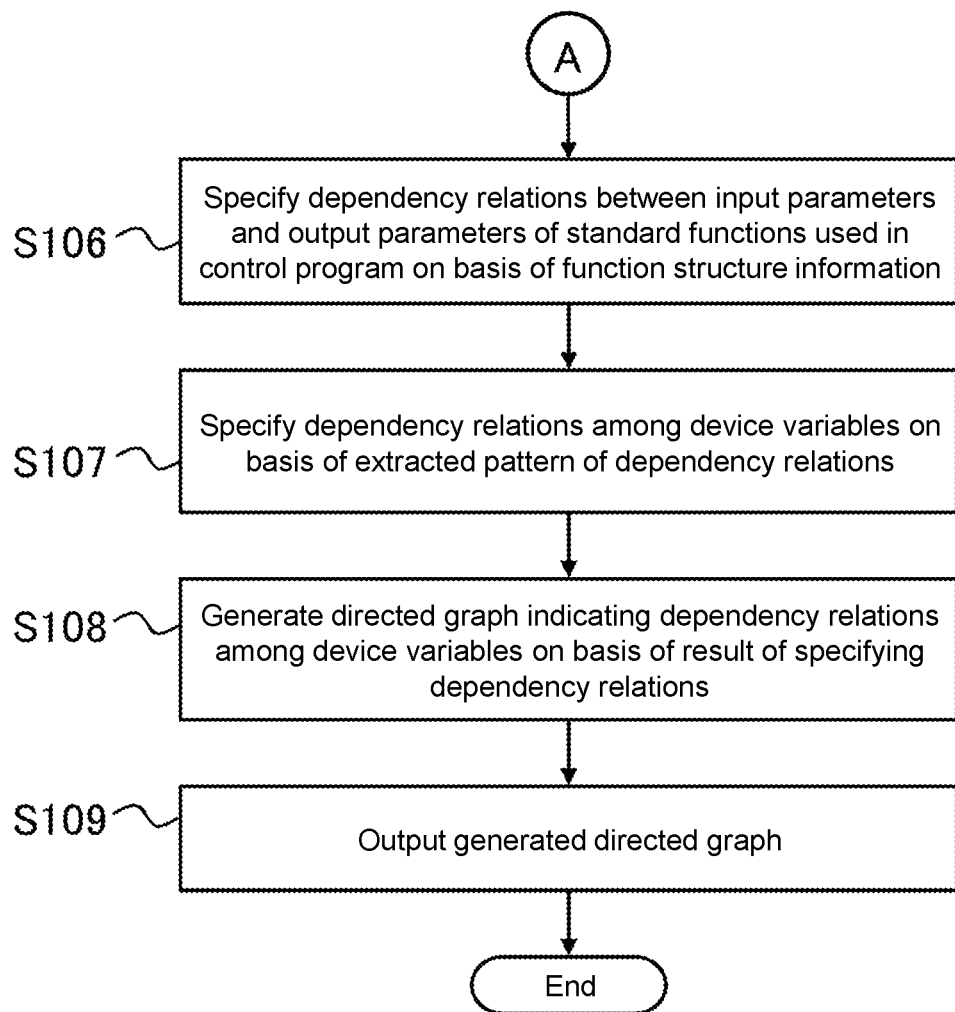
FIG. 5B illustrates an example of a processing procedure of the analysis device according to the embodiment.

Next, an operation example of the analysis device 1 will be described using FIGS. 5A and 5B. FIGS. 5A and 5B illustrate an example of a processing procedure performed by the analysis device 1 according to the present embodiment. The processing procedure performed by the analysis device 1, which will be described below, is an example of the "graph display method" according to the present invention. However, the processing procedure described below is merely an example, and each process may be changed as long as possible. Also, it is possible to appropriately omit, replace, and add steps in regard to the processing procedure described below in accordance with an embodiment.

[Step S101]

In Step S101, the control unit 11 operates as the program acquisition unit 111 and acquires the control program 221.

In the present embodiment, the control unit 11 acquires the control program 221 from the PLC 2 via the network using the communication interface 13. However, the location and the acquisition method of the control program 221 may not be limited to such an example. In a case in which the control program 221 is present in the storage unit 12 or the storage medium 91, the control unit 11 may acquire the control program 221 from the storage unit 12 or the storage medium 91. Also, in a case in which the control program 221 is present in a different information processing device, the control unit 11 may acquire the control program 221 from the different information processing device. If the control program 221 is acquired, then the control unit 11 causes the processing to proceed to next Step S102.

Note that the control program 221 may be described using at least any of a ladder diagram language, a function block diagram language, a structured text language, an instruction list language, a sequential function chart language, and a C language such that the control program 221 can be executed by the PLC 2. As well as these, the control program 221 may be described using a program language such as Java (registered trademark), Python, C++, Ruby, or Lua, for example. The type of the control program 221 may not be limited in particular and may be appropriately selected in accordance with an embodiment.

[Step S102]

In Step S102, the control unit 11 operates as the program analysis unit 112 and extracts the pattern of the dependency relations among the device variables 31 for the input parameters or the output parameters of the instances of the functions through execution of dependency analysis on the acquired control program 221.

<Dependency Analysis>

Figure 6:
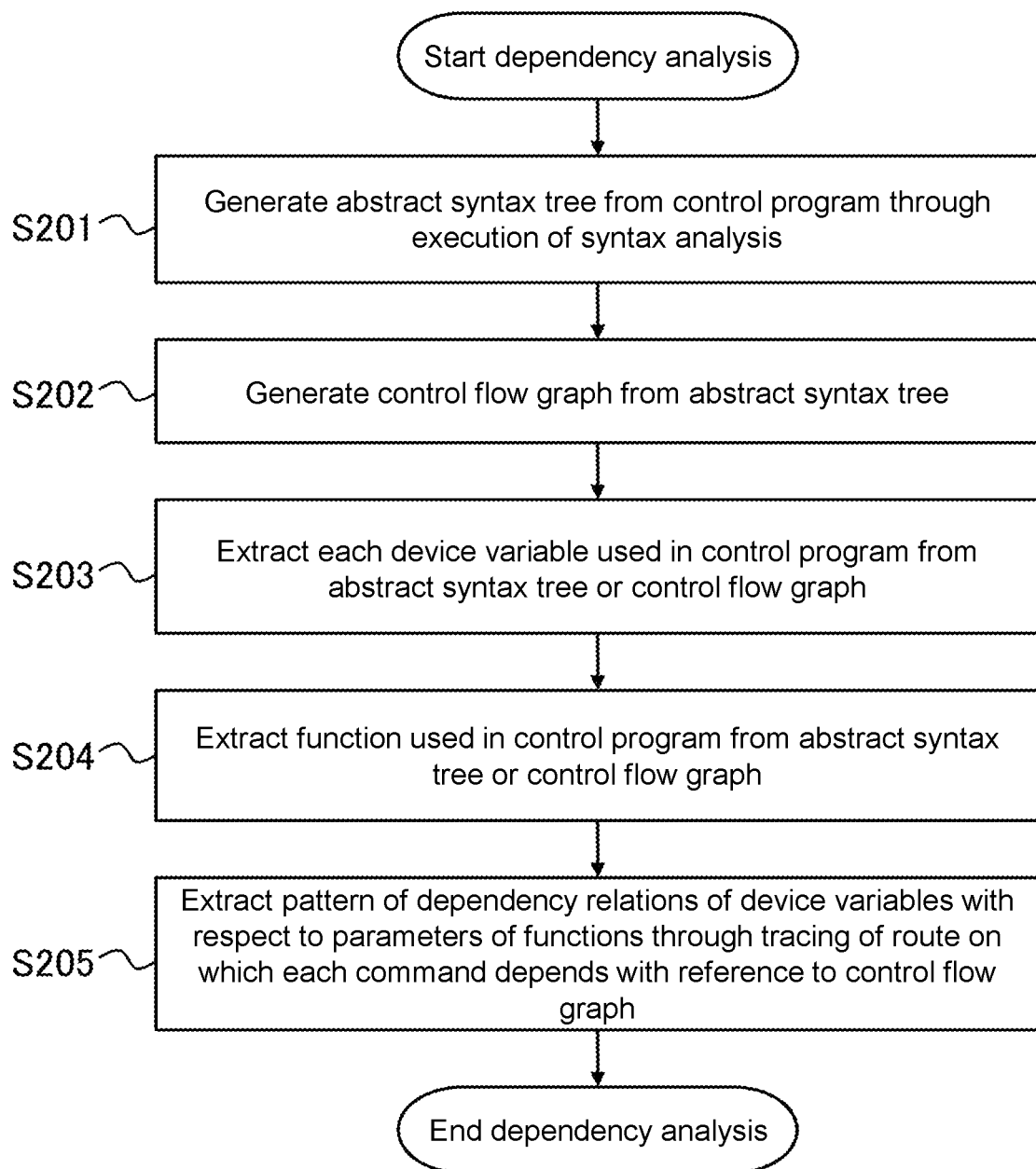
FIG. 6 illustrates an example of a processing procedure for dependency analysis performed by the analysis device according to the embodiment.

Here, an example of the processing in Step S102 will be described in detail using FIG. 6. FIG. 6 illustrates an example of a processing procedure for dependency analysis performed by the analysis device 1 according to the present embodiment. The processing in Step S102 according to the present embodiment includes processing in Steps S201 to S205 below. However, the processing procedure described below is merely an example, and each process may be changed as long as possible. Also, it is possible to appropriately omit, replace, and add steps in regard to the processing procedure described below in accordance with an embodiment.

(Step S201)

In Step S201, the control unit 11 generates an abstract syntax tree from the control program 221 through execution of syntax analysis on the control program 221. For the generation of the abstract syntax tree, a known syntax analysis method based on top-down syntax analysis or bottom-up syntax analysis may be used. Also, for the generation of the abstract syntax tree, a syntax analyzer handling character sequences in accordance with a specific grammatical form may be used. The method of the syntax analysis may not be limited, in particular, and may be appropriately selected in accordance with an embodiment.

An example of the abstract syntax tree to be generated will be described using FIGS. 7 and 8. FIG. 7 illustrates an example of the control program 221 to be acquired. FIG. 8 illustrates an abstract syntax tree 222 generated from the control program 221 in FIG. 7. In the example in FIG. 7, a situation in which the control program 221 described in a structured text (ST) language has been acquired is assumed. The control program 221 illustrated as an example in FIG.

7 includes four device variables (D1, D2, D3, and D4), an instance (Inst_MyFB) of one user defined function (My_FB), and instances (Inst_StdFB1 and Inst_StdFB2) of two standard functions (Std_FB1 and Std_FB2). The user defined function (My_FB) includes three input parameters (Enable, Arg1, and Arg2) and two output parameters (Out1 and Out2). The standard function (Std_FB1) includes three input parameters (Execute, Input1, and Input2) and one output parameter (Out). The standard function (Std_FB2) includes two input parameters (Execute and Input) and two output parameters (Out1 and Out2) (See FIG. 14, which will be described later, together).

The control program 221 illustrated as an example in FIG. 7 is divided into two subprograms (2211 and 2212). The subprogram 2211 (Program0/Section0) is called first and executed. Details of the user defined function (My_FB) are described in the subprogram 2212. It is possible to obtain the abstract syntax tree 222 illustrated in FIG. 8 by executing syntax analysis on the control program 221. In the example in FIG. 8, the abstract syntax tree is obtained for each of the subprograms (2211 and 2212). The abstract syntax tree 222 indicates variables (including parameters), operators, and relations among nodes (relations between arithmetic operations and targets of the arithmetic operations and the like) used in the control program 221.

Note that in FIG. 8, the abstract syntax tree is expressed by a nest structure using brackets. For example, it is possible to obtain an abstract syntax tree "(=a (+b 1))" can be obtained through execution of syntax analysis on "a=b+1". In the abstract syntax tree expressed by the next structure, "=" is a root node. "a" is a leaf node coupled to the root node "=" while "+" is an inner node coupled to the root node "=". "b" and "1" are leaf nodes coupled to the inner node "+". If the generation of the abstract syntax tree is completed, then the control unit 11 causes the processing to proceed to next Step S202.

(Step S202)

Returning to FIG. 6, the control unit 11 executes flow analysis using the generated abstract syntax tree in Step S202. The method of the flow analysis may not be limited, in particular, and may be appropriately selected in accordance with an embodiment. For the flow analysis, a known method may be employed. In this manner, the control unit 11 generates, from the abstract syntax tree, a control flow graph indicating a route on which each command included in the control program 221 depends.

Figure 9:
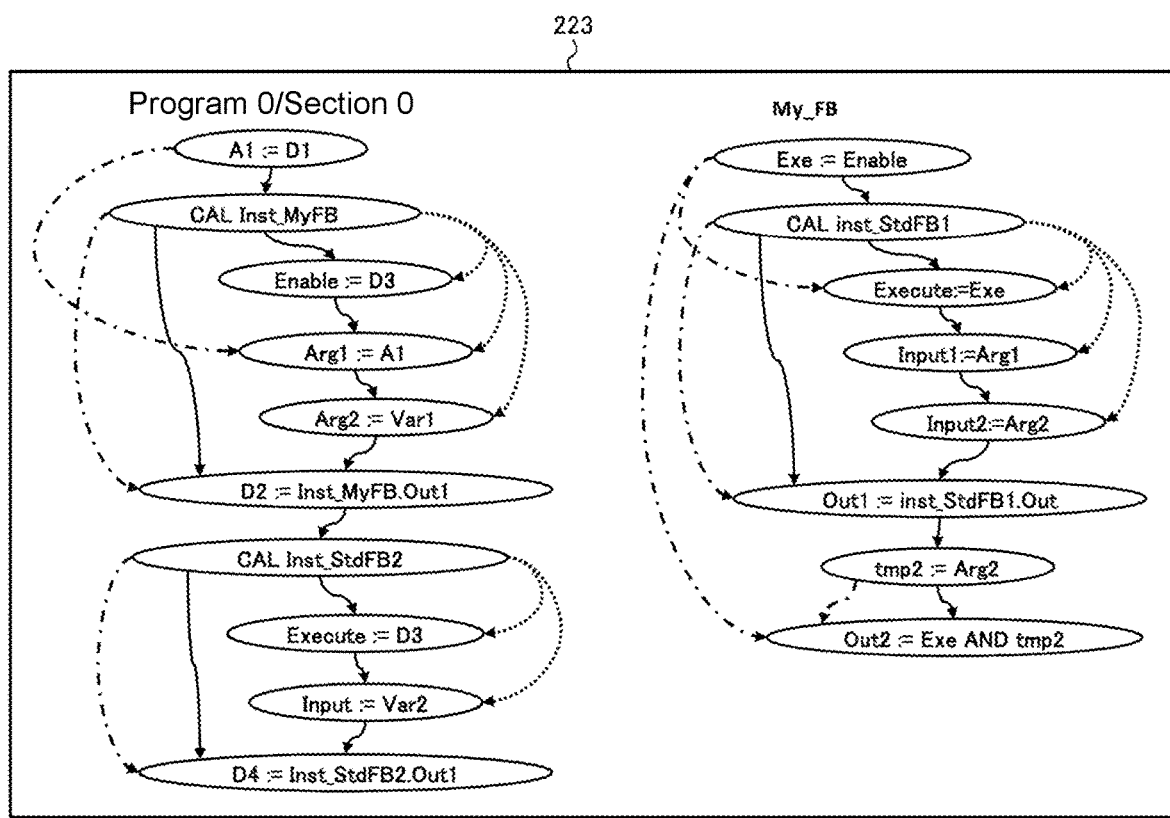
FIG. 9 illustrates an example of a control flow graph obtained from the abstract syntax tree in FIG. 8.

FIG. 9 illustrates an example of the control flow graph 223 obtained from the abstract syntax tree 222 in FIG. 8. The control flow graph 223 indicates a flow of the processing performed by the control program 221 (solid line arrow), dependency of data (one-dotted chain line arrow), and dependency of control (dotted arrow). The flow of the processing indicates an order in which the processing in the control program 221 is executed. For example, the control program 221 executes processing of "CAL Inst_MyFB" after processing of "A1:=D1". Therefore, "A1:=D1" and "CAL Inst_MyFB" are connected with the arrow representing the flow of the processing in the control flow graph 223.

Dependency of data indicates relations of processing that have influences. For example, a result of the processing "A1:=D1" affects the processing "Arg1:=A1" in the control program 221. Therefore, "A1:=D1" and "Arg1:=A1" are connected with an arrow indicating the dependency of data in the control flow graph 223. Also, dependency of control indicates relations of processing to determine availability of execution through conditional branches or the like. For example, "Enable:=D3", "Arg1:=A1", and "Arg2:=Var1" are executed in response to execution of "CAL Inst_MyFB" in the control program 221. Therefore, "CAL Inst_MyFB" is connected to "Enable:=D3". "Arg1:=A1", and "Arg2:Var1" with arrows indicating the dependency of control.

According to the generated control flow graph, it is possible to specify dependency relations among processes including arithmetic operations of variables in the control program 221. If the generation of the control flow graph is completed, then the control unit 11 causes the processing to proceed to next Step S203.

(Step S203 and Step S204)

Returning to FIG. 6, the control unit 11 extracts the device variables 31 used in the control program 221 from the abstract syntax tree or the control flow graph in Step S203. A method of extracting the device variables 31 used in the control program 221 may be appropriately selected in accordance with an embodiment.

In one example, the control unit 11 may extract the device variables 31 being used from the abstract syntax tree or the control flow graph with reference to a list of the device variables. Specifically, the control unit 11 specifies each variable used in the control program 221 from the abstract syntax tree or the control flow graph. Next, the control unit 11 determines whether or not each specified variable is a device variable through matching of each specified variable with the list of the device variables. The control unit 11 can thus extract each device variable 31 used in the control program 221. Note that the form of the list of the device variables may not be limited, in particular, and may be appropriately set in accordance with an embodiment. Also, the list of the device variables may be provided in response to designation from the user or may be held in the system in advance. The list of the device variables may be stored in the storage unit 12.

In next Step S204, the control unit 11 extracts, from the abstract syntax tree or the control flow graph, a function calling expression for calling instances of the functions (user defined functions and the standard functions) used in the control program 221. A method for extracting the calling expression of the function being used may be appropriately selected in accordance with an embodiment.

In one example, the control unit 11 may extract the calling expression of the function being used from the abstract syntax tree or the control flow graph with reference to the list of the functions similarly to the method for extracting the device variables 31. Note that the form of the list of the functions may not be limited, in particular, and may be appropriately set in accordance with an embodiment. Also, the list of the functions may be provided in response to designation from the user or may be held in the system in advance. The list of the functions may be stored in the storage unit 12. A list of the standard functions from among the functions may be obtained from the function structure information 121. Also, a list of the user defined functions may be obtained from names of subprograms or the like in the control program 221. In another example in which the function calling expression is extracted, the control unit 11 may extract a pattern corresponding to the function calling expression on the basis of a language specification of the control program 221.

In the aforementioned one example, the four device variables (D1, D2, D3, and D4) can be extracted from the abstract syntax tree 222 (FIG. 8) or the control flow graph 223 (FIG. 9) in Step S203. Also, it is possible to extract, from the abstract syntax tree 222 or the control flow graph 223, a calling expression of the instance (Inst_MyFB) of the one user defined function (My_FB) and the instances (Inst- _StdFB1 and Inst_StdFB2) of the two standard functions (Std_FB1 and Std_FB2) in Step S204. Note that the processing order of Step S203 and S204 may be exchanged. If the extraction of each device variable 31 and the function calling expression used in the control program 221 is completed, then the control unit 11 causes the processing to proceed to next Step S205.

(Step S205)

In Step S205, the control unit 11 extracts the pattern of the dependency relations among the device variables 31 extracted for the input parameters or the output parameters of the extracted instance of function by tracking the route on which each command depends, with reference to the control flow graph. A method of extracting the pattern of the dependency relations on the basis of the control flow graph may not be limited, in particular, and may be appropriately set in accordance with an embodiment.

It is assumed that no instance of a standard function is interposed between two device variables that have a dependency relation therebetween. In this case, when the two device variables directly have a dependency relation, it is possible to track the route from one of the device variables to the other device variable in the control flow graph. Among the plurality of device variables 31 included in the control program 221, such a device variable that directly has a dependency relation with another device variable may be present. Also, even if an instance of at least one user defined function is interposed between two device variables, details of the user defined function are described in the control program 221, and it is thus possible to trace the route from one of the device variables to the other device variable in the control flow graph. Note that at this time, the internal structure of the user defined function is specified in the process of tracing the route.

On the other hand, it is assumed that an instance of a standard function is interposed between two device variables that have a dependency relation therebetween. In this case, since details of the standard function are not described in the control program 221, it is not possible to trace a route from one of the device variables to the other device variable in the control flow graph. In other words, the searching for the route starting from the device variable at the start point ends at a timing at which a parameter of the standard function is reached.

Thus, in the present embodiment, the control unit 11 traces a route of dependency of data or control until an input parameter or an output parameter of the instance at a terminal end or another device variable is reached from each extracted device variable 31 at a start point in the control flow graph. For the aforementioned reason, the instance at the terminal end is an instance of the standard function. In this manner, the control unit 11 extracts the pattern of the dependency relations among the device variables 31.

<Extraction Processing>

Figure 10A:
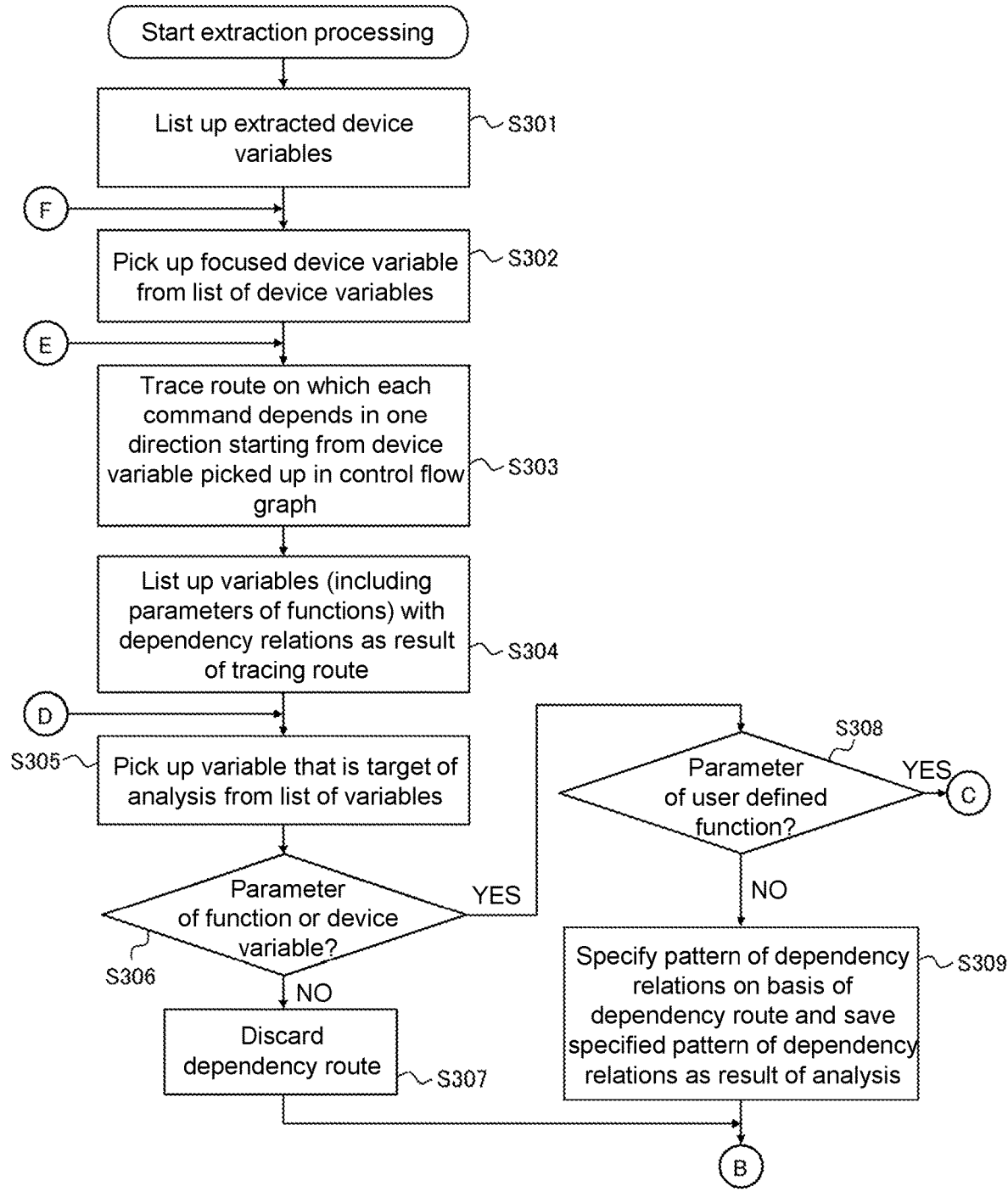
FIG. 10A illustrates an example of a processing procedure performed by the analysis device to extract a dependency pattern according to the embodiment.
Figure 10B:
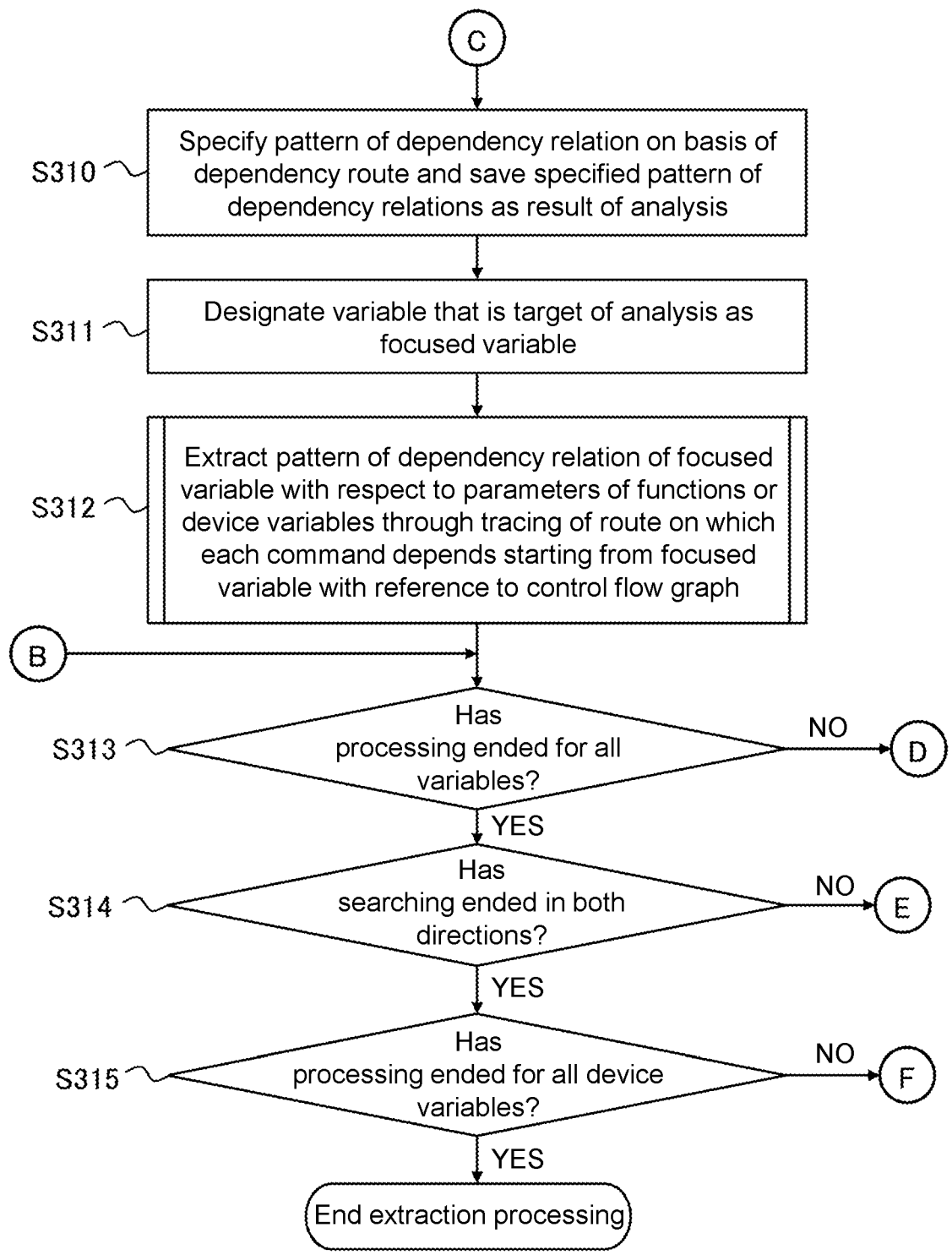
FIG. 10B illustrates an example of the processing procedure performed by the analysis device to extract a dependency pattern according to the embodiment.

Here, an example of the processing in Step S205 will be described in detail further using FIGS. 10A and 10B. FIGS. 10A and 10B illustrate an example of a processing procedure for extracting a pattern of dependency relations in the analysis device 1 according to the present embodiment. The processing in Step S205 according to the present embodiment includes processing in Steps S301 to S315 below. However, the processing procedure described below is merely an example, and each process may be changed as long as possible. Also, it is possible to appropriately omit, replace, and add steps in regard to the processing procedure described below in accordance with an embodiment.

(Step S301)

In Step S301, the control unit 11 lists up the device variables 31 extracted in Step S203. In the aforementioned example in FIGS. 8 and 9, four device variables (D1, D2, D3, and D4) are listed up. If the extracted device variables 31 are listed up, then the control unit 11 causes the processing to proceed to next Step S302.

(Steps S302 to S304)

In Step S302, the control unit 11 picks up a device variable to be focused (hereinafter, also referred to as a "focused device variable") from the list of the extracted device variables 31. In Step S303, the control unit 11 traces, in one direction, a route on which each command depends (route indicating dependency of data or control) from the focused device variable picked up at a start point in the control flow graph. Note that the route of the dependency of data or control can be traced in two directions, namely a forward direction that follows the arrow direction and the reverse direction that goes against the arrow direction. Therefore, the control unit 11 selects any of these two directions as the aforementioned one direction and traces the route in the selected direction in Step S303. In Step S304, the control unit 11 lists up variables with dependency relations with the focused device variable (including parameters of the instance of the function) as a result of tracing the route. The variables with dependency relations are variables that appear on the route.

A situation in which the device variable "D1" has been picked up as a focused device variable in Step S302 in the aforementioned example in FIGS. 8 and 9 is assumed. In this case, in Step S303, it is possible to trace the route of dependency from "A1:=D1" to "Arg1:=A1". In next Step S304, the variables "A1" and "Arg1" are listed up. The variable "A1" is an example of a different variable other than the device variables 31, and the variable "Arg1" is an example of the input parameter of the instance of the user defined function (My_FB). If the variables with dependency relations are listed up, then the control unit 11 causes the processing to proceed to next Step S305.

(Step S305 and Step S306)

In Step S305, the control unit 11 picks up a variable that is a target of analysis from the list of the variables with dependency relations. The variable that is the target of analysis is any of a parameter (an input parameter or an output parameter) of an instance of a function (a standard function or a user defined function), a device variable, a different variable other than device variables.

Thus, in next Step S306, the control unit 11 determines whether the variable that has been picked up as a target of analysis is a parameter of an instance of a function or a device variable. In a case in which it is determined that the variable that is the target of analysis is a parameter of an instance of a function or a device variable, the control unit 11 causes the processing to proceed to next Step S308. On the other hand, in a case in which it is determined that the variable that is the target of analysis is neither a parameter of an instance of a function nor a device variable, that is, in a case in which the variable that is the target of analysis is a different variable other than device variables, the control unit 11 causes the processing to proceed to next Step S307.

In a case in which the variable "Arg1" has been picked up as the variable that is the target of analysis in Step S305 in the aforementioned example, for example, the control unit 11 determines that the variable that is the target of analysis is a parameter of an instance of a function and causes the processing to proceed to next Step S308. On the other hand, in a case in which the variable "A1" has been picked up as the variable that is the target of analysis in Step S305 in the aforementioned example, the control unit 11 determines that the variable that is the target of analysis is neither a parameter of an instance of a function nor a device variable and causes the processing to proceed to next Step S307.

(Step S307)

Step S307 is executed in a case in which the variable that has been picked up as the target of analysis in Step S305 is a different variable other than device variables. In this case, the route of dependency from the focused device variable to the variable that is the target of analysis merely indicates a dependency relation between the focused device variable and the different variable. Therefore, in S307, the control unit 11 discards the route of dependency to the variable that is the target of analysis. After the route of dependency is discarded, the control unit 11 causes the processing to proceed to next Step S313.

(Step S308)

In Step S308, the control unit 11 determines whether or not the variable that has been picked up as the target of analysis is a parameter of an instance of a user defined function. In a case in which it is assumed that the variable that is the target of analysis is a parameter of an instance of a user defined function, the control unit 11 causes the processing to proceed to next Step S310. On the other hand, in a case in which it is determined that the variable that is the target of analysis is not a parameter of an instance of a user defined function, that is, in a case in which the variable that is the target of analysis is a parameter of an instance of a standard function or a device variable, the control unit 11 causes the processing to proceed to next Step S309.

(Step S309)

Step S309 is executed in a case in which the variable that has been picked up as a target of analysis in Step S305 is a parameter of an instance of a standard function or a device variable. From the viewpoint of specifying dependency relations among the device variables 31, the device variable (particularly, the different device variable other than the focused device variable) is at a terminal end of searching for the route starting from the focused device variable. Also, since details of the standard function are not described in the control program 221, the parameter of the instance of the standard function is also at a terminal end of the searching for the route starting from the focused device variable. In other words, the searching for the route starting from the focused device variable ends at a timing at which the parameter of the instance of the standard function or the device variable is reached.

Therefore, in Step S309, the control unit 11 specifies a pattern of a dependency relation of the focused device variable on the basis of the route of dependency passed from the focused device variable to the variable that is the target of analysis. In a case in which the variable that is the target of analysis is a device variable, a pattern of a dependency relation between the device variable and the focused device variable is specified. On the other hand, in a case in which the variable that is the target of analysis is a parameter of an instance of a standard function, the control unit 11 specifies a pattern of a dependency relation between the parameter of the instance of the standard function and the focused device variable. The control unit 11 saves the specified pattern of the dependency relation as a result of analysis. Note that in a case in which the route of dependency from the focused device variable to the variable that is the target of analysis includes a different variable other than the device variable, the control unit 11 also saves, as a result of analysis, information regarding the different variable included in the route. After saving the result of analysis, the control unit 11 causes the processing to proceed to next Step S313.

(Steps S310 to S312)

Steps S310 to S312 are executed in a case in which the variable that has been picked up as a target of analysis in Step S305 is a parameter of an instance of a user defined function. In a case in which the variable that is the target of analysis is a parameter of an instance of a user defined function, details of the user defined function are described in the control program 221, and it is thus possible to further trace the route of dependency toward the inside of the user defined function starting from the variable that is the target of analysis. Thus, the control unit 11 saves the result of analysis up to the instance of the user defined function, then sets the variable that is the target of analysis as a new start point, and continues the processing of tracing the route of dependency.

Specifically, in Step S310, the control unit 11 specifies a pattern of a dependency relation in regard to the focused device variable on the basis of the route of dependency passed from the focused device variable to the variable that is the target of analysis. In this situation, a pattern of a dependency relation between the parameter of the instance of the user defined function and the focused device variable is specified. The control unit 11 saves the specified pattern of the dependency relation as a result of analysis. Similarly to Step S309, in a case in which the route from the focused device variable to the variable that is the target of analysis includes a different variable other than device variables, the control unit 11 also saves the information of the different variable included in the route as a result of analysis.

In next Step S311, the control unit 11 designates the variable that is the target of analysis as a new focused variable. Then, in next Step S312, the control unit 11 extracts a pattern of a dependency relation of the focused variable with respect to a parameter of a function or a device variable by tracing a route on which each command depends, starting from the focused variable with reference to the control flow graph. Details of the subroutine in Step S312 will be described later. If the extraction of the pattern of the dependency relation in Step S312 is completed, then the control unit 11 causes the processing to proceed to next Step S313.

(Step S313)

In Step S313, the control unit 11 determines whether or not processing in and after Step S305 has ended in regard to all the variables listed up in Step S304. If variables on which the processing in and after Step S305 has not been executed remain in the list, then the control unit 11 determines that the processing in and after Step S305 has not yet ended for all the variables listed up. In this case, the control unit 11 returns the processing to Step S305, picks up another variable remaining in the list as a variable that is a target of analysis, and repeats the processing in and after Step S306 thereon. Otherwise, the control unit 11 determines that the processing has ended for all the variables listed up and causes the processing to proceed to next Step S314.

(Step S314)

In Step S314, the control unit 11 determines whether or not the series of processes in Steps S303 to S313 related to the searching for the route starting from the focused device variable have ended in both directions, namely in the forward direction and in the reverse direction. In a stage in which the series of processes in Steps S303 to S313 have been executed only once, the processing related to the searching for the route has not yet ended in both the directions. In this stage, the control unit 11 determines that the processing related to the searching for the route has not yet ended in both the directions, returns the processing to Step S303, changes the direction in which the route is traced to the other direction, and repeats the processing in and after Step S303 thereon. In a case in which the route of dependency is traced in the forward direction at first, the control unit 11 traces the route of dependency in the reverse direction in the next processing related to the searching for the route. On the other hand, if the series of processes are executed twice through the repetition of the processing, the processing related to the searching for the route in both the directions ends. In this stage, the control unit 11 determines that the processing related to the searching for the route has ended in both the directions and causes the processing to proceed to next Step S315.

(Step S315)

In Step S315, the control unit 11 determines whether or not the processing in and after Step S302 has ended for all the device variables listed up in Step S301. If device variables on which the processing in and after Step S302 has not been executed remain in the list, the control unit 11 determines that the processing in and after Step S302 has not yet ended for all the device variables listed up. In this case, the control unit 11 returns the processing to Step S302, picks up, as a focused device variable, another device variable remaining in the list, and repeats the processing in and after Step S303 thereon. Otherwise, the control unit 11 determines that the processing has ended for all the device variables listed up and ends the processing for extracting the pattern of the dependency relation. Since the series of processes in Step S205 thus ends, the processing of dependency analysis in Step S102 is completed. If the processing of the dependency analysis in Step S102 is completed, the control unit 11 causes the processing to proceed to next Step S103.

<Subroutine for Extraction Processing>

Figure 11A:
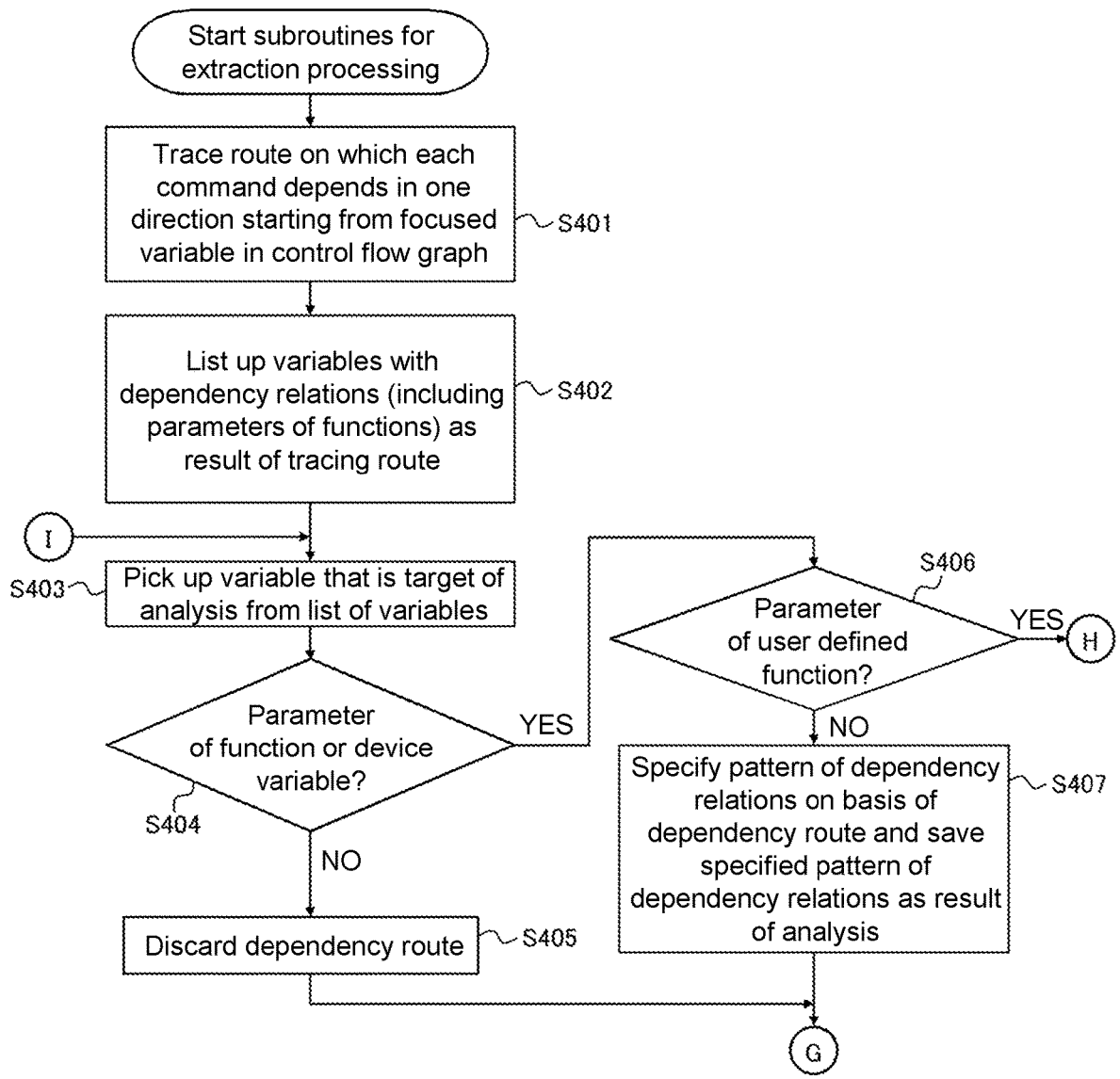
FIG. 11A illustrates an example of a processing procedure (subroutine) performed by the analysis device to extract a dependency pattern related to a user defined function according to the embodiment.
Figure 11B:
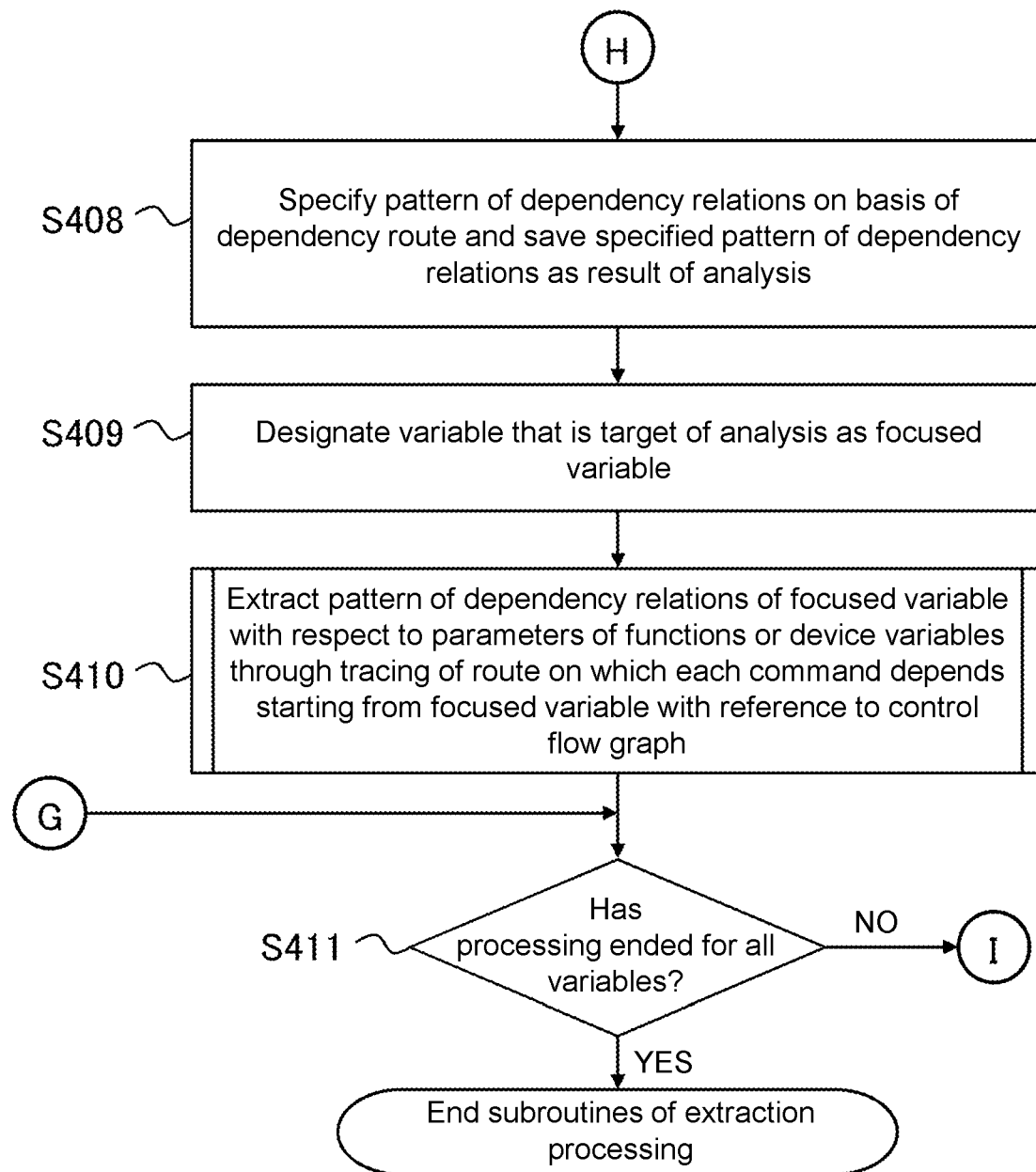
FIG. 11B illustrates an example of the processing procedure (subroutine) performed by the analysis device to extract a dependency pattern related to a user defined function according to the embodiment.

Next, an example of the processing in Step S312 will be described in detail further using FIGS. 11A and 11B. FIGS. 11A and 11B illustrate an example of a processing procedure (subroutine) for extracting a dependency pattern related to a user defined function performed by the analysis device 1 according to the present embodiment. The processing in Step S312 according to the present embodiment includes processing in Steps S401 to S411 below. However, the processing procedure described below is merely an example, and each process may be changed as long as possible. Also, it is possible to appropriately omit, replace, and add steps in regard to the processing procedure described below in accordance with an embodiment.

In a series of processes in Steps S401 to S411, searching for a route of dependency starting from a parameter of an instance of a user defined function is executed. Therefore, the series of processes in Steps S401 to S411 are similar to the series of processes in Steps S303 to S313 in which the focused device variable picked up in Step S302 is replaced with a focused variable designated in Step S311.

(Step S401 and Step S402)

In other words, the control unit 11 traces the route on which each command depends in one direction starting from a designated focused variable in the control flow graph in Step S401. In Step S401, the control unit 11 traces the route of dependency in the direction selected in Step S303. In Step S402, the control unit 11 lists up variables (including parameters of instances of functions) with dependency relations with the focused variable as a result of tracing the route.

(Step S403 and Step S404)

In Step S403, the control unit 11 picks up a variable that is a target of analysis from the list of the variables with the dependency relations. In Step S404, the control unit 11 determines whether or not the variable that has been picked up as a target of analysis is a parameter of an instance of a function or a device variable. In a case in which it is determined that the variable that is the target of analysis is a parameter of an instance of a function or a device variable, the control unit 11 causes the processing to proceed to next Step S406. On the other hand, in a case in which it is determined that the variable that is the target of analysis is neither a parameter of an instance of a function nor a device variable, that is, in a case in which the variable that is the target of analysis is a different variable other than device variables, the control unit 11 causes the processing to proceed to next Step S405.

(Step S405)

In Step S405, the control unit 11 discards the route of dependency up to the variable that is the target of analysis. After discarding the route of dependency, the control unit 11 causes the processing to proceed to next Step S411.

(Step S406)

In Step S406, the control unit 11 determines whether or not the variable that has been picked up as a target of analysis in Step S403 is a parameter of an instance of a user defined function. In a case in which it is determined that the variable that is the target of analysis is a parameter of an instance of a user defined function, the control unit 11 causes the processing to proceed to next Step S408. On the other hand, in a case in which it is determined that the variable that is the target of analysis is not a parameter of an instance of a user defined function, that is, in a case in which the variable that is the target of analysis is a parameter of an instance of a standard function or a device variable, the control unit 11 causes the processing to proceed to next Step S407.

(Step S407)

In Step S407, the control unit 11 specifies a pattern of a dependency relation in regard to the focused variable on the basis of the route of dependency passed from the focused variable to the variable that is the target of analysis. Then, the control unit 11 saves the specified pattern of the dependency relation as a result of analysis. Note that the route of dependency from the focused variable to the variable that is the target of analysis includes a different variable other than device variables, the control unit 11 saves information regarding the different variable included in the route as a result of analysis. After saving the result of analysis, the control unit 11 causes the processing to proceed to next Step S411.

(Step S408 to Step S410)

In Step S408, the control unit 11 specifies a pattern of a dependency relation in regard to the focused variable on the basis of the route of dependency passed from the focused variable to the variable that is the target of analysis and saves the specified pattern of the dependency relation as a result of analysis. Similarly to Step S407, in a case in which the route of dependency from the focused variable to the variable that is the target of analysis includes a different variable other than the device variable, the control unit 11 also saves information regarding the different variable included in the route as a result of analysis.

In Step S409, the control unit 11 designates the variable that is the target of analysis as a new focused variable. Then, in Step S410, the control unit 11 extracts a pattern of a dependency relation of the focused variable with respect to the parameter of the function or the device variable by tracing the route on which each command depends starting from the focused variable with reference to the control flow graph. The processing in Step S410 is similar to that in Step S312. In other words, the control unit 11 executes the processing in Steps S401 to S411 on the newly designated focused variable. If the extraction of the pattern of the dependency relation in Step S410 is completed, the control unit 11 causes the processing to proceed to next Step S411.

Note that it is assumed that the instance of the user defined function of the newly focused variable is different from the instance of the user defined function of the original focused variable. In this case, the control unit 11 traces the route of dependency toward the inside of the user defined function starting from the newly focused variable in the processing in Step S410. On the other hand, it is assumed that the instance of the user defined function of the newly focused variable is the same as the instance of the user defined function of the original focused variable. In this case, the searching for the inside of the user defined function is completed by tracing the route of dependency from the original focused variable to the newly focused variable. In other words, the inner structure of the user defined function is specified by the route from the original focused variable to the newly focused variable. Therefore, in the processing in Step S410, the control unit 11 traces the route of dependency toward the outside of the user defined function starting from the newly designated focused variable.

(Step S411)

In Step S411, the control unit 11 determines whether or not the processing in and after Step S403 has ended for all the variables listed up in Step S402. If variables on which the processing in and after Step S403 has not been executed remain in the list, the control unit 11 determines that the processing in and after Step 403 has not yet ended for all the variables listed up. In this case, the control unit 11 returns the processing to Step S403, picks up another variable remaining in the list as a variable that is a target of analysis, and repeats the processing in and after Step S404 thereof. Otherwise, the control unit 11 determines that the processing has ended for all the variables listed up and completes the processing of the subroutine. If the processing of the subroutine has been completed, then the control unit 11 causes the processing to proceed to next Step S313 (Step S411 of the previous subroutine in a case in which the processing of the subroutine is repeated in Step S410).

Note that Steps S312 and S410 are processing of continuing the processing of tracing the route of dependency for the same focused device variable, which has been executed before the steps, starting from the newly focused variable. Therefore, the control unit 11 saves a result of analysis obtained after the continuation in association with the result of analysis obtained before the continuation. Specifically, the control unit 11 saves the result of analysis in Step S407 or S408 such that the result of analysis in Step S407 or S408 is subordinate to the result of analysis in Step S310 (Step S408 of the previous subroutine in a case in which the processing of the subroutine is repeated in Step S410).

Using FIG. 12, an example of a result of extracting a pattern of dependency relations through the aforementioned extraction processing will be described. FIG. 12 illustrates an example of extraction result data 224 indicating the result of extracting a pattern of dependency relations from the control flow graph 223 in FIG. 9. In the example in FIG. 12, the extraction result data 224 has a table structure, and each record (row data) has fields of "NO", "PARENT", "DEVICE", "FOCUS", "DIRECTION", "VARIABLE", "PROGRAM", "INSTANCE", "FUNCTION", "PARAMETER", and "IO". One record corresponds to one result of analysis. However, a data structure of the extraction result may not be limited to such an example and may be appropriately determined in accordance with an embodiment.

In the "NO" field, each record number is stored. Each record number is used to identify a result of analysis. In the "PARENT" field, a record number indicating a result of analysis to which the result of analysis indicated by a target record is subordinate is stored in order to indicate a subordinate relationship of each result of analysis. For example, the result of analysis in Step S309 and Step S310 described above is not subordinate to any other results of analysis. Therefore, the "PARENT" field of the record indicating the result of analysis is blank (the first, third, fifth, seventh, and eighth records in FIG. 12, for example). On the other hand, the result of analysis in Step S407 or S408 described above is subordinate to the result of analysis in Step S310 (Step S408 of the previous subroutine in the case in which the processing of the subroutine is repeated in Step S410), for example. Therefore, the record number indicating the result of analysis of the subordinate destination is stored in the "PARENT" field of the record indicating the result of analysis (the second, fourth, and sixth record in FIG. 12, for example).

In the "DEVICE" field, a name of a device variable focused for extracting the pattern of the dependency relations (focused device variable) is stored. In the "FOCUS" field, a name of a variable at a start point from which the route of dependency is traced is stored. For example, the name of the focused device variable is stored in the "FOCUS" field of the record indicating the result of analysis in Steps S309 and Step S310 described above. On the other hand, the name of the focused variable is stored in the "FOCUS" field of the record indicating the result of analysis in Step S407 or S408 described above, for example.

In the "VARIABLE" field, the name of the variable with a dependency relation with the variable indicated in the "FOCUS" field is stored. Information of different variables included in the route of dependency extracted in Steps S309, 310, 407, AND 408 is stored in the "VARIABLE" field. In the "DIRECTION" field, information indicating the direction of the dependency relation between the variable indicated in the "FOCUS" field and the variable indicated in the "VARIABLE" field is stored. The direction of the dependency relation is specified in accordance with the direction in which the route of dependency is traced. In the "PROGRAM" field, information indicating the location of a program portion that provides the result of analysis indicated by the record of the target in the control program 221 is stored.

In the "INSTANCE" field, a name of an instance of a function with a dependency relation with the variable indicated in the "FOCUS" field is stored. In a case in which the variable that has been picked up as the target of analysis in Steps S305 and S403 is a parameter of an instance of a standard function or a user defined function, the name of the instance of the standard function or the user defined function is stored in the "INSTANCE" field. In the "FUNCTION" field, the name of the function of the instance indicated in the "INSTANCE" field is stored. In the "PARAMETER" field, a name of a parameter of a function with a dependency relation with the variable indicated in the "FOCUS" field is stored. In the "IO" field, information indicating the type (either an input parameter or an output parameter) of the parameter indicated in the "PARAMETER" field is stored. Note that in a case in which the variable that is the target of analysis is a device variable, a pattern of a dependency relation with respect to the device variable is extracted instead of a dependency relation with respect to a parameter of an instance of a function. Therefore, the "INSTANCE", "FUNCTION", "PARAMETER", and "IO" fields of the obtained record are blank.

It is assumed that in the aforementioned example in FIG. 9, the processing in Step S303 has been executed using the device variable "D1" as a focused device variable. In this case, the first record illustrated as an example in FIG. 12 (the record in which "NO" is "1") indicates the pattern of the dependency relation extracted as a result of tracing the route of dependency from "A1:=D1" to "Arg1:=A1". In other words, the first record indicates the result of analysis obtained by executing the processing in Step S310 after picking up the variable "Arg1" as a variable that is a target of analysis.

The variable "Arg1" is an example of an input parameter of an instance of the user defined function (My_FB). Therefore, the variable "Arg1" is designated as a newly focused variable, and the processing in Step S312 is executed thereon. The second record (the record in which "NO" is "2") indicates the pattern of the dependency relation extracted in Step S407 as a result of analysis obtained by executing the processing in Step S312 after obtaining the first record, that is, as a result of referring to "Input1:=Arg1". Therefore, the number of the first record is stored in the "PARENT" field of the second record. Note that specifically, the second record indicates that the focused variable "Arg1" has a dependency relation with the input parameter "Input1" of the instance of the standard function (Std_FB1).

[Step S103 and Step S104]

Returning to FIGS. 5A and 5B, the control unit 11 operates as the definition determination unit 113 and refers to the function structure information 121 that defines a dependency relation between an input parameter and an output parameter of a standard function in Step S103. Then, the control unit 11 determines whether or not instances of one or more undefined standard functions, for which no dependency relations have been defined by the function structure information 121, are included in the control program 221. Note that the control unit 11 acquires the function structure information 121 before executing Step S103. In the present embodiment, the function structure information 121 is held in the storage unit 12. Therefore, the control unit 11 acquires the function structure information 121 from the storage unit 12. However, the acquisition destination of the function structure information 121 may not be limited to such an example and may be appropriately selected in accordance with an embodiment.

A method of determining whether or not instances of undefined standard functions are included in the control program 221 may be appropriately determined in accordance with an embodiment. For example, the control unit 11 matches whether or not the standard functions 41 from among the functions extracted in Step S204 have been defined by the function structure information 121. In a case in which the standard functions not defined by the function structure information 121 are included in the standard functions 41 extracted in Step S204, the control unit 11 determines that instances of one or more undefined standard functions are included in the control program 221. On the other hand, in a case in which definition of all the standard functions 41 extracted in Step S204 is present in the function structure information 121, the control unit 11 determines that no instances of undefined standard functions are included in the control program 221.

In Step S104, the control unit 11 determines a branching destination of the processing on the basis of the result of determination in Step S103. In a case in which it is determined that instances of one or more undefined standard functions are included in the control program 221 in Step S103, the control unit 11 causes the processing to proceed to next Step S105. On the other hand, in a case in which no instances of undefined standard functions are included in the control program 221 in Step S103, the control unit 11 omits the processing in Step S105 and causes the processing to proceed to next Step S106.

[Step S105]

In Step S105, the control unit 11 operates as a definition receiving unit 114 and receives an input of the additional function structure information 123 that defines dependency relations between input parameters and output parameters of the undefined standard functions. The method of receiving the input of the additional function structure information 123 may be appropriately determined in accordance with an embodiment. For example, the control unit 11 may receive the input of the definition in regard to the undefined standard functions via the input device 14. Also, the control unit 11 may receive data that describes the definition of the undefined standard functions, for example. If the additional function structure information 123 is input in this manner, then the control unit 11 causes the processing to proceed to next Step S106.

[Step S106 and Step S107]

In Step S106, the control unit 11 operates as the definition applying unit 115 and specifies the dependency relation between the input parameter 43 and the output parameter 44 of the instance of the one or more standard functions 41 included in the control program 221 on the basis of the function structure information 121. In a case in which Step S105 described above has been executed, the control unit 11 specifies the dependency relation between the input parameter 43 and the output parameter 44 of the instance of the one or more standard functions 41 included in the control program 221 on the basis of the function structure information 121 and the additional function structure information 123. In other words, the control unit 11 specifies dependency relations between input parameters and output parameters of instance of the one or more undefined standard functions from among the one or more standard functions 41 on the basis of the input additional function structure information 123.

In Step S107, the control unit 11 operates as the relation specifying unit 116 certifies that one device variable with a dependency relation with an input parameter of an instance of a certain function has a dependency relation with a different device variable with a dependency relation with an output parameter of the instance of the same function that has the dependency relation with the input parameter in the extracted pattern of the dependency relation. In this manner, the control unit 11 specifies the dependency relations among the device variables 31.

<Specification Processing>

Figure 13A:
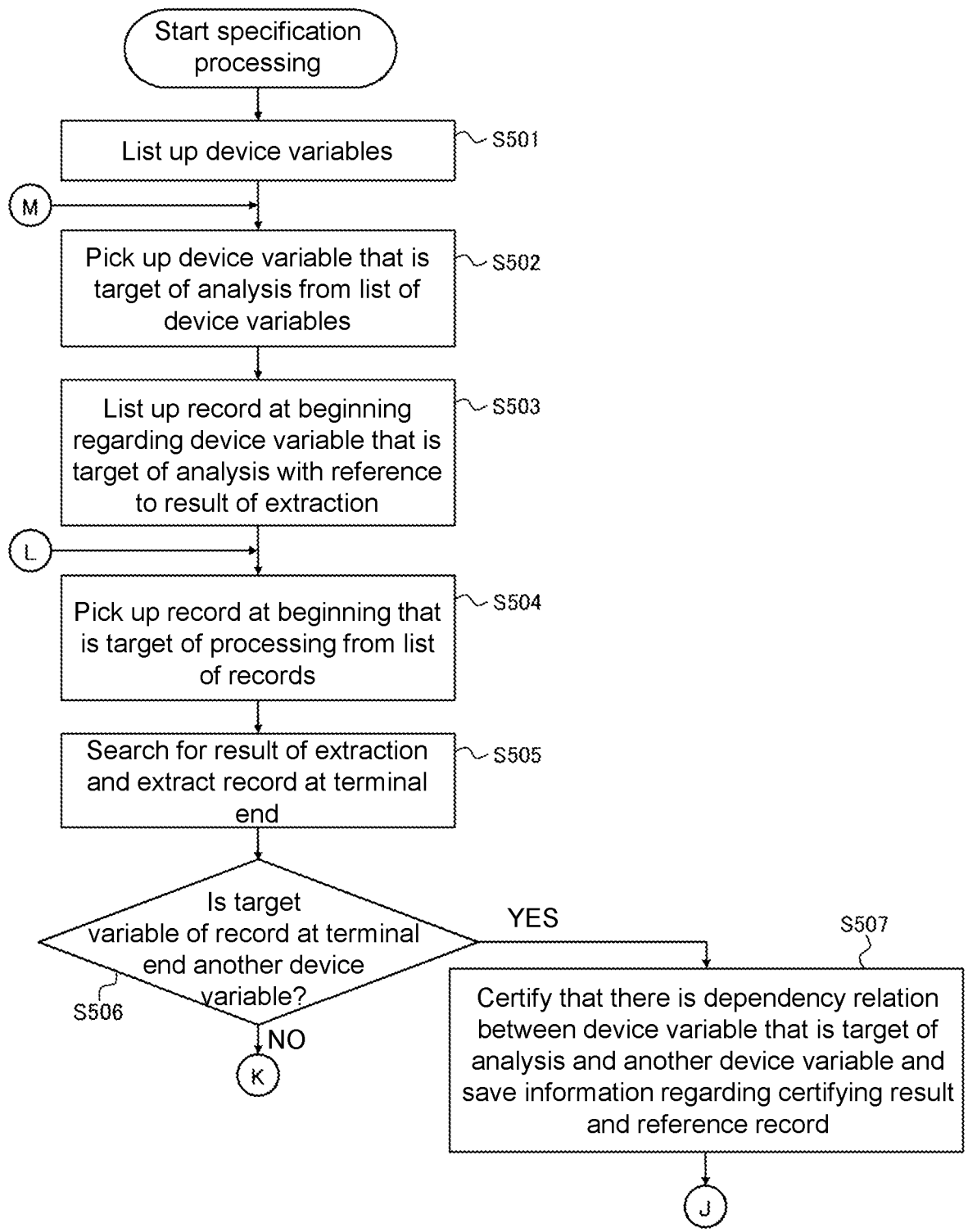
FIG. 13A illustrates an example of a processing procedure performed by the analysis device to specify dependency relations among device variables according to the embodiment.
Figure 13B:
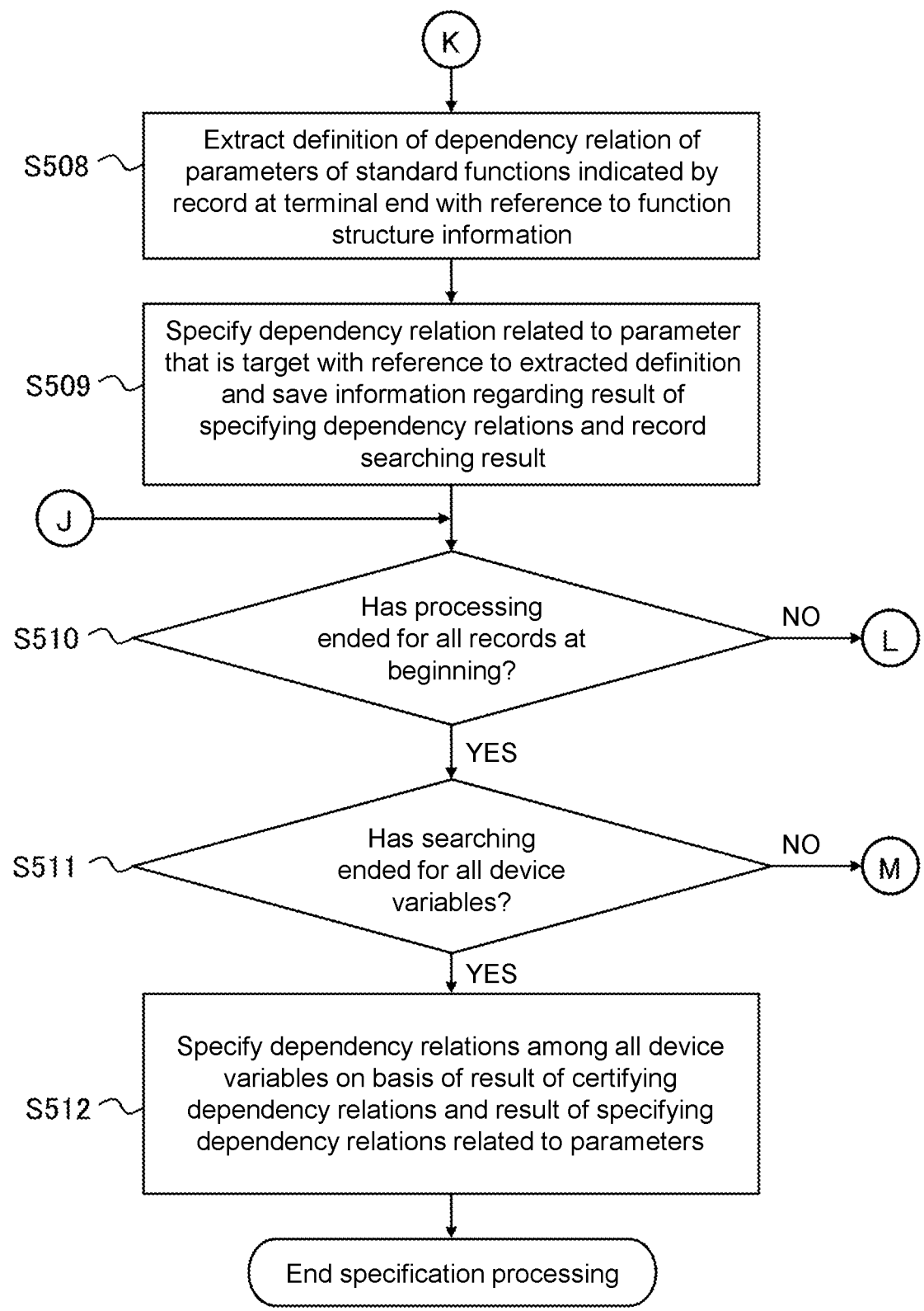
FIG. 13B illustrates an example of the processing procedure performed by the analysis device to specify dependency relations among device variables according to the embodiment.

Here, an example of the processing in Steps S106 and S107 will be described in detail using FIGS. 13A and 13B. FIGS. 13A and 13B illustrate an example of a processing procedure for specifying the dependency relations among the device variables 31 performed by the analysis device 1 according to the present embodiment. The processing in Steps S106 and 107 according to the present embodiment includes processing in Steps S501 to S512 described below. However, the processing procedure described below is merely an example, and each process may be changed as long as possible. Also, it is possible to appropriately omit, replace, and add steps in regard to the processing procedure described below in accordance with an embodiment.

(Step S501 to Step S503)

In Step S501, the control unit 11 lists up the device variables 31 used in the control program 221. Step S501 may be performed similarly to Step S301 described above. In Step S502, the control unit 11 picks up, from the list of the device variables, a device variable that is a target of analysis for a dependency relation (hereinafter, also referred to as a "device variable that is a target of analysis"). In Step S503, the control unit 11 lists up records at the beginning related to the device variable that is the target of analysis with reference to the result of extraction (extraction result data 224).

The record at the beginning indicates a pattern of the dependency relation extracted at first as a result of tracing the route of dependency. In other words, the record at the beginning is not subordinate to other records, and the "PARENT" field of the record at the beginning is blank. The control unit 11 can list up the record at the beginning related to the device variable that is the target of analysis with reference to the "PARENT" and "DEVICE" fields.

In the aforementioned example in FIG. 12, in a case in which the device variable "D1" is picked up as the device variable that is the target of analysis, for example, the control unit 11 picks up the first record as the record at the beginning related to the device variable "D1". On the other hand, in a case in which the device variable "D3" is picked up as the device variable that is the target of analysis, for example, the control unit 11 picks up the fifth and seventh records as records at the beginning related to the device variable "D3".

If the listing-up of the records at the beginning related to the device variable that is the target of analysis is completed, then the control unit 11 causes the processing to proceed to next Step S504.

(Step S504 and Step S505)

In Step S504, the control unit 11 picks up a record at the beginning that is a target of analysis processing from the list of the records at the beginning (the records at the beginning that have been listed up). In Step S505, the control unit 11 searches for each record of the result of extraction from the records at the beginning and extracts a record at a terminal end.

The record at the terminal end indicates a pattern of the dependency relation finally extracted as a result of tracing the route of dependency. In other words, the record at the terminal end is subordinate to no other records. The control unit 11 can extract the record at the terminal end by tracing each record of the result of extraction from the record at the beginning with reference to the "PARENT" and "DEVICE" fields. In a case in which a plurality of records at the terminal end are present with respect to one record at the beginning, the control unit 11 extracts all the records at the terminal end.

In the aforementioned example in FIG. 12, in a case in which the fifth record is picked up as a record at the beginning as a target of processing, for example, the control unit 11 extracts the sixth record as a record at the terminal end corresponding to the fifth record. Also, in a case in which the seventh record is picked up as a record at the beginning as a target of processing, for example, no records are subordinate to the seventh record, and the control unit 11 thus extracts the seventh record as it is as a record at the terminal end.

If the extraction of the record at the terminal end corresponding to the record at the beginning picked up is completed, then the control unit 11 causes the processing to proceed to next Step S506.

(Step S506)

According to the aforementioned extraction processing, the processing of tracing the route of dependency is continued in a case in which the variable that is the target of analysis is a parameter of an instance of a user defined function. On the other hand, in a case in which the variable that is the target of the analysis is a parameter of an instance of a standard function or a different device variable, the processing of tracing the route of dependency ends. Therefore, the record at the terminal end indicates the dependency relation with respect to the parameter of the instance of the standard function or the different device variable.

Thus, in Step S506, the control unit 11 determines whether or not the extracted record at the terminal end is related to the parameter of the instance of the standard function or the different device variable. The determination method may be appropriately determined in accordance with an embodiment. In the present embodiment, in a case in which the extracted record at the terminal end is related to the parameter of the instance of the standard function, the name of the parameter is stored in the "PARAMETER" field of the record at the terminal end. On the other hand, in a case in which the extracted record at the terminal end is related to the different device variable, the "PARAMETER" field of the record at the terminal end is blank. Therefore, the control unit 11 may determine whether the extracted record at the terminal end is related to the parameter of the instance of the standard function or the different device variable with reference to the value in the "PARAMETER" field.

In a case in which it is determined that the extracted record at the terminal end is related to the parameter of the instance of the standard function, the control unit 11 causes the processing to proceed to Step S508. On the other hand, in a case in which the extracted record at the terminal end is related to the different device variable, the control unit 11 causes the processing to proceed to next Step S507.

(Step S507)

In Step S507, the control unit 11 certifies that there is a dependency relation between the different device variable indicated by the record at the terminal end and the device variable that is the target of analysis and saves information regarding the certifying result and the reference record (not illustrated). The control unit 11 can acquire the name of the different device variable from the "VARIABLE" field of the record at the terminal end. The data form of the information regarding the certifying result and the reference record may be appropriately determined in accordance with an embodiment. If the saving of the information regarding the certifying result and the reference record is completed, then the control unit 11 causes the processing to proceed to next Step S510.

(Step S508 and Step S509)

In Step S508, the control unit 11 extracts a definition of the dependency relation for the parameter of the standard function indicated by the record at the terminal end with reference to the function structure information 121. In a case in which an input of the additional function structure information 123 is received in Step S105, the control unit 11 extracts the definition of the dependency relation for the parameter of the standard function indicated by the record at the terminal end with reference to the function structure information 121 and the additional function structure information 123. In Step S509, the control unit 11 specifies the dependency relation related to the parameter that is the target with reference to the extracted definition and saves the information regarding the result of specifying the dependency relation and the result of searching for the record.

Here, an example of the process of specifying the dependency relation related to the parameter of the standard function indicated by the record at the terminal end will be described further using FIGS. 14A and 14B. FIG. 14A schematically illustrates an example of the function structure information 121 (and the additional function structure information 123) according to the present embodiment. FIG. 14B illustrates an example of intermediate data 226 obtained as a result of the processing in Step S509.

In the example in FIG. 14A, the function structure information 121 has a table structure, and each record (row data) has "ID", "FB", "RAR_X", and "RAR_Y" fields. In the "ID" field, an identifier for identifying the dependency relation is stored. In the "FB" field, a name of a standard function for which the dependency relation is defined is stored. In the "RAR_X" field, a name of an input parameter for which the dependency relation is defined is stored. In the "RAR_Y" field, a name of an output parameter with a dependency relation with the input parameter indicated in the "RAR_X" field is stored. One record corresponds to one dependency relation between an input parameter and an output parameter of the standard function. However, the data structure of the function structure information 121 may not be limited to such an example and may be appropriately determined in accordance with an embodiment. The additional function structure information 123 is configured similarly to the function structure information 121.

In the present embodiment, the control unit 11 matches the value in the "FUNCTION" field of the record at the terminal end with the value of the "FB" field of each record of the function structure information 121 in Step S508. Also, the control unit 11 matches the value in the "PARAMETER" field of the record at the terminal end with the value in the "PAR_X" or "PAR_Y" field of each record of the function structure information 121. In a case in which the value in the "IO" field of the record at the terminal end is indicated to be an input parameter, the control unit 11 matches the value in the "PARAMETER" field of the record at the terminal end with "PAR_X" of each record of the function structure information 121. On the other hand, in a case in which the value in the "TO field" of the record at the terminal end is indicated to be an output parameter, the control unit 11 matches the value in the "PARAMETER" field" of the record at the terminal end with "PAR_Y" of each record of the function structure information 121. In this manner, the control unit 11 searches for each record of the function structure information 121 and extracts a record that defines the dependency relation of the parameter of the standard function indicated by the record at the terminal end. In a case in which an input of the additional function structure information 123 is received in Step S105, the control unit 11 further executes searching for the additional function structure information 123 as well. Note that since processing to be performed on the additional function structure information 123 is similar to that of the function structure information 121, description thereof will be omitted below.

In Step S509, the control unit 11 specifies a different parameter with a dependency relation with the parameter that is the target with reference to the record extracted from the function structure information 121 and stores information regarding the result of specifying the dependency relation and the record searching route in each record of the intermediate data 226.

In the example in FIG. 14B, the intermediate data 226 has a table structure, and each record (row data) has "DEVICE", "INSTANCE", "DEP", "ID" and "TRACE" fields. One record corresponds to one result of specifying a dependency relation, that is, one result of providing a definition by the function structure information 121. However, the configuration of the intermediate data 226 may not be limited to such an example and may be appropriately determined in accordance with an embodiment.

In the "DEVICE" field, a name of a device variable that is a target of analysis is stored. In the "INSTANCE" field, a name of an instance of a standard function, for which a dependency relation has been specified by the record extracted from the function structure information 121, is stored. The name of the instance of the standard function is obtained from the "INSTANCE" field of the record at the terminal end extracted in Step S505.

In the "DEP" field, the type of a parameter of an instance of a standard function with a dependency relation with the device variable that is a target of analysis, that is, the parameter for which definition has been provided by the function structure information 121, is stored. In a case in which the value in the "PARAMETER" field of the record at the terminal end is matched with "PAR_X" of each record of the function structure information 121 in the aforementioned searching, information ("PAR_X" in the drawing) indicating an input parameter is stored in the "DEP" field. On the other hand, in a case in which the value in the "PARAMETER" field of the record at the terminal end is matched with "PAR_Y" of each record of the function structure information 121, information ("PAR_Y" in the drawing) indicating an output parameter is stored in the "DEP" field.

In the "ID" field, an identifier (the value of the "ID" field) of the record extracted in Step S508 is stored. In the "TRACE" field, information indicating the route through which the searching has been conducted from the record at the beginning to the record at the terminal end in Step S505 is stored.

In the aforementioned example in FIG. 12, in a case in which the device variable that is a target of analysis is "D1", the first record is extracted as the record at the beginning in Step S503. In Step S505, the second record is extracted as the record at the terminal end. In accordance with this, the second record (the record, the "ID" of which is "2") of the function structure information 121 illustrated as an example in FIG. 14A is extracted in Step S508. As a result, in Step S509, the first record (the record, the "DEVICE" of which is "D1") in FIG. 14B is obtained as the information regarding the result of specifying the dependency relation and the record searching route.

Also, in a case in which the device variable that is the target of analysis is "D2", for example, the third record is extracted as the record at the beginning in Step S503. In Step S505, the fourth record is extracted as the record at the terminal end. In accordance with this, the first to third records (the records, "IDs" of which are "1" to "3") of the function structure information 121 illustrated as an example in FIG. 14A are extracted in Step S508. As a result, in Step S509, the second to fourth records in FIG. 14B (the records, "DEVICEs" of which are "D2") are obtained as the information regarding the result of specifying the dependency relation and the record searching route.

If the dependency relation related to the parameter that is the target is specified, and the saving of the information regarding the result of specifying the dependency relation and the record searching result is completed, then the control unit 11 causes the processing to proceed to next Step S510.

(Step S510)

In Step S510, the control unit 11 determines whether the processing in and after Step S504 has ended for all the records at the beginning listed up in Step S503. If records at the beginning on which the processing in and after Step S504 has not ben executed remain in the list, then the control unit 11 determines that the processing in and after Step S504 has not yet ended for all the records at the beginning listed up. In this case, the control unit 11 returns the processing to Step S504, picks up another record at the beginning remaining in the list as the record at the beginning that is a target of processing, and repeats the processing in and after Step S505 thereon. Otherwise, the control unit 11 determines that the processing has ended for all the records at the beginning listed up and causes the processing to proceed to next Step S511.

(Step S511)

In Step S511, the control unit 11 determines whether or not the processing in and after Step S502 has ended for all the device variables listed up in Step S501. If device variables on which the processing in and after Step S502 has not been executed remain in the list, then the control unit 11 determines that the processing in and after Step S502 has not yet ended for all the device variables listed up. In this case, the control unit 11 returns the processing to Step S502, picks up another device variable remaining in the list as a device variable that is a target of analysis, and repeats the processing in and after Step S503 thereon. Otherwise, the control unit 11 determines that processing has ended for all the device variables listed up and causes the processing to proceed to next Step S512.

(Step S512)

In Step S512, the control unit 11 specifies dependency relations among all the device variables on the basis of the result of certifying the dependency relations in Step S507 and the result of specifying the dependency relations related to the parameters in Step S509.

FIG. 15 illustrates an example of specification result data 227 indicating a result of specifying dependency relations among device variables by the analysis device 1 according to the present embodiment. In the example in FIG. 15, the specification result data 227 is expressed by adjacent matrixes, and a corresponding element (component) corresponding to a set of device variables that mutually have a dependency relation is "1" while the element (component) that does not correspond to any set of device variables that mutually have a dependency relation is "0". Columns indicate sources of the dependence while rows indicate destinations of the dependence. However, the configuration of the specification result data 227 may not be limited to such an example and may be appropriately determined in accordance with an embodiment.

The certifying result in Step S507 indicates that the device variable corresponding to the record at the beginning and the different device variable corresponding to the record at the terminal end have a dependency relation. Therefore, the control unit 11 uses the certifying result in Step S507 as it is to specify the dependency relation between the device variables. Specifically, the control unit 11 sets the corresponding element corresponding to the set of device variables certified to mutually have a dependency relation in Step S507 to "1".

On the other hand, the specification result in Step S509 indicates a dependency relation of each device variable with respect to a parameter of an instance of a standard function and a dependency relation between an input and output of the standard function. Thus, the control unit 11 certifies that one device variable that has a dependency relation with an input parameter of any of the standard functions used in the control program 221 has a dependency relation with a different device variable that has a dependency relation with an output parameter of the any of the standard functions, which has the dependency relation with the input parameter, with reference to the intermediate data 226.

Specifically, the control unit 11 extracts, from the intermediate data 226, a combination of records, the values of which in the "INSTANCE" and "ID" fields conform to each other. It is assumed that the value in the "DEP" field of one of the records in the extracted combination is "PAR_X" and the value in the "DEP" field of the other record is "PAR_Y". In this case, the control unit 11 certifies that there is a dependency relation from the device variable indicated in the "DEVICE" field of the one of the record to the device variable indicated in the "DEVICE" field of the other record. Then, the control unit 11 sets the corresponding element corresponding to the set of the device variables certified to mutually have a dependency relation to "1".

In the example in FIG. 14B, it is possible to certify that there is a dependency relation from the device variable "D1" to the device variable "D2" on the basis of the first record and the third record. Similarly, it is possible to certify that there is a dependency relation from the device variable "D3" to the device variable "D2" on the basis of the second record and the fifth record. It is possible to certify that there is a dependency relation from the device variable "D3" to the device variable "D4" on the basis of the sixth record and the eighth record. Therefore, in the specification result data 227 illustrated as an example in FIG. 15, the element on the first row and the second column, the element on the third row and the second column, and the element on the third row and the fourth column that correspond to each other are "1", and the other elements are "0".

If the dependency relations among all the device variables are specified in this manner, and the generation of the specification result data 227 is completed, then the control unit 11 ends the processing for specifying the dependency relations among the device variables 31. If the series of processes in Steps S106 and S107 are completed in this manner, then the control unit 11 causes the processing to proceed to next Step S108. Note that Steps S101 to S107 are an example of steps for acquiring the dependency relation information and the function information.

[Step S108 and Step S109]

In Step S108, the control unit 11 operates as a graph generation unit 117 and generates directed graphs indicating the specified dependency relations among the device variables 31 on the basis of the dependency relation information including the result of specifying the dependency relations. In Step S109, the control unit 11 operates as the output unit 118 and outputs, to the display device 15, the directed graph as information related to the result of specifying the dependency relations among the device variables 31. In the present embodiment, the control unit 11 generates directed graphs in any of the following first to tenth modes and outputs the generated directed graphs to the display device 15. Information used for generating the directed graph in each mode is an example of the dependency relation information and the function information.

(1) First Mode

Figure 16:
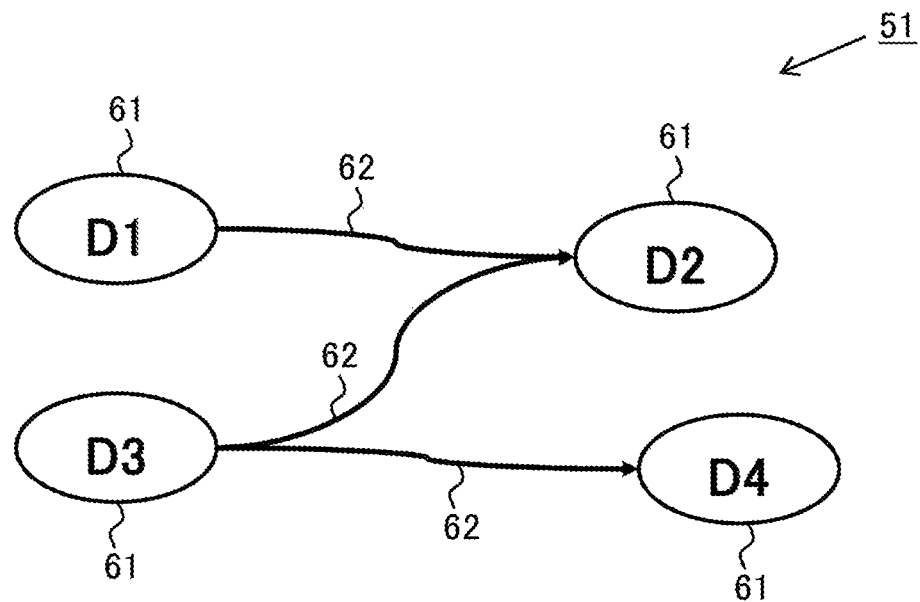
FIG. 16 illustrates an example of a directed graph generated by the analysis device according to the embodiment on the basis of a result of specifying dependency relations.

An example of a directed graph in the first mode will be described using FIG. 16. FIG. 16 schematically illustrates an example of a directed graph 51 in the first mode generated by the analysis device 1 according to the present embodiment. The first mode is the simplest mode indicating dependency relations among device variables. The directed graph 51 in the first mode includes a plurality of nodes 61 respectively representing the device variables 31 and one or more edges 62 representing existence of dependency relations. The nodes 61 is an example of the first nodes.

The control unit 11 generates the directed graph 51 on the basis of the result of specifying the dependency relations in Step S108. Specifically, the control unit 11 generates the directed graph 51 in the first mode with reference to the specification result data 227. In the aforementioned example in FIG. 15, the specification result data 227 indicates that there are dependency relations from D1 to D2, from D3 to D2, and from D3 to D4 in regard to the four device variables D1 to D4. Therefore, the directed graph 51 includes four nodes 61 respectively corresponding to the four device variables D1 to D4 in the example in FIG. 16. The edge 62 extends from the node 61 of "D1" to the node 61 of "D2". The edge 62 extends from the node 61 of "D3" to the node 61 of "D2". The edge 62 extends from the node 61 of "D3" to the node 61 of "D4".

The control unit 11 outputs the thus generated directed graph 51 to the display device 15 in Step S109. According to the directed graph 51, it is possible to simply indicate dependency relations among the devices 28 configuring the production line 27 via expressions of the device variables 31. Therefore, it is possible to appropriately indicate the dependency relations among the devices 28 to the user while curbing the amount of consumption of the display region in the display device 15.

(2) Second Mode

Figure 17A:
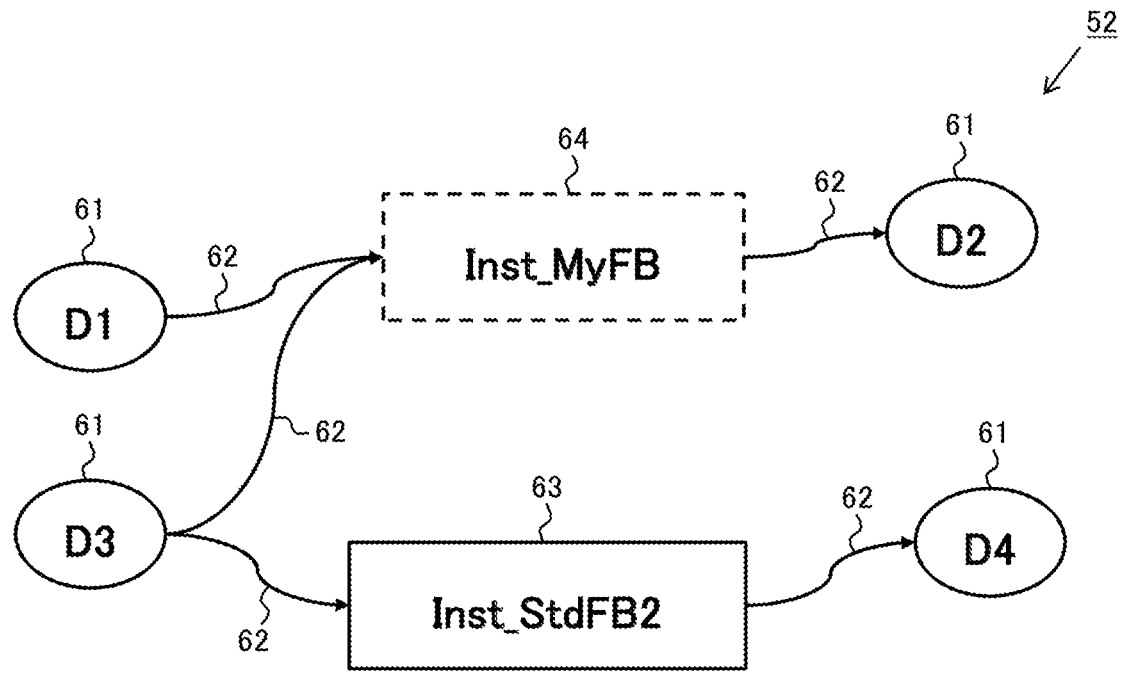
FIG. 17A illustrates an example of a directed graph generated by the analysis device according to the embodiment on the basis of a result of specifying dependency relations.

Next, an example of a directed graph in the second mode will be described using FIG. 17A. FIG. 17A schematically illustrates an example of a directed graph 52 in the second mode generated by the analysis device 1 according to the present embodiment. The second mode is a mode further indicating functions.

In the second mode, the directed graph 52 is generated to further include one or more blocks (63, 64) expressing instances of the functions in addition to the plurality of nodes 61 and the one or more edges 62. The blocks (63, 64) are coupled to the nodes 61 expressing device variables with dependency relations with respect to input parameters or output parameters of the instances of the functions that are being expressed via the edges 62. The directed graph 52 is an example of the first directed graph.

The control unit 11 generates the directed graph 52 on the basis of the result of specifying the dependency relations in Step S108. Specifically, the control unit 11 refers to the intermediate data 226 and the extraction result data 224 tracing back from the specification result data 227. For example, the dependency relation between the device variable "D1" and the device variable "D2" is derived from the first and third records of the intermediate data 226. Also, the first and third records of the intermediate data 226 are derived from the first to fourth records of the extraction result data 224. Information indicating a correspondence between the intermediate data 226 and the extraction result data 224 is stored in the "TRACE" field of the intermediate data 226. The control unit 11 refers to the intermediate data 226 tracing back from the specification result data 227 and refers to the extraction result data 224 tracing back from the intermediate data 226 on the basis of the value in the "TRACE" field of the corresponding record.

The control unit 11 can specify that an instance "Inst_MyFB" of a user defined function is interposed between the device variable "D1" and the device variable "D2" from the corresponding record of the extraction result data 224. Similarly, the control unit 11 specifies that an instance "Inst_MyFB" of a user defined function is interposed between the device variable "D3" and the device variable "D2" and that an instance "Inst_StdFB2" of a standard function is interposed between the device variable "D3" and the device variable "D4" from the corresponding record of the extraction result data 224. The control unit 11 generates the directed graph 52 in the second mode on the basis of these reference results.

The control unit 11 outputs the thus generated directed graph 52 to the display device 15 in Step S109. According to the directed graph 52, it is possible to indicate, in an associated manner, the dependency relations among the device variables 31 in the control program 221 and the dependency relations among the device variables 31 with respect to the parameters of the functions. Therefore, it is possible to associate and ascertain the dependency relations among the device variables 31 with respect to the parameters of the functions with the dependency relations among the device variables 31.

Note that in the aforementioned example, the standard function "Std_FB1" is used within the user defined function "My_FB" in the aforementioned example. The control unit 11 can specify such relations among the functions from the corresponding records of the extraction result data 224. For example, the second record of the extraction result data 224 is subordinate to the first record as represented by the value in the "PARENT" field. The first record indicates that the device variable "D1" has a dependency relation with the input parameter "Arg1" of the instance "Inst_MyFB" of the user defined function "My_FB". The second record indicates that "Arg1" has a dependency relation with the input parameter "Input1" of the instance "Inst_StdFB1" of the standard function "Std_FB1". The control unit 11 can specify nest relations among these functions from the corresponding records of the extraction result data 224. In the second mode, the control unit 11 generates the directed graph 52 to indicate the function that is used most frequently in the outside. Therefore, in the example in FIG. 17A, the control unit 11 selects the instance "Inst_MyFB" of the user defined function and generates the directed graph 52 including the block 64 corresponding to the selected instance "Inst_MyFB".

Here, in the aforementioned example, the control program 221 includes the instance "Inst_MyFB" of the user defined function in addition to the instance "Inst_StdFB2" of the standard function. As such, the plurality of commands in the control program 221 may include instances of a plurality of functions, and the instances of the plurality of functions may include instances of one or more user defined functions that are different from standard functions, in addition to instances of the one or more standard functions. The user defined functions are defined by the user in the control program 221. In this case, the directed graph may be generated to indicate, in a first form, a first block representing the instances of the standard functions from among the instances of the plurality of functions and indicate, in a second form that is different from the first form, a second block representing the instances of the user defined functions, from among the plurality of blocks respectively representing the functions.

In the example in FIG. 17A, the block 63 representing the instance "Inst_StdFB2" of the standard function is an example of the first block, and the block 64 representing the instance "Inst_MyFB" of the user defined function is an example of the second block. Also, in the example in FIG. 17A, the solid line representing the block 63 is an example of the first form, and the dotted line representing the block 64 is an example of the second form. Note that the method of representing each of the blocks (63, 64) in the different forms may not be limited to such a method based on types of lines and may be appropriately selected in accordance with an embodiment. For example, the form of each of the blocks (63, 64) may be defined by an attribute such as a color, a shape, or a letter font as well as the type of the line illustrated as an example in FIG. 17A. Also, a symbol corresponding to each of the blocks (63, 64) may be defined, and each defined symbol may be used to display each of the blocks (63, 64).

In this manner, the directed graph 52 may be generated to indicate the block 63 representing the instances of the standard functions and the block 64 representing the instances of the user defined functions in different forms. However, the method of representing each of the blocks (63, 64) of the functions may not be limited to such an example. The block 63 representing the instances of the standard functions and the block 64 representing the instances of the user defined functions may be indicated in the same form.

(3) Third Mode

Figure 17B:
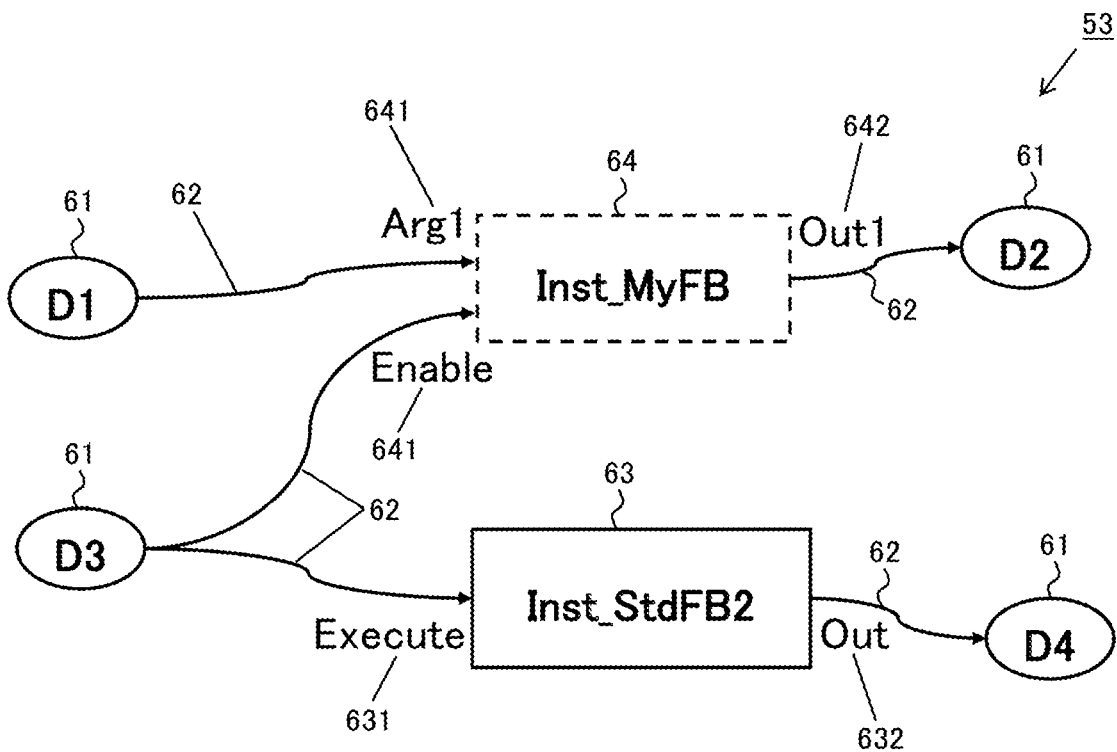
FIG. 17B illustrates an example of a directed graph generated by the analysis device according to the embodiment on the basis of a result of specifying dependency relations.

Next, an example of a directed graph in the third mode will be described using FIG. 17B. FIG. 17B schematically illustrates an example of a directed graph 53 in the third mode generated by the analysis device 1 according to the present embodiment. The third mode is a mode indicating each of parameters of functions in a distinguished manner.

In the aforementioned second mode, the directed graph 52 has a display form in which the nodes 61 representing the device variables 31 with dependency relations are connected to the blocks (63, 64) via the edges 62 without indicating the name of each of the input parameter and the output parameter of the instance of the function that is being expressed. On the other hand, in the third mode, the directed graph 53 is generated to have a display form in which each of the input parameter and the output parameter of the instance of the function that is being expressed is distinguished, the blocks (63, 64) are connected to the nodes 61 representing the device variables 31 with dependency relations via the edges 62, and the name of corresponding input parameter or output parameter is indicated near the edges 62. The directed graph 53 in the third mode is also an example of the first directed graph similarly to the aforementioned directed graph 52 in the second mode.

The control unit 11 generates the directed graph 53 on the basis of the result of specifying the dependency relations in Step S108. Specifically, the control unit 11 refers to the intermediate data 226 and the extraction result data 224 tracing back from the specification result data 227 similarly to the aforementioned second mode. The control unit 11 specifies each device variable 31 with a dependency relation with respect to each parameter of the functions on the basis of the corresponding records of the extraction result data 224. The control unit 11 can obtain a name of each parameter from the "PARAMETER" field of each record of the extraction result data 224. In the third mode, the control unit 11 arranges a notation of the name of each parameter specified by the "PARAMETER" field at a corresponding location of each block.

In the aforementioned example, the device variable "D1" has a dependency relation with respect to the input parameter "Arg1" of the instance "Inst_MyFB" of the user defined function, and the device variable "D3" has a dependency relation with respect to the input parameter "Enable". The control unit 11 distinguishes the edge 62 extending from the node 61 representing the device variable "D1" from the edge 62 extending from the node 61 representing the device variable "D3" and connects the edges 62 to the block 64 representing the instance "Inst_MyFB" of the user defined function. Then, the control unit 11 arranges a notation 641 of the name of each input parameter near each edge 62.

Through similar processing, the control unit 11 arranges a notation 642 of a name of an output parameter with a dependency relation with the device variable "D2" near the edge 62 that connects the device variable "D2" and the block 64. The control unit 11 arranges a notation 631 of a name of an input parameter with a dependency relation with the device variable "D3" near the edge 62 connecting the device variable "D3" and the block 63. The control unit 11 arranges a notation 632 of a name of an output parameter with a dependency relation with the device variable "D4" near the edge 62 connecting the device variable "D4" and the block 63. In this manner, the control unit 11 can generate the directed graph 53 in the third mode.

The control unit 11 outputs the thus generated directed graph 53 to the display device 15 in Step S109. According to the directed graph 53, it is possible to identify parameters of the functions with which the device variables 31 have dependency relations. Therefore, it is possible to more clearly indicate the dependency relations among the device variables 31 with respect to the parameters of the functions in an associated manner with the dependency relations among the device variables 31.

Note that the directed graph 53 may be generated such that the block 63 representing the instances of the standard functions and the block 64 representing the instances of the user defined functions are indicated in different forms in the third mode as well similarly to the aforementioned second mode. In the example in FIG. 17B, each of the blocks (63, 64) is indicated in the form similar to that in FIG. 17A described above. However, the method of representing each of the blocks (63, 64) of the functions in the third mode may not be limited to such an example. The block 63 representing the instances of the standard functions and the block 64 representing the instances of the user defined function may be indicated in the same form in the third mode as well similarly to the aforementioned second mode.

(4) Fourth Mode

Figure 17C:
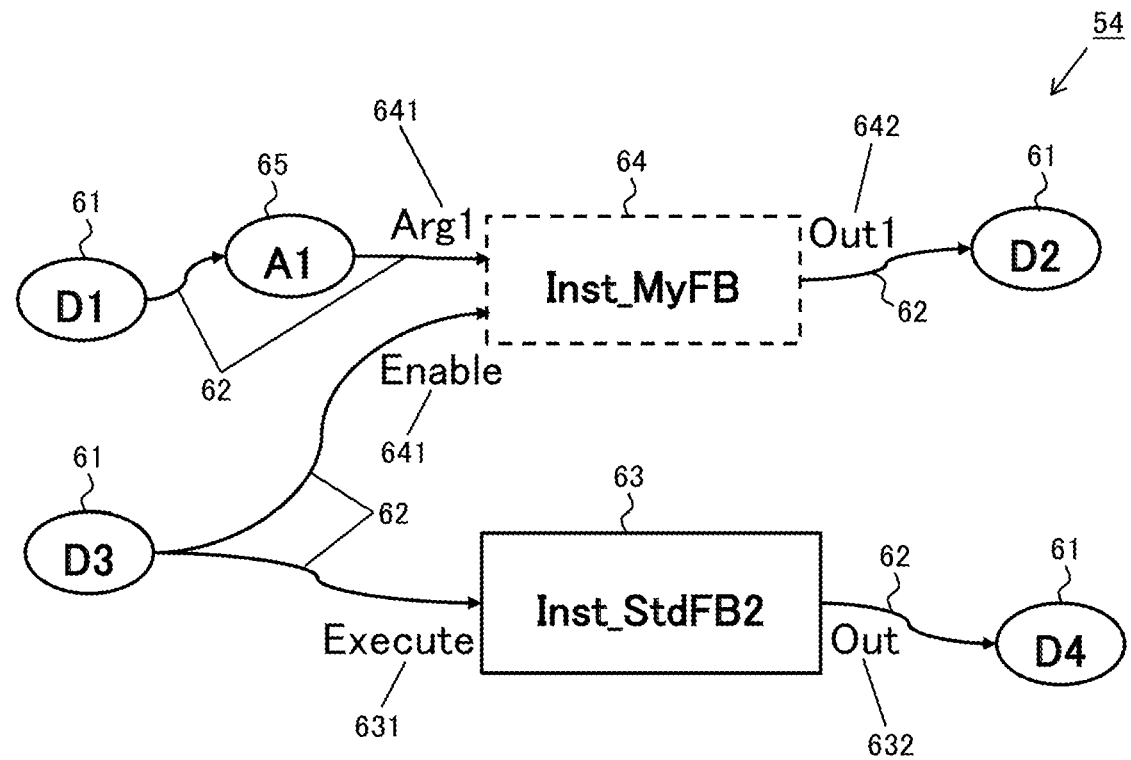
FIG. 17C illustrates an example of a directed graph generated by the analysis device according to the embodiment on the basis of a result of specifying dependency relations.

Next, an example of a directed graph in the fourth mode will be described using FIG. 17C. FIG. 17C schematically illustrates an example of a directed graph 54 in the fourth mode generated by the analysis device 1 according to the present embodiment. The fourth mode is a mode indicating a different variable that is different from the device variables and is used outside functions.

In the aforementioned example, the control program 221 includes a different variable "A1" that is different from each device variable 31, and the different variable "A1" is used between the device variable "D1' and the input parameter "Arg1" of the instance of the function. As such, a plurality of variables in the control program 221 is one or more different variables that are different from each device variable 31 and may include one or more different variables used between any of the plurality of device variables 31 and an input parameter or an output parameter of any of the functions. In this case, the directed graph 54 in the fourth mode is generated to include one or more nodes 65 that represent the one or more different variables, are disposed between the node 61 representing any of the plurality of device variables 31 and the block (63, 64) representing the function, and are connected to each of the node 61 and the block (63, 64) via the edge 62. The directed graph 54 in the fourth mode is also an example of the first directed graph similarly to the aforementioned directed graph 52 in the second mode. The nodes 65 are an example of nodes that represent different variables, are disposed between the first nodes representing any of the plurality of device variables and the blocks representing functions, and are connected to each of the first nodes and the blocks via the edges.

The control unit 11 generates the directed graph 53 on the basis of the result of specifying the dependency relations in Step S108. Specifically, the control unit 11 refers to the intermediate data 226 and the extraction result data 224 tracing back from the specification result data 227 similarly to the aforementioned second mode and third mode. The control unit 11 can specify the different variable used between the device variable and each parameter of the functions from the "VARIABLE" field of each record of the extraction result data 224. In the fourth mode, the control unit 11 arranges the node 65 representing the different variable specified by the "VARIABLE" field at a corresponding location.

In the aforementioned example, the control unit 11 can specify that the different variable "A1" is interposed between the device variable "D1" and the input parameter "Arg1" of the instance "Inst_MyFB" of the user defined function from the first record of the extraction result data 224. On the basis of the reference result, the control unit 11 arranges the node 65 representing the different variable "A1" between the node 61 representing the device variable "D1" and the block 64 representing the instance "Inst_MyFB" of the user defined function. Then, the control unit 11 connects the node 65 to the node 61 and the block 64 with the edge 62. Note that the control unit 11 determines the orientation of each edge 62 connected to the node 65 on the basis of the value in the "DIRECTION" field of each record of the extraction result data 224. In this manner, the control unit 11 can generate the directed graph 54 in the fourth mode.

The control unit 11 outputs the thus generated directed graph 54 to the display device 15 in Step S109. According to the directed graph 54, it is possible to express not only the device variables 31 but also a different variable used in the control program 221. Therefore, in a case in which a different variable is interposed between the device variables 31, it is possible to indicate the dependency relations related to the different variable in association with the dependency relations among the device variables 31.

Figure 17D:
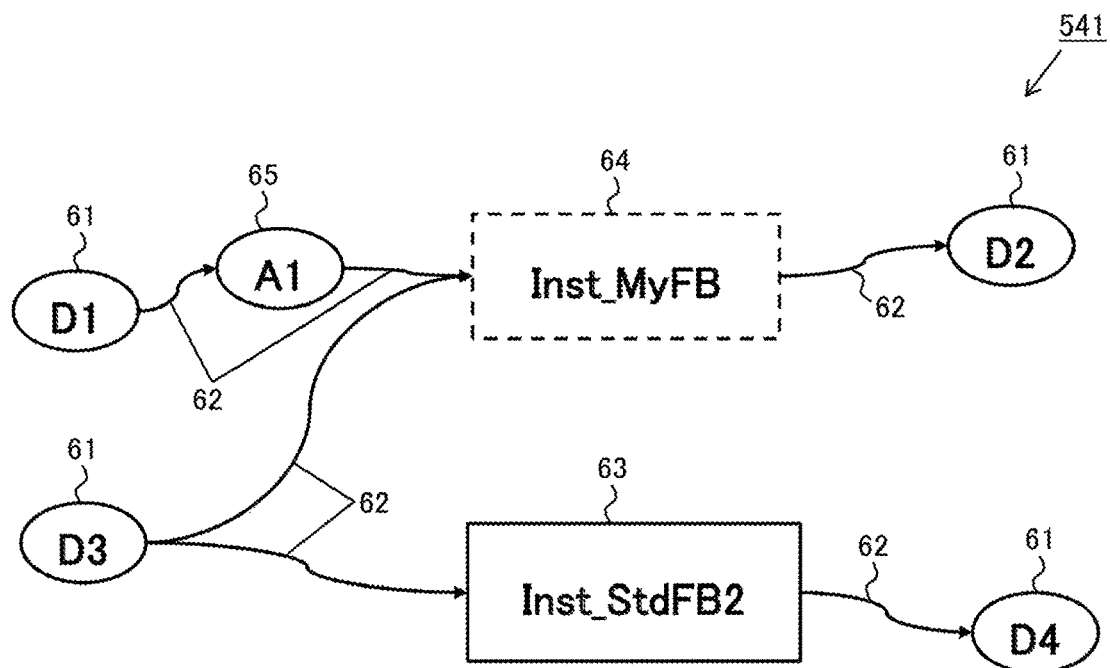
FIG. 17D illustrates an example of a directed graph generated by the analysis device according to the embodiment on the basis of a result of specifying dependency relations.

Here, an example of a different display form of the directed graph in the fourth mode will be described using FIG. 17D. FIG. 17D schematically illustrates an example of the directed graph 541 in the fourth mode generated in a display form different from that in FIG. 17C by the analysis device 1 according to the present embodiment. In the example in FIG. 17C, the directed graph 54 is generated in the display form in which each of names of the input parameters and output parameters of the instances of the function is indicated by each of notations (631, 632, 641, 642) similarly to the aforementioned third mode. On the other hand, the directed graph 541 illustrated as an example in FIG. 17D is generated in an expression form in which the name of each of the input parameters and the output parameters of the instances of the functions are not indicated similarly to the aforementioned second mode. Except for this point, the directed graph 541 is generated similarly to the aforementioned directed graph 54. The directed graph 541 is also an example of the first directed graph similarly to the aforementioned directed graph 54. In this manner, the display form of the directed graph in the fourth mode may not be limited to the aforementioned display form in the third mode and may be appropriately selected in accordance with an embodiment.

Also, the directed graph (54, 541) may be generated to indicate the block 63 representing the instances of the standard functions and the block 64 representing the instances of the user defined function in different forms in the fourth mode as well similarly to the aforementioned second mode and third mode. In the example in FIGS. 17C and 17D, each of the blocks (63, 64) is indicated in the form similar to that in FIG. 17A described above. However, the method of representing each of the blocks (63, 64) of the functions in the fourth mode may not be limited to such an example. The block 63 representing the instances of the standard functions and the block 64 representing the instances of the user defined function may be indicated in the same form in the fourth mode as well similarly to the aforementioned second mode and third mode.

(5) Fifth Mode

Figure 18A:
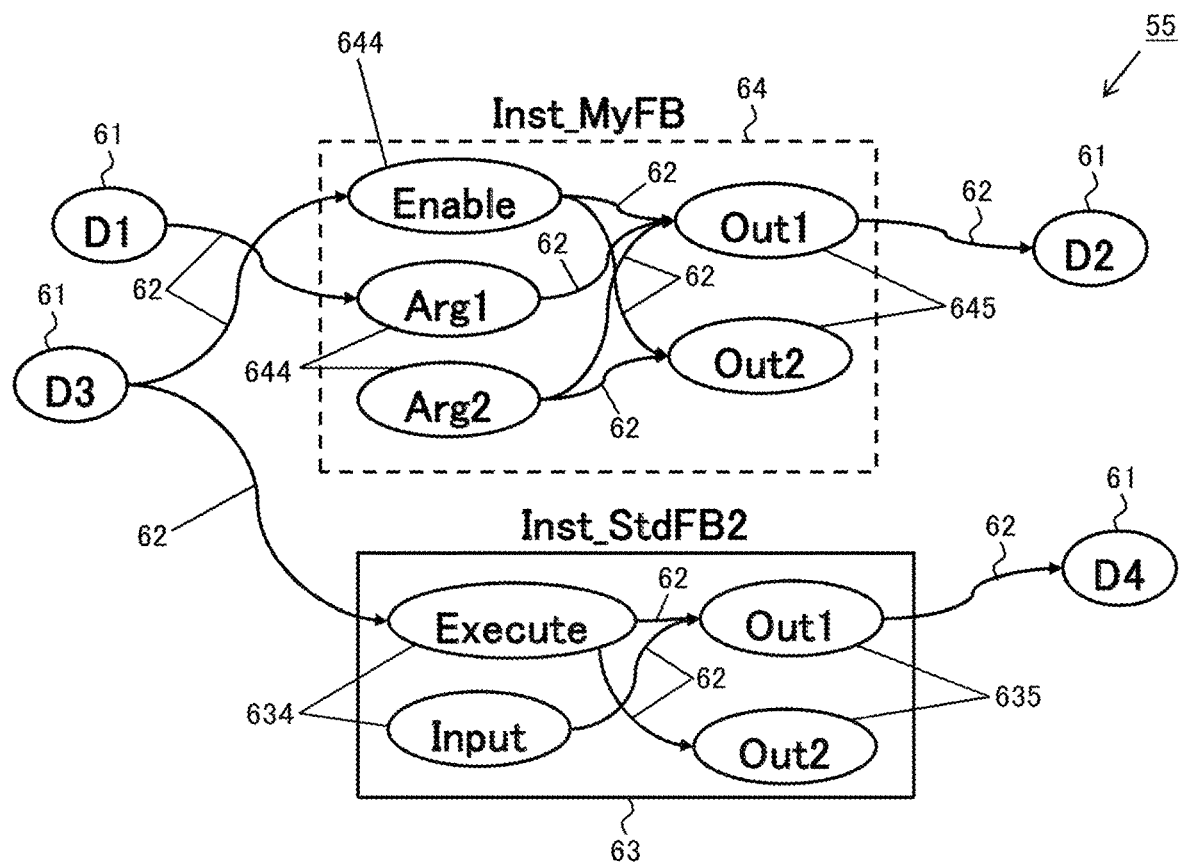
FIG. 18A illustrates an example of a directed graph generated by the analysis device according to the embodiment on the basis of a result of specifying dependency relations.

Next, an example of a directed graph in the fifth mode will be described using FIG. 18A. FIG. 18A schematically illustrates an example of a directed graph 55 in the fifth mode generated by the analysis device 1 according to the present embodiment. The fifth mode is a mode indicating an internal structure of a function.

In the fifth mode, the directed graph 55 is generated to further include, as well as the aforementioned plurality of nodes 61, the aforementioned one or more edges 62, and the blocks (63, 64), a plurality of nodes (634, 635, 644, 645) that are disposed in the blocks (63, 64) and respectively represent input parameters and output parameters of an instance of a function that is being expressed. Each of the nodes (634, 635. 644, 645) is connected to the node 61 representing the device variable 31 with a dependency relation with respect to each of the input parameters and the output parameters that are being expressed via the edge 62. Also, the nodes (634, 635) (644, 645) respectively representing the input parameters and the output parameters that mutually have dependency relations in the function that is being expressed are connected to each other via the edges 62. Each of the nodes (634, 635, 644, 645) is an example of the second node. The directed graph 55 is an example of the second directed graph according to the first display form.

The control unit 11 generates the directed graph 55 on the basis of the result of specifying the dependency relations in Step S108. Specifically, the control unit 11 refers to the intermediate data 226 and the extraction result data 224 tracing back from the specification result data 227 similarly to the aforementioned second to fourth modes. The control unit 11 specifies each device variable 31 with a dependency relation with respect to each parameter of the functions on the basis of the corresponding records of the extraction result data 224 similarly to the aforementioned third mode. On the basis of the specification result, the control unit 11 determines a combination of each node 61 and each of the nodes (634, 635, 644, 645) to be connected with the edge 62.

Also, the control unit 11 arranges the node 634 representing the input parameters and the node 635 representing the output parameter in the block 63 representing the instance of the standard function. Then, the control unit 11 specifies a dependency relation between the input parameter and the output parameter of the instance of the standard function with reference to the function structure information 121 (and the additional function structure information 123). In the aforementioned example, the control unit 11 can specify the dependency relation between the input parameter and the output parameter of the instance "Inst_StdFB2" of the standard function with reference to the fourth to sixth records of the function structure information 121, for example. On the basis of the specification result, the control unit 11 determines a combination of the node 634 and the node 635 to be connected with the edge 62.

Further, the control unit 11 arranges the node 644 representing the input parameter and the node 645 representing the output parameter in the block 64 representing the instance of the user defined function. A dependency relation between the input parameter and the output parameter of the instance of the user defined function may be appropriately specified. For example, the control unit 11 may specify the dependency relation between the input parameter and the output parameter of the instance of the user defined function on the basis of the corresponding records of the extraction result data 224. Also, the control unit 11 may specify the dependency relation between the input parameter and the output parameter of the instance of the user defined function through execution of the aforementioned processing in Steps S102 to S107 by handling each parameter of the instance of the user defined function similarly to the aforementioned device variable 31, for example. On the basis of the specification result, the control unit 11 determines a combination of the node 644 and the node 645 to be connected with the edge 62. In this manner, the control unit 11 can generate the directed graph 55 in the fifth mode.

The control unit 11 outputs the thus generated directed graph 55 to the display device 15 in Step S109. According to the directed graph 55, it is possible to indicate the dependency relations among the device variables 31 via functions in the control program 221 using the graph expression including each of the nodes (634, 635, 644, 645) representing each parameter. Therefore, it is possible to appropriately ascertain the dependency relations among the device variables 31 via the functions.

Note that the directed graph 55 may be generated to indicate the block 63 representing the instances of the standard functions and the block 64 representing the instances of the user defined functions in different forms in the fifth mode as well similarly to the aforementioned second to fourth modes. In the example in FIG. 18A, each of the blocks (63, 64) is indicated in a form similar to that in FIG. 17A described above. However, the method of representing each of the blocks (63, 64) of the function in the fifth mode may not be limited to such an example. In the fifth mode, the block 63 representing the instances of the standard functions and the block 64 representing the instances of the user defined function may be indicated in the same form in the fifth mode as well similarly to the aforementioned second to fourth modes.

(6) Sixth Mode

Figure 18B:
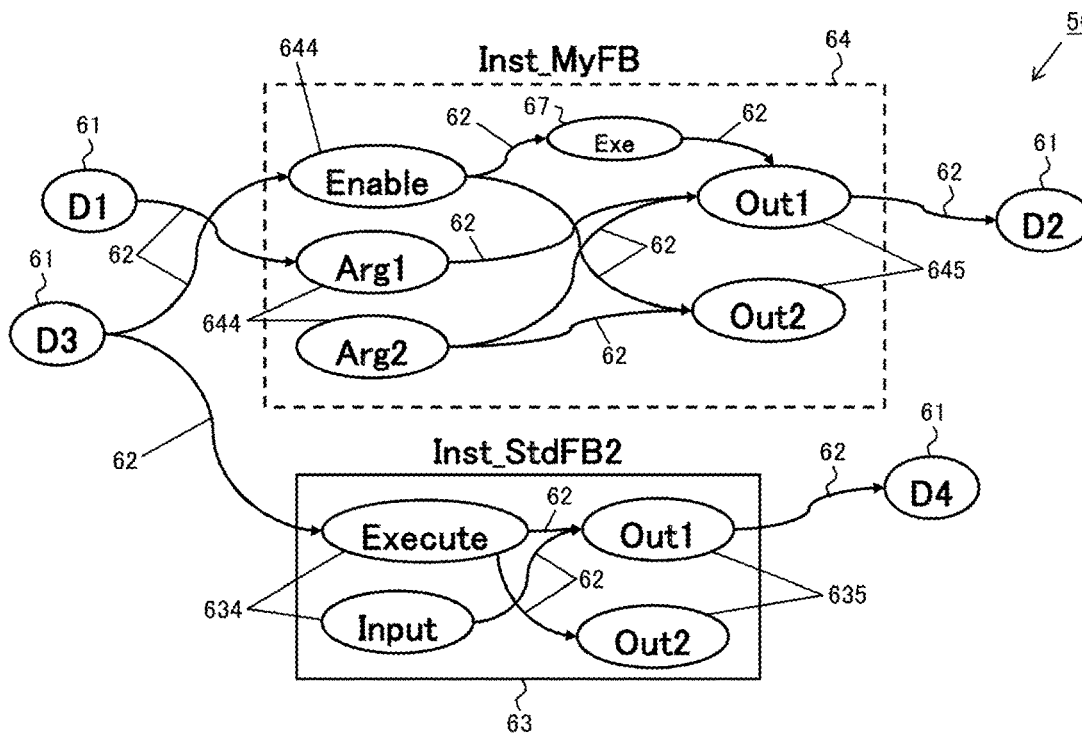
FIG. 18B illustrates an example of a directed graph generated by the analysis device according to the embodiment on the basis of a result of specifying dependency relations.

Next, an example of a directed graph in the sixth mode will be described using FIG. 18B. FIG. 18B schematically illustrates an example of a directed graph 56 in the sixth mode generated by the analysis device 1 according to the present embodiment. The sixth mode is a mode indicating a variable used within the user defined function.

In the aforementioned example, the control program 221 includes a local variable "Exe" that is different from each device variable 31. The local variable "Exe" is used between the input parameter "Enable" and the output parameter "Out1" that mutually have a dependency relation within the user defined function "My_FB". As such, a plurality of variables in the control program 221 may include one or more local variables that are different from each device variable 31 and are one or more local variables used between input parameters and output parameters that mutually have dependency relations within the user defined function. In this case, the directed graph 56 in the sixth mode is generated to further include one or more nodes 67 that represent one or more local variables, are arranged between nodes (644, 645) respectively representing the input parameters and the output parameters that mutually have dependency relations in the block 64 representing the instance of the user defined function, and are connected to each other via the edges 62, in addition to the aforementioned fifth mode. The node 67 is an example of the "third node" according to the present invention. The directed graph 56 is an example of the second directed graph in the second display form.

It is possible to specify existence of different variables used between the device variables 31 and the parameters of the function in the process of specifying the dependency relations among the device variables 31 with respect to the parameters of the functions. Information indicating the result is stored in the "VARIABLE" field of each record of the extraction result data 224, and in the aforementioned fourth mode, the control unit 11 determines arrangement of the node 65 representing the different variables and connection to the edges 62 using the information. Similarly to this, it is possible to specify existence of local variables used between the input parameters and the output parameters in the process of specifying the dependency relations between the input parameters and the output parameters of the instances of the user defined functions.

For example, the control unit 11 may specify the dependency relations between the input parameters and the output parameters of the instances of the user defined functions by a method similar to that in the aforementioned fifth mode in Step S108. In the process thereof, the control unit 11 specifies a location where the local variables are used. The control unit 11 arranges the node 67 representing the local variable in the block 64 using the specification result and connects each of the nodes (644, 645) representing each parameter with a dependency relation with the local variable and the node 67 with the edge 62. In this manner, the control unit 11 can generate the directed graph 56 in the sixth mode.

The control unit 11 outputs the thus generated directed graph 56 to the display device 15 in Step S109. According to the directed graph 56, it is possible to express the local variables used in the user defined function. Therefore, it is possible to indicate the dependency relations among the device variables 31 via the user defined function in the control program 221 in association with the internal structure of the user defined function.

Note that the directed graph 56 may be generated to indicate the block 63 representing the instances of the standard functions and the block 64 representing the instances of the user defined functions in different forms in the sixth mode as well similarly to the aforementioned second to fifth modes. In the example in FIG. 18B, each of the blocks (63, 64) is indicated in a form similar to that in FIG. 17A described above. However, the method of representing each of the blocks (63, 64) of the functions in the sixth mode may not be limited to such an example. The block 63 representing the instances of the standard functions and the blocks 64 representing the instances of the user defined functions may be indicated in the same form in the sixth mode as well similarly to the aforementioned second to fifth modes.

(7) Seventh Mode

Figure 18C:
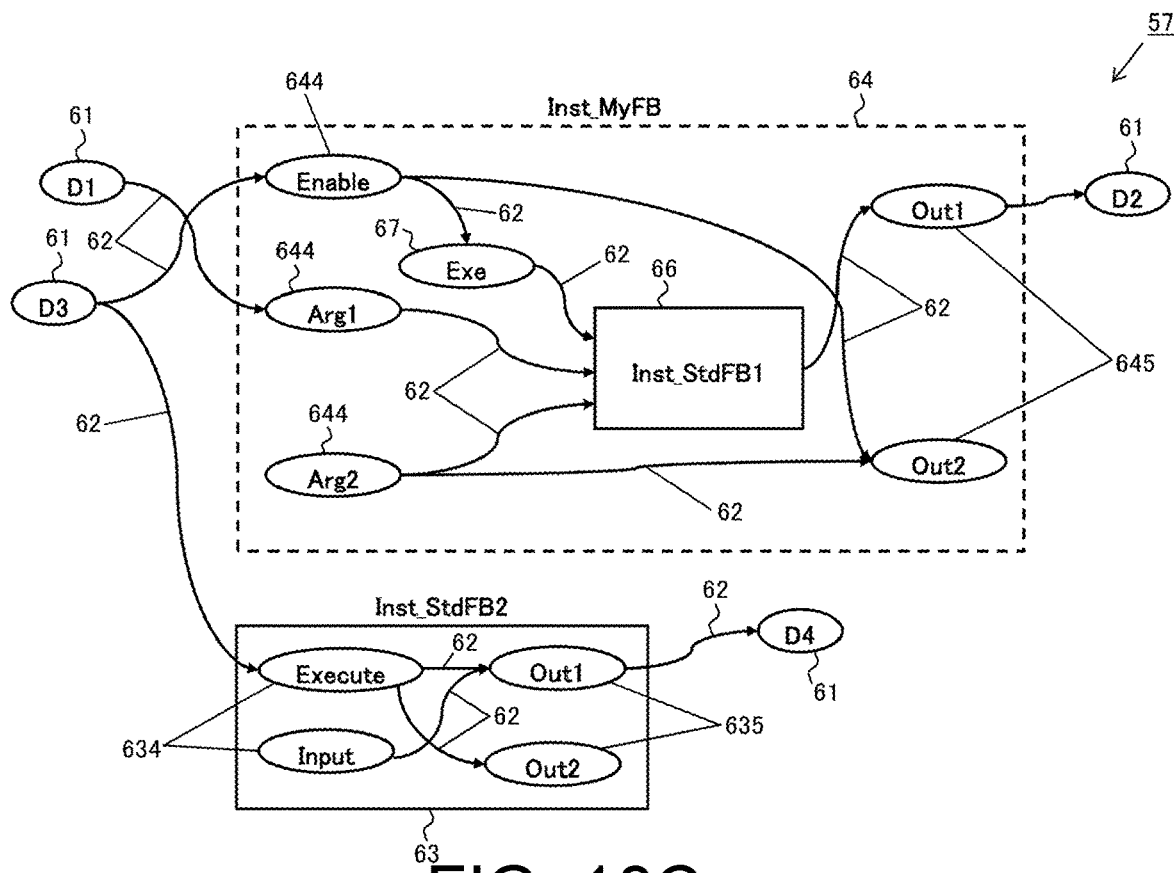
FIG. 18C illustrates an example of a directed graph generated by the analysis device according to the embodiment on the basis of a result of specifying dependency relations.

Next, an example of a directed graph in the seventh mode will be described using FIG. 18C. FIG. 18C schematically illustrates an example of a directed graph 57 in the seventh mode generated by the analysis device 1 according to the present embodiment. The seventh mode is a mode indicating standard functions used within the user defined function.

In the aforementioned example, the control program 221 includes a standard function "STD_FB1" used between the input parameters "Arg1" and "Exe" and the output parameter "Out1" that mutually have dependency relations within the user defined function "My_FB". As such, the instances of the plurality of functions in the control program 221 may include instances of one or more standard functions used between input parameters and output parameters that mutually have dependency relations within the user defined functions. In this case, the directed graph 57 in the seventh mode is generated such that a block 66 representing an instance of a standard function and used within the instance of the user defined function is arranged between the nodes (644, 645) respectively representing the input parameter and the output parameter that mutually have a dependency relation within the block 64 representing the instance of the user defined function and is connected to each of the nodes (644, 645) via the edge 62. The block 66 is an example of the aforementioned first block. The directed graph 57 is an example of the second directed graph in the third display form.

The control unit 11 can specify arrangement of the block 66 representing the instance of the standard function used within the instance of the user defined function and each of the nodes (644, 645) connecting the block 66 via the edge 62, similarly to the local variables in the aforementioned sixth mode in Step S108. Also, the control unit 11 can specify the arrangement of the block 66 and each of the nodes (644, 645) that is connected to the block 66 via the edge 62 from the corresponding records of the extraction result data 224. The control unit 11 arranges the block 66 representing the instance of the standard function in the block 64 using these specification results and connects each of the nodes (644, 645) representing each parameter with a dependency relation with each parameter of the instance of the standard function and the block 66 with the edge 62. In this manner, the control unit 11 can generate the directed graph 57 in the seventh mode.

The control unit 11 outputs the thus generated directed graph 57 to the display device 15 in Step S109. According to the directed graph 57, it is possible to represent the standard function used in the user defined function. Therefore, it is possible to indicate the dependency relations among the device variables 31 via the user defined function in the control program 221 in association with the internal structure of the user defined function.

Note that in the example in FIG. 18C, the directed graph 57 is generated to include the node 67 representing the local variables similarly to the aforementioned sixth mode. In this manner, the display form in the sixth mode may be employed as the display form in the seventh mode as well. However, the display form in the seventh mode may not be limited to such an example. In the display form in the seventh mode, the display form in the sixth mode may be omitted. The display of the node 67 may be omitted from the directed graph 57 illustrated as an example in FIG. 18C. In this case, the edge 62 is connected from the node 644 representing the input parameter "Enable" to the block 66.

Also, the directed graph 57 may be generated to indicate the blocks (63, 66) representing the instances of the standard functions and the block 64 representing instances of the user defined functions in different forms in the seventh mode similarly to the aforementioned second to sixth modes. In the example illustrated in FIG. 18C, each of the blocks (63, 64, 66) is indicated in the form similar to that in FIG. 17A described above. However, the method of representing each of the blocks (63, 64, 66) of the functions in the seventh mode may not be limited to such an example. The blocks (63, 66) representing the instances of the standard function and the block 64 representing the instances of the user defined functions may be indicated in the same form in the seventh mode as well similarly to the aforementioned second to sixth modes.

Also, in the example in FIG. 18C, the block 63 is indicated in the form similar to that in the aforementioned fifth mode, and the block 66 is indicated in the form similar to the block 63 in the aforementioned second mode or the like. However, the method of representing the block 66 in the seventh mode may not be limited to such an example. The block 66 may also be indicated in the form similar to that of the block 63 in the aforementioned fifth mode.

(8) Eighth Mode

Figure 18D:
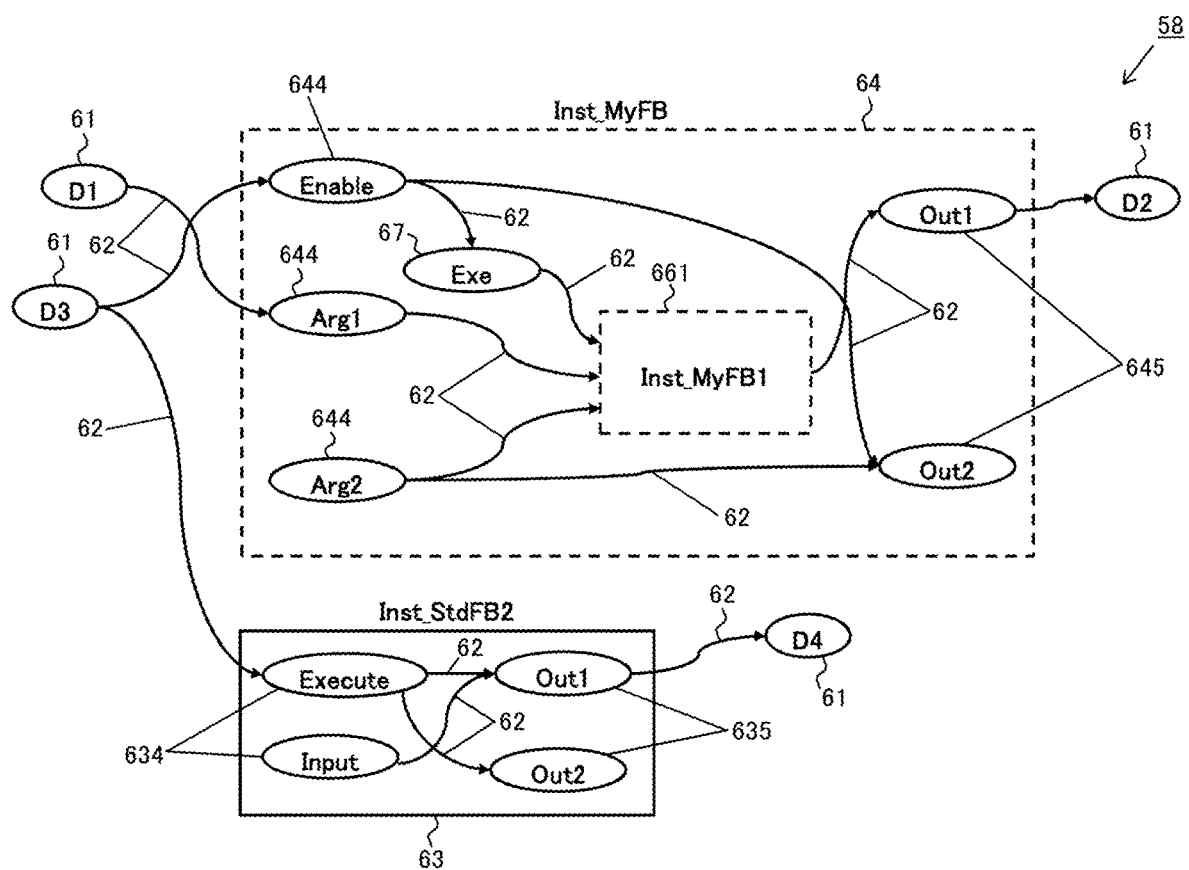
FIG. 18D illustrates an example of a directed graph generated by the analysis device according to the embodiment on the basis of a result of specifying dependency relations.

Next, an example of a directed graph in the eighth mode will be described using FIG. 18D. FIG. 18D schematically illustrates an example of a directed graph 58 in the eighth mode generated by the analysis device 1 according to the present embodiment. The eighth mode is a mode indicating a different user defined function used within a user defined function.

In the aforementioned example, the control program 221 includes a standard function "STD_FB1" used within the user defined function "My_FB". A user defined function may be used instead of or in addition to the standard function "STD_FB1" within the user defined function "My_FB". In other words, the plurality of functions in the control program 221 may include a different user defined function used between an input parameter and an output parameter that mutually has a dependency relation within the user defined function. In this case, the directed graph 58 in the eighth mode is generated such that a block 661 representing an instance of the different user defined function used within the instance of the user defined function is disposed between the nodes (644, 645) respectively representing the input parameter and the output parameter that mutually have a dependency relation within the block 64 representing the instance of the user defined function and the block 661 is connected to each of the nodes (644, 645) via the edge 62. The block 661 is an example of another second block representing the instance of the different user defined function used within the user defined function. The directed graph 58 is an example of the second directed graph in the fourth display form.

The eighth mode is similar to the aforementioned seventh mode except for the point that the type of the function to be displayed in the user defined function is different. Therefore, the control unit 11 can specify arrangement of the block 661 representing the instance of the different user defined function used within the instance of the user defined function and each of the nodes (644, 645) that is connected to the block 661 via the edge 62 by a method similar to that in the aforementioned seventh mode in Step S108. The control unit 11 arranges the block 661 representing the instance of the different user defined function in the block 64 using these specification results and connects each of the nodes (644, 645) representing each parameter with a dependency relation with each parameter of the instance of the different user defined function and the block 661 with the edge 62. In this manner, the control unit 11 can generate the directed graph 58 in the eighth mode.

The control unit 11 outputs the thus generated directed graph 58 to the display device 15 in Step S109. According to the directed graph 58, it is possible to represent the different user defined function used in the user defined function. Therefore, it is possible to indicate the dependency relations among the device variables 31 via the user defined function in the control program 221 in association with the internal structure of the user defined function.

Note that in the example in FIG. 18D, the directed graph 58 is generated to include the node 67 representing the local variable similarly to the aforementioned sixth mode. In this manner, the display form in the sixth mode may be employed in the eighth mode as well. However, the display form in the eighth mode may not be limited to such an example. In the display form in the eighth mode, the display form in the sixth mode may be omitted. The display of the node 67 may be omitted in the directed graph 58 illustrated as an example in FIG. 18D. In this case the edge 62 is connected from the node 644 representing the input parameter "Enable" to the block 661.

Also, in a case in which the control program 221 includes a standard function used in the user defined function similarly to the aforementioned seventh mode, the display form in the seventh mode may further be employed in the display form in the eighth mode. Further, as illustrated as an example in FIG. 18D, the directed graph 58 may be generated such that the block 63 representing the instance of the standard function and the blocks (64, 661) representing the instance of the user defined function are indicated in different forms in the eighth mode similarly to the aforementioned second to seventh modes. However, the method of representing each of the blocks (63, 64, 661) of the function in the eighth mode may not be limited to such an example. The block 63 representing the instance of the standard function and the block (64, 661) representing the instance of the user defined function may be indicated in the same form in the eighth mode as well similarly to the aforementioned second to seventh modes.

Also, in the example in FIG. 18D, the block 661 is indicated in the same form as that of the block 64 in the aforementioned second to fourth modes unlike the block 64 in the aforementioned fifth to seventh modes. However, the method of representing the block 661 in the eighth mode may not be limited to such an example. The block 661 may also be indicated in a form similar to that of the block 64 in the aforementioned fifth to seventh modes, that is, in a state in which the internal structure of the different user defined function is represented.

(9) Ninth Mode

Figure 19:
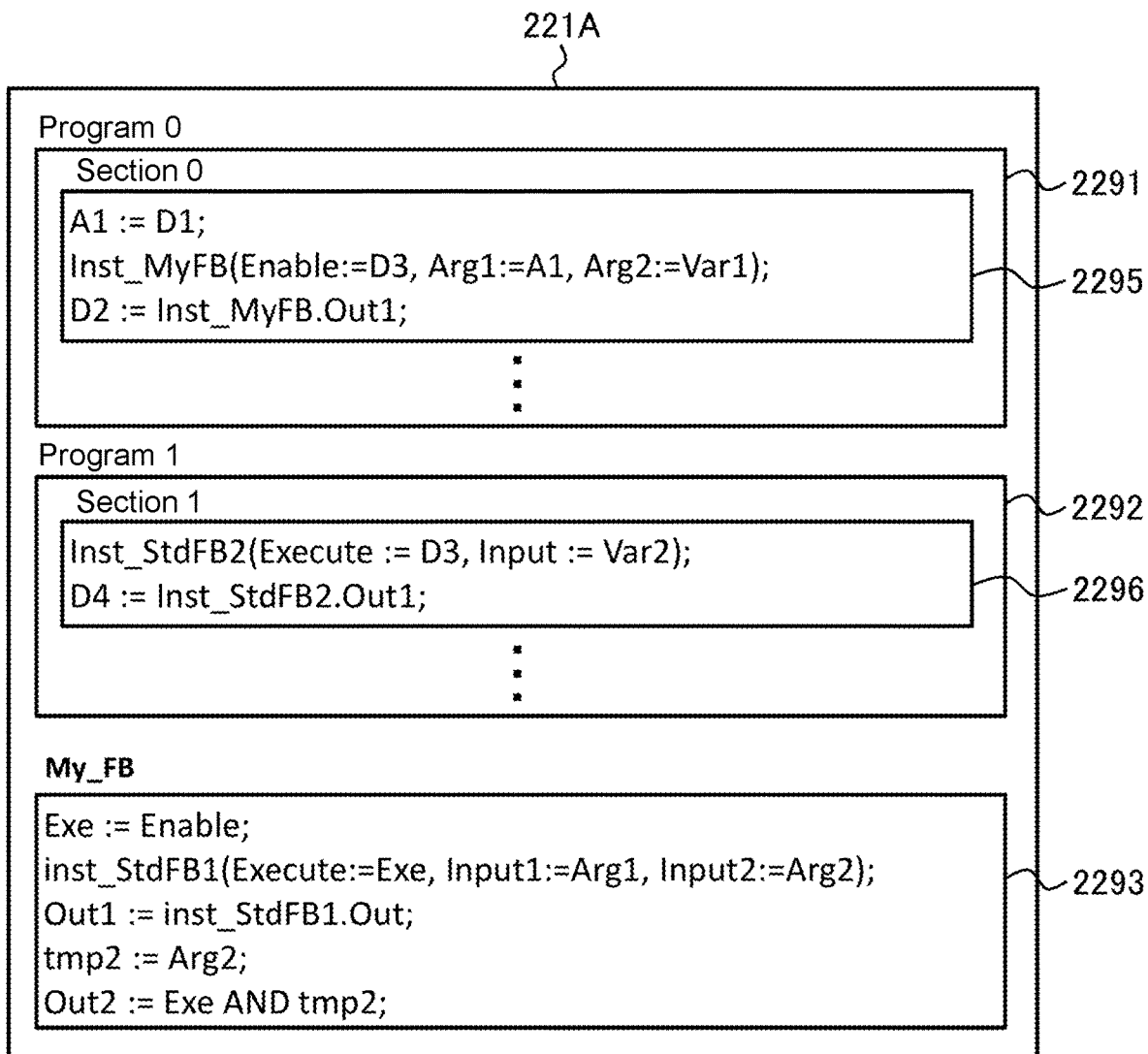
FIG. 19 illustrates an example of another control program.
Figure 20A:
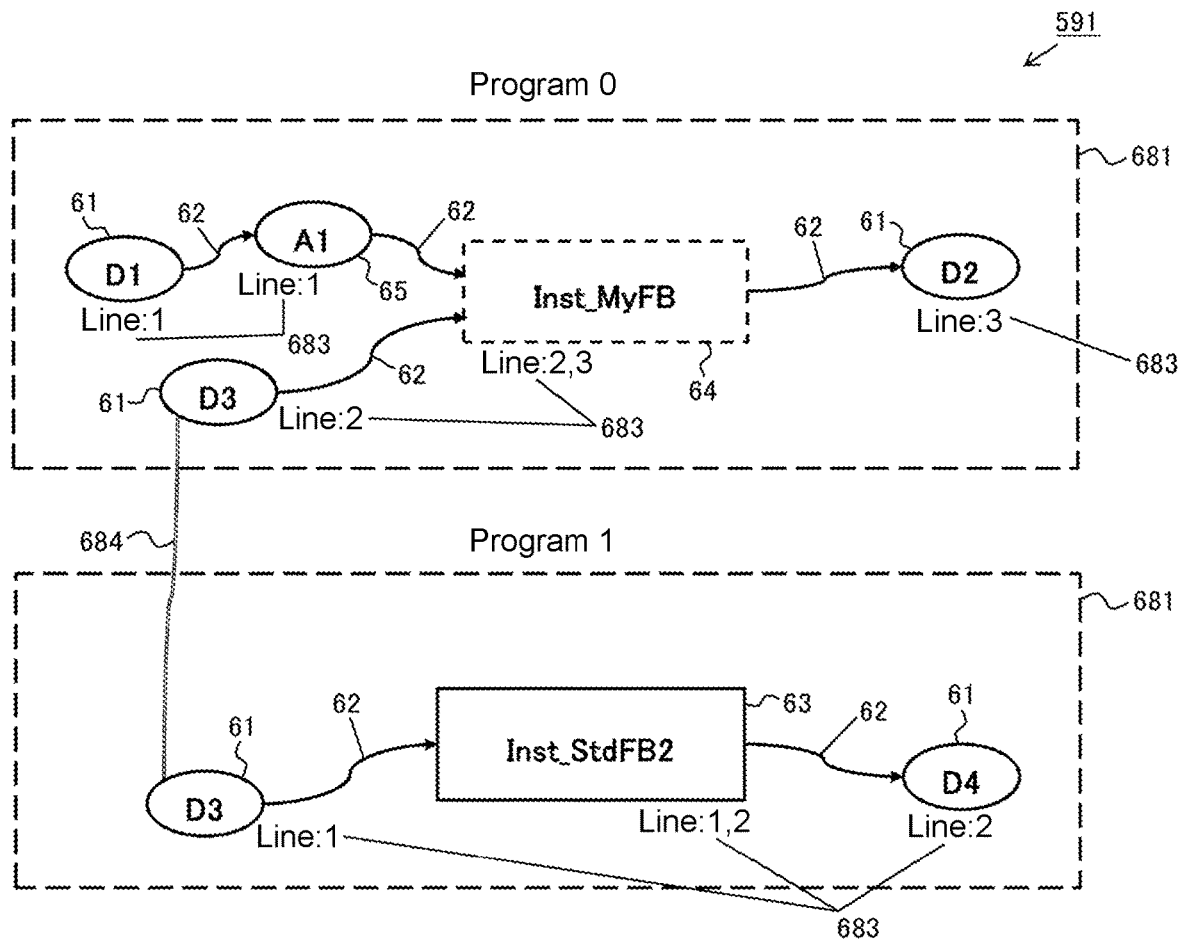
FIG. 20A illustrates an example of a directed graph generated by the analysis device according to the embodiment on the basis of a result of specifying dependency relations for the control program in FIG. 19.

Next, an example of a directed graph in the ninth mode will be described using FIGS. 19 and 20A. FIG. 19 illustrates an example of a control program 221A according to a modification example of the control program 221. FIG. 20A schematically illustrates an example of a directed graph 591 in the ninth mode generated by the analysis device 1 according to the present embodiment on the basis of a result of specifying dependency relations for the control program 221A in FIG. 19. The ninth mode is a mode indicating a correspondence between device variables and subprograms in the control program.

The control program 221A illustrated as an example in FIG. 19 is similar to the control program 221 illustrated as an example in FIG. 7 described above except for the point that the subprogram 2211 is divided into two subprograms (2291 and 2292). In the following description regarding the ninth mode and the tenth mode, it is assumed that the processing in Steps S101 to S109 is executed on the control program 221A illustrated as an example in FIG. 19. Note that the control program illustrated as an example in FIG. 19 is represented with "221A" in a case in which it is referred to in a distinguished manner and is represented with "221" in a case in which it is referred to with no distinction.

The control program 221A illustrated as an example in FIG. 19 is divided into three subprograms 2291 to 2293. In this manner, the control program 221 may be divided into a plurality of subprograms. In this case, the directed graph 591 in the ninth mode includes a plurality of regions 681 respectively corresponding to the subprograms and is generated such that the nodes 61 are arranged in the regions 681 of the subprograms that use the device variables 31 that are being expressed from among the plurality of regions 681.

The control unit 11 specifies the subprograms 2291 to 2293 configuring the control program 221A in Step S108. The method of specifying the subprograms 2291 to 2293 configuring the control program 221A may not be limited, in particular. For example, the control unit 11 may specify the subprograms 2291 to 2293 directly from the control program 221A. Also, information indicating the locations of corresponding program portions is stored in the "PROGRAM" field of each record of the extraction result data 224 obtained as a result of dependency analysis. Therefore, the control unit 11 may specify the subprograms 2291 to 2293 with reference to the value in the "PROGRAM" field of each record of the extraction result data 224.

Next, the control unit 11 sets the regions 681 corresponding to the specified subprograms 2291 to 2293. Then, the control unit 11 specifies the subprograms that use the device variables 31 from the specified subprograms 2291 to 2293. In the control program 221A in FIG. 19, the device variable "D1" is used in the subprogram 2291, for example. Also, the device variable "D3" is used in the two subprograms (2291, 2292), for example. The relation of utilization may be appropriately specified. For example, the control unit 11 can specify the subprograms that use the device variables 31 with reference to the value in the "PROGRAM" field of each record of the extraction result data 224. Then, the control unit 11 arranges each node 61 representing each device variable 31 in the corresponding region 681. In regard to the processing of generating the directed graph 591, the other points may be similar to those in the aforementioned first to eighth modes. In this manner, the control unit 11 can generate the directed graph 591 in the ninth mode.

Note that the directed graph 591 may be generated to include each of the blocks (63, 64) representing an instance of a function similarly to the aforementioned second to eighth modes as illustrated as an example in FIG. 20A. In this case, the control unit 11 specifies the subprogram that uses the function similarly to each device variable 31. Then, the control unit 11 arranges each of the blocks (63, 64) representing the instance of the function in the corresponding region 681.

Similarly, the directed graph 591 may be generated to include the node 65 representing a different variable similarly to the aforementioned fourth mode. In this case, the control unit 11 specifies the subprogram that uses the different variable similarly to the device variables 31. Then, the control unit 11 arranges the node 65 representing the different variable in the corresponding region 681.

Also, in a case in which there is a device variable used by a plurality of subprograms, such as the device variable "D3", the control unit 11 may arrange the node 61 representing the device variable in each region 681. In the example in FIG. 20A, the node 61 representing the device variable "D3" is arranged in each of the regions 681 corresponding to the subprograms "Program0" and "Program1". In this case, the control unit 11 may connect the nodes 61 corresponding to the same device variable with an edge 684 as illustrated as an example in FIG. 20A. In this manner, it is possible to indicate that the nodes 61 connected to the edge 684 correspond to the same device variable. The same also applies to a case in which each of the different variable and the function is used by a plurality of subprograms.

Further, the directed graph 591 may be generated to indicate the location of each device variable 31 that is being expressed in the control program 221A near each node 61 as illustrated in FIG. 20A. Information indicating the location may be appropriately acquired. For example, the information indicating the location may be stored in the "PROGRAM" field of each record of the extraction result data 224. In this case, the control unit 11 can acquire the information indicating the location of each device variable 31 with reference to the "PROGRAM" field of each record of the extraction result data 224. Also, the control unit 11 may acquire the information indicating the location of each device variable 31 directly from the control program 221A. Then, the control unit 11 displays the acquired information indicating the location near the node 61 representing each device variable 31. The control unit 11 may similarly handle other variables and functions. In the example in FIG. 20A, the directed graph 591 may be generated such that each location notation 683 indicating the location of each of the device variables 31 that are being expressed, the different variable, and the function in the control program 221A are arranged near each node 61, the node 65, and each of the blocks (63, 64).

The control unit 11 outputs the thus generated directed graph 591 to the display device 15 in Step S109. According to the directed graph 591, it is possible to indicate the correspondence between each device variable 31 and each of the subprograms 2291 to 2293. Therefore, it is possible to indicate, in an associated manner, the locations of the device variables 31 corresponding to the devices 28 in the control program 221A and the dependency relations among the device variables 31 when the division programming is carried out.

Note that the directed graph 591 illustrated as an example in FIG. 20A is generated to include each of the blocks (63, 64) representing the instance of the function. However, the directed graph 591 in the ninth mode may not be limited to such an example. In the directed graph 591 in the ninth mode, the display of each of the blocks (63, 64) may be omitted similarly to the aforementioned first mode.

Also, the directed graph 591 illustrated as an example in FIG. 20A is generated to include the node 65 representing the different variable similarly to the aforementioned fourth mode. However, the directed graph 591 in the ninth mode may not be limited to such an example. In the directed graph 591 in the ninth mode, the display of the node 65 may be omitted similarly to the aforementioned first mode or the like.

Further, the directed graph 591 illustrated as an example in FIG. 20A is generated to indicate each location notation 683. However, the directed graph 591 in the ninth mode may not be limited to such an example. In the directed graph 591 in the ninth mode, each location notation 683 may be omitted.

(10) Tenth Mode

Figure 20B:
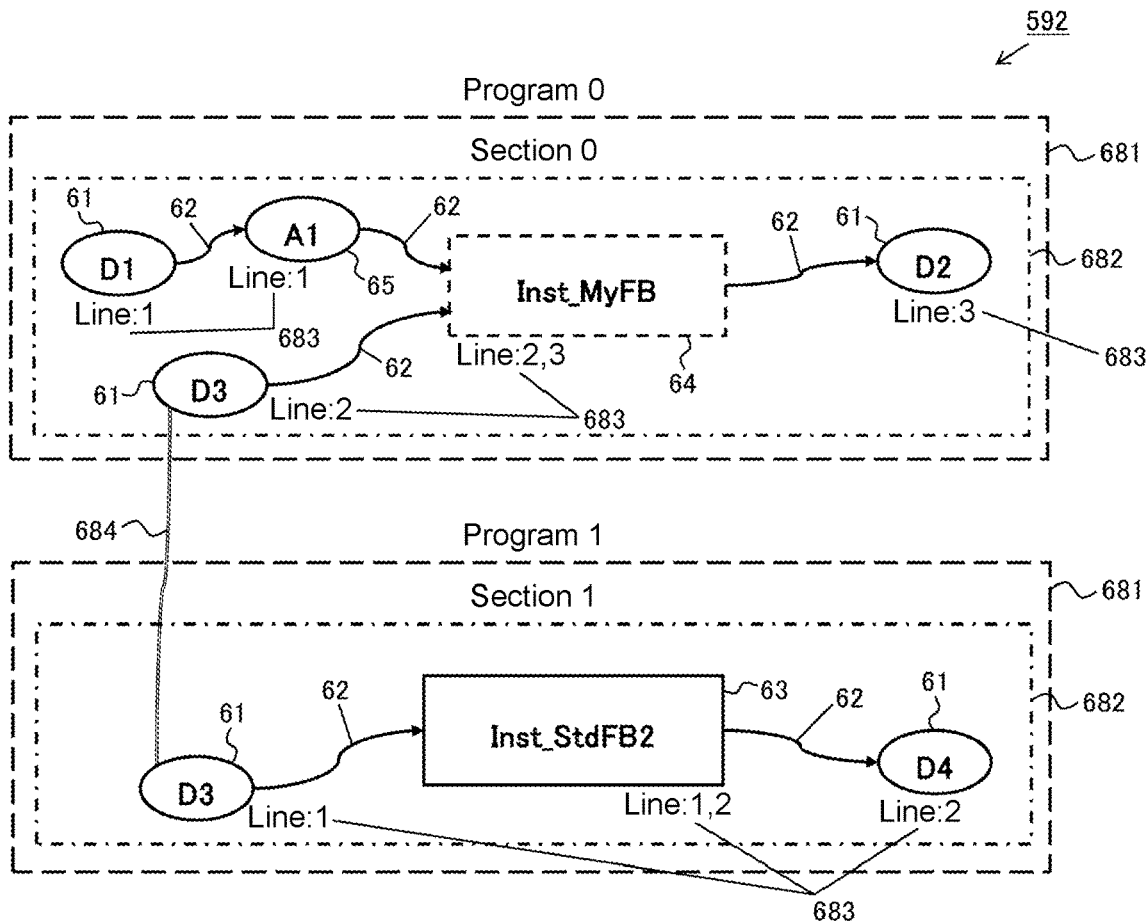
FIG. 20B illustrates an example of a directed graph generated by the analysis device according to the embodiment on the basis of a result of specifying dependency relations for the control program in FIG. 19.

Next, an example of a directed graph in the tenth mode will be described using FIG. 20B. FIG. 20B schematically illustrates an example of a directed graph 592 in the tenth mode generated by the analysis device 1 according to the present embodiment on the basis of a result of specifying dependency relations for the control program 221A in FIG. 19. The tenth mode is a mode indicating a correspondence between each device variable and a section in a subprogram.

In the aforementioned example in FIG. 19, the subprogram 2291 of the control program 221A is divided into a section 2295, and the subprogram 2292 is divided into a section 2296. In this manner, in a case in which the control program 221A is divided into a plurality of subprograms, at least any of the plurality of subprograms may be divided into one or more sections. In this case, the directed graph 592 in the tenth mode is generated such that the region 681 of the subprogram divided into one or more section includes one or more subregions 682 corresponding to the one or more sections and the node 61 representing the device variable 31 used in the section is arranged in the subregion 682 corresponding to the section.

In Step S108, the control unit 11 specifies the sections (2295, 2296) used by the subprograms 2291 to 2293 similarly to the subprograms 2291 to 2293 in the aforementioned ninth mode and sets the subregions 682 corresponding to the sections (2295, 2296) in the corresponding regions 681. Next, the control unit 11 specifies a utilization relation between each section (2295, 2296) and each device variable 31 similarly to the method of specifying the utilization relation between each of the subprograms 2291 to 2293 and each device variable 31 in the aforementioned ninth mode. Then, the control unit 11 arranges each node 61 representing each device variable 31 in the corresponding subregion 682. In regard to the processing of generating the directed graph 592, the other points may be similar to those in the aforementioned ninth mode. In this manner, the control unit 11 can generate the directed graph 592 in the tenth mode.

The control unit 11 output the thus generated directed graph 592 to the display device 15 in Step S109. According to the directed graph 592, it is possible to indicate a correspondence between each device variable 31 and each of the sections (2295, 2296) of each of the subprograms 2291 to 2293. Therefore, it is possible to more clearly indicate the locations of the device variables 31 corresponding to the devices 28 in the control program 221A and the dependency relations among the device variables 31 in an associated manner when the division programming is carried out.

Note that the directed graph 592 illustrated as an example in FIG. 20B is generated to include each of the blocks (63, 64) representing the instance of the function. However, the directed graph 592 in the tenth mode may not be limited to such an example. In the directed graph 592 in the tenth mode, the display of each of the blocks (63, 64) may be omitted similarly to the aforementioned first mode.

Also, the directed graph 592 illustrated as an example in FIG. 20B is generated to include the node 65 representing the different variable similarly to the aforementioned fourth mode. However, the directed graph 592 in the tenth mode may not be limited to such an example. In the directed graph 592 in the tenth mode, the display of the node 65 may be omitted similarly to the aforementioned first mode.

Further, the directed graph 592 illustrated as an example in FIG. 20B is generated to indicate each location notation 683 similarly to the aforementioned ninth mode. However, the directed graph 592 in the tenth mode may not be limited to such an example. In the directed graph 592 in the tenth mode, each location notation 683 may be omitted.

(Display Control)

In Step S109, the control unit 11 outputs any of the directed graphs (51 to 54, 541, 55 to 58, 591, and 592) in the aforementioned first to tenth modes to the display device 15. At this time, the control unit 11 may receive, from the user, designation of a form of a directed graph to be output via the input device 14. Then, the control unit 11 may cause the display device 15 to display the directed graph while switching the form thereof from an arbitrary mode to another mode in response to the designation from the user.

For example, the control unit 11 may cause the display device 15 to switch between displaying the directed graph 51 in the first mode and displaying the directed graph 52 in the second mode in response to an instruction from the user. Also, the control unit 11 may cause the display device 15 to switch between displaying of the directed graph 52 in the second mode and displaying the directed graph 53 in the third mode in response to an instruction from the user. In this case, the control unit 11 generates the directed graphs (52, 53) such that the display form in the second mode and the display form in the third mode can be switched. Further, the control unit 11 may cause the display device 15 to switch among displaying the directed graph 51 in the first mode, the directed graph 52 in the second mode, and the directed graphs (54, 541) in the fourth mode in response to an instruction from the user. Note that in the directed graph 54 in the fourth mode, the display form in the third mode is employed. In the directed graph 541 in the fourth mode, the display form in the second mode is employed. In a case in which the display forms in both the second mode and the third mode are employed in the fourth mode, the control unit 11 may generate the directed graphs (54, 541) in the fourth mode such that the directed graphs (54, 541) can be displayed on the display device 15 with the display forms switched.

Also, the control unit 11 may cause the display device 15 to switch between displaying the directed graph 52 in the second mode and displaying the directed graph 55 in the fifth mode in response to an instruction from the user, for example. In this case, the control unit 11 may cause the display device 15 to display the directed graph 53 in the third mode or the directed graphs (54, 541) in the fourth mode instead of the directed graph 52 in the second mode. In addition, the control unit 11 may cause the display device 15 to switch among displaying the directed graphs 55 to 58 in the fifth to eighth modes in response to an instruction from the user. In this case, the control unit 11 generates the directed graphs 55 to 58 such that the display forms in the fifth to eighth modes can be switched. Note that in this case, any of the sixth to eighth modes may be omitted.

In addition, the control unit 11 may cause the display device 15 to switch between displaying the directed graph 51 in the first mode and displaying the directed graph 591 in the ninth mode in response to an instruction from the user, for example. In this case, the control unit 11 may cause the display device 15 to display any of the directed graphs (52 to 54, 541, and 55 to 58) in the second to eighth modes instead of the directed graph 51 in the first mode. In addition, the control unit 11 may causes the display device 15 to switch between displaying the directed graph 591 in the ninth mode and displaying the directed graph 592 in the tenth mode in response to an instruction from the user. In this case, the control unit 11 generates the directed graphs (591, 592) such that the display form in the ninth mode and the display form in the tenth mode can be switched.

In a case in which an arbitrary mode is changed to another mode, the control unit 11 may switch the display of the entire directed graph. Alternatively, the control unit 11 may switch display of a part of the directed graph. In this case, the control unit 11 may receive designation of a portion of the directed graph for which the mode is to be changed and switch display at the designated portion. In one example, the control unit 11 may receive selection of the edge 62 as the designation of the portion for which the mode is to be changed when the directed graph 51 in the first mode is displayed on the display device 15. Then, the control unit 11 may switch the display of the directed graph such that a dependency relation between two device variables connected with the selected edge 62 is indicated in the second mode.

Note that in the aforementioned second to tenth modes, "connection via edges" may include directly connecting the nodes representing variables and functions with dependency relations to the blocks with the edges. In addition, in the aforementioned second to tenth modes, "connection via edges" may include a case in which a different variable or/and a function is interposed, nodes and blocks respectively representing variables and functions that have dependency relations in an indirect manner are connected with the edges with the nodes representing the different variable or/and the function or/and the block interposed therebetween.

Also, in a case in which a plurality of nodes representing variables of different types such as the nodes (61, 65, 67, 634, 635, 644, and 645) as in the aforementioned fourth to sixth modes are displayed, the control unit 11 may indicate the nodes in different forms similarly to the aforementioned blocks for the functions. For example, the control unit 11 may indicate the nodes in different forms in accordance with differences in type, which is any of a difference between a device variable and a different variable, a difference between an outer variable and an inner variable, and a difference between a local variable and a global variable. The form of each node may be defined using an attribute such as a type, a color, or a shape of the line or a letter font, for example. Also, a symbol corresponding to each node may be defined, and each defined symbol may be used to display each node.

If any of the directed graphs (51 to 54, 541, 55 to 58, 591, and 592) in the aforementioned first to tenth modes is output to the display device 15 in this manner, then the control unit 11 ends the processing according to the operation example.

[Features]

As described above, the analysis device 1 according to the present embodiment specifies the dependency relation between the input parameter 43 and the output parameter 44 of the standard function 41 with reference to the function structure information 121 in Step S106 (Step S508) described above. In this manner, the analysis device 1 according to the present embodiment can specify the dependency relations among the plurality of device variables 31 with the standard function 41 interposed therebetween in Step S107 (Step S509) described above. Therefore, according to the present embodiment, it is possible to appropriately derive the dependency relations among the plurality of devices 28 configuring the production line 27 from the control program 221 even in a case in which the control program 221 includes the standard function 41.

In addition, in Step S109, the analysis device 1 according to the present embodiment can cause the display device 15 to switch among displaying the directed graphs (51 to 54, 541, 55 to 58, 591, and 592) in the modes in response to an instruction from the user. For example, the analysis device 1 can cause the display device 15 to switch between displaying any of the directed graphs (52 to 54 and 541) in the second to fourth modes and displaying the directed graphs 55 to 58 in the fifth to eighth modes. In this manner, it is possible to appropriately ascertain the dependency relations among the device variables 31 via the functions in the control program 221.

§ 4 Modification Examples

Although the embodiment of the present invention has been described above in detail, the above description is merely illustration of the present invention in any senses. It is a matter of course that various improvements and modifications can be made without departing from the scope of the present invention. For example, the following changes can be made. Note that similar reference signs will be used for components similar to those in the aforementioned embodiment, and description of points similar to those in the aforementioned embodiment will be appropriately omitted in the following description. The following modification examples can be appropriately combined.

<4.1>

In the aforementioned embodiment, the control unit 11 generates the directed graphs (51 to 54, 541, 55 to 58, 591, and 592) in the first to tenth modes in Step S108. However, the directed graphs that can be generated by the control unit 11 may not be limited to such an example. For example, at least any of the first to tenth modes may be omitted. Also, the control unit 11 may generate directed graphs in the form that is different from the first to tenth modes, for example.

In the aforementioned embodiment, the control unit 11 outputs the directed graphs (51 to 54, 541, 55 to 58, 591, and 592) as information related to the result of specifying the dependency relations among the device variables 31 in Step S109. However, the form of the information related to the result of specifying the dependency relations among the device variables 31 may not be limited to such directed graphs and may be appropriately selected in accordance with an embodiment. For example, the control unit 11 may indicate the result of specifying the dependency relations among the device variables 31 using a non-directed graphs or using expression other than graphs (for example, letter expression).

Also, in the aforementioned embodiment, the control unit 11 outputs, to the display device 15, the information related to the result of specifying the dependency relations among the device variables 31. However, the output destination of the information may not be limited to such an example and may be appropriately selected in accordance with an embodiment. For example, the control unit 11 may output the information related to the result of specifying the dependency relations among the device variables 31 to another display device that is different from the display device 15 or to an output destination other than the display device (for example, a memory or an output device other than the display device).

<4.2>

In the aforementioned embodiment, the analysis device 1 determines whether or not instances of undefined standard functions are included in the control program 221 in Step S103. Then, in a case in which it is determined that instances of undefined standard functions are included in the control program 221, the analysis device 1 receives an input of the additional function structure information 123 in Step S105. The processing in Steps S103 to S105 may be omitted. In this case, the definition determination unit 113 and the definition receiving unit 114 may be omitted from the software configuration of the analysis device 1.

<4.3>

In the aforementioned embodiment, the analysis device 1 specifies the dependency relations among the device variables 31 from the control program 221 through the processing in Steps S101 to S107. Then, the analysis device 1 generates the directed graphs indicating the specification result and outputs the generated directed graphs to the display device 15 through the processing in Steps S108 and S109. In other words, the analysis device 1 is configured to execute both the processing of specifying the dependency relations and the processing of outputting the specification result. However, the processing may not necessarily be executed by the same computer. In other words, the processing of specifying the dependency relation and the processing of outputting the specification result may be executed by different computers. In this case, the computer that executes the processing of outputting the specification result may be referred to as a "graph display device".

(Hardware Configuration)

Figure 21:
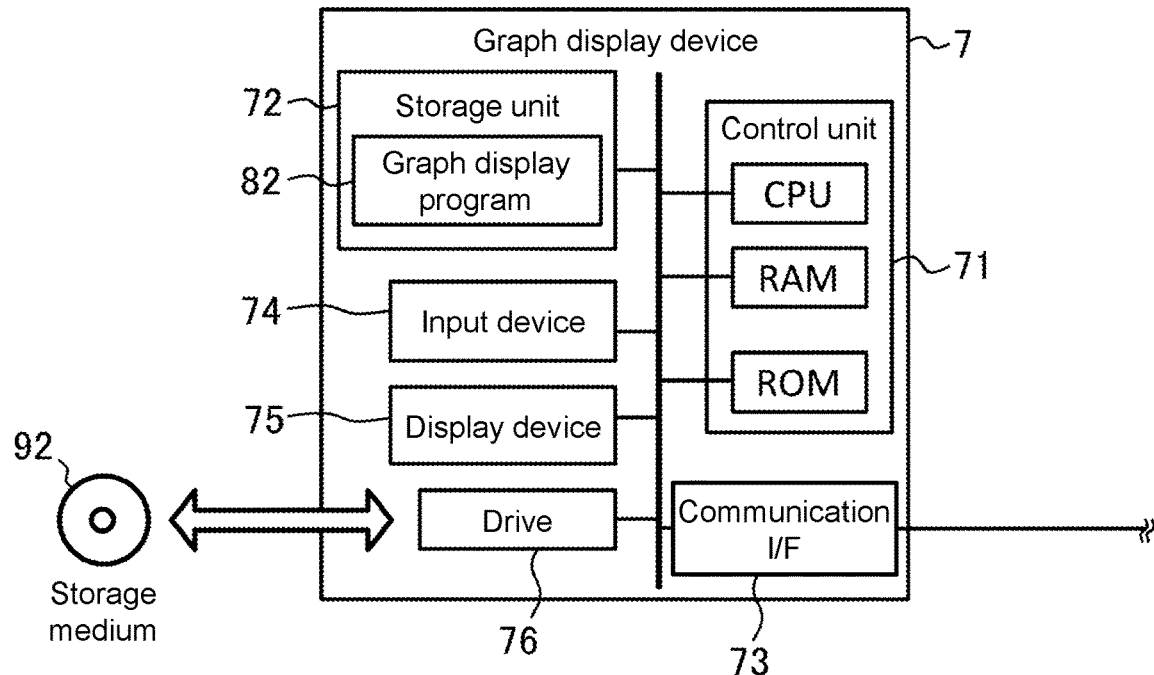
FIG. 21 illustrates an example of a hardware configuration of a graph display device according to a modification example.

FIG. 21 schematically illustrates an example of a hardware configuration of a graph display device 7 according to the modification example. As illustrated in FIG. 21, the graph display device 7 according to the modification example is a computer in which a control unit 71, a storage unit 72, a communication interface 73, an input device 74, a display device 75, and a drive 76 are electrically connected to each other. Note that the communication interface is described as "communication I/F" in FIG. 21.

The control unit 71 to the drive 76 in the graph display device 7 may be similar to the control unit 11 to the drive 16 in the aforementioned analysis device 1, respectively. In the modification example, the storage unit 72 stores various kinds of information such as the graph display program 82. The graph display program 82 is a program for causing the graph display device 7 to execute information processing (in FIG. 23, which will be described later) of generating the directed graphs indicating the result of specifying causal relations among the device variables 31 and outputting the generated directed graphs to the display device (the display device 75, for example). The graph display program 82 includes a series of commands for the information processing. The graph display program 82 may be stored in the storage medium 92. Also, the graph display device 7 may acquire the graph display program 82 from the storage medium 92 via the drive 76.

Note that similarly to the aforementioned analysis device 1, it is possible to appropriately omit, replace, and add components in regard to the specific hardware configuration of the graph display device 7 in accordance with an embodiment. The graph display device 7 may be configured with a plurality of computers. In this case, the hardware configurations of the computers may or may not conform to each other. Also, the graph display device 7 may be a general-purpose information processing device such as a desktop PC or a tablet PC, a general-purpose server device, or the like as well as an information processing device designed to be dedicated for services to be provided.

(Software Configuration)

Figure 22:
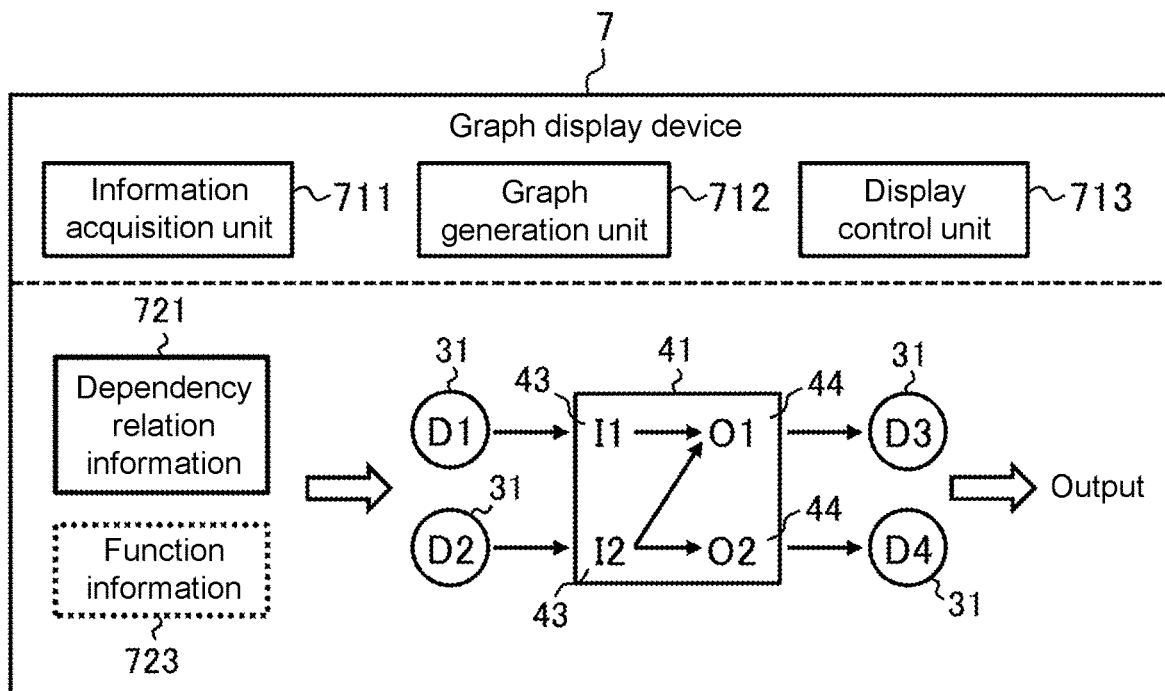
FIG. 22 illustrates an example of a software configuration of the graph display device according to the modification example.

FIG. 22 schematically illustrates an example of a software configuration of the graph display device 7 according to the modification example. The control unit 71 of the graph display device 7 develops, in a RAM, the graph display program 82 stored in the storage unit 72. Then, the control unit 71 controls each component by a CPU interpreting and executing the graph display program 82 developed in the RAM. In this manner, the graph display device 7 according to the present embodiment operates as a computer including, as software modules, an information acquisition unit 711, a graph generation unit 712, and a display control unit 713 as illustrated in FIG. 22. In other words, each software module in the graph display device 7 is realized by the control unit 71 (CPU) in the modification example.

The information acquisition unit 711 acquires dependency relation information 721 indicating dependency relations among the device variables 31 specified from the control program 221. The information acquisition unit 711 may further acquire function information 723 indicating dependency relations between input parameters and output parameters of functions. The dependency relation information 721 and the function information 723 may be configured with the function structure information 121, the additional function structure information 123, the extraction result data 224, the intermediate data 226, the specification result data 227, and the like as described above. The graph generation unit 712 generates directed graphs in the modes described above on the basis of the dependency relation information 721 (and the function information 723). The graph generation unit 712 may be similar to the aforementioned graph generation unit 117. The display control unit 713 may cause a display device (for example, the display device 75) to switch among displaying the generated directed graphs in the modes. The display control unit 713 may be similar to the aforementioned output unit 118.

Each software module in the graph display device 7 will be described in detail in an operation example, which will be described later. Note that in the present embodiment, an example in which all the software modules in the graph display device 7 are realized by a general-purpose CPU has been described. However, some or all of the aforementioned software modules may be realized by one or a plurality of dedicated hardware processors. Also, software modules may be appropriately omitted replaced, and added in regard to the software configuration of the graph display device 7 in accordance with an embodiment.

Operation Example

Figure 23:
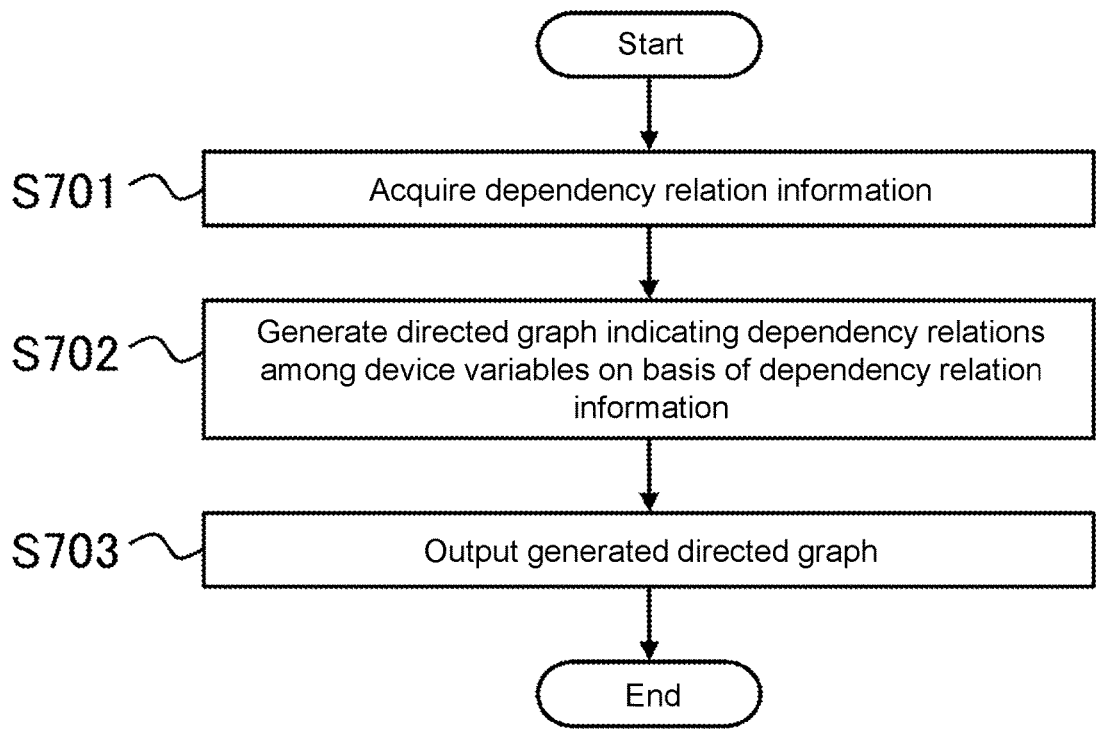
FIG. 23 illustrates an example of a processing procedure performed by the graph display device according to the modification example.

FIG. 23 illustrates an example of a processing procedure of the graph display device 7 according to the modification example. The processing procedure of the graph display device 7 described below is an example of the "graph display method" according to the present invention. However, the processing procedure described below is merely an example, and each process may be changed as long as possible. Also, it is possible to appropriately omit, replace, and add steps in regard to the processing procedure described below in accordance with an embodiment.

In Step S701, the control unit 71 operates as the information acquisition unit 711 and acquires the dependency relation information 721. The dependency relation information 721 indicates dependency relations among the device variables 31 specified by the control program 221. The dependency relation information 721 may be configured to include the aforementioned specification result data 227, for example. Also, in a case in which a directed graph including blocks representing functions in the aforementioned second mode or the like is generated, the dependency relation information 721 may further indicate dependency relation of the device variables 31 with respect to the parameters of the functions. In this case, the dependency relation information 721 may be configured to further include the extraction result data 224 and the intermediate data 226. Also, in a case in which a directed graph indicating locations of the device variables 31 in the control program 221, such as subprograms or sections, as in the aforementioned ninth mode and the tenth mode is generated, the dependency relation information 721 may be configured to include information indicating locations such as the "PROGRAM" field of each record of the extraction result data 224. However, the configuration of the dependency relation information 721 may not be limited to such an example. Also, the data form of the dependency relation information 721 may not be limited, in particular, and may be appropriately set in accordance with an embodiment.

In addition, in a case in which a directed graph indicating internal structure of functions as in the aforementioned fifth to eighth modes is generated, the control unit 71 may further acquire the function information 723. The function information 723 may be configured with records related to user defined functions in the function structure information 121, the additional function structure information 123, and the extraction result data 224, data indicating a result of specifying dependency relations for parameters of the user defined functions, and the like. However, the configuration of the function information 723 may not be limited to such an example. Also, the data form of the function information 723 may not be limited, in particular, and may be appropriately set in accordance with an embodiment.

The dependency relation information 721 and the function information 723 may be generated by a different information processing device configured to specify the dependency relations among the device variables 31, such as the analysis device 1 described above. The control unit 71 may acquire the dependency relation information 721 and the function information 723 from the different information processing device via a network or a storage medium 92, for example. Also, the dependency relation information 721 and the function information 723 may be stored in an external storage device such as a network attached storage (NAS). In this case, the control unit 71 may acquire the dependency relation information 721 and the function information 723 from the external storage device. Also, the dependency relation information 721 and the function information 723 may be stored in the storage unit 72 in advance. In this case, the control unit 71 may acquire the dependency relation information 721 and the function information 723 from the storage unit 72. The method of acquiring the dependency relation information 721 and the function information 723 may not be limited, in particular, and may be appropriately selected in accordance with an embodiment. If the dependency relation information 721 (and the function information 723) is acquired, then the control unit 71 causes the processing to proceed to next Step S702.

In Step S702, the control unit 71 generates the directed graphs (51 to 54, 541, 55 to 58, 591, and 592) in the aforementioned modes on the basis of the dependency relation information 721 (and the function information 723). The processing in Step S702 may be similar to the aforementioned processing in Step S108. In Step S703, the control unit 71 causes the display device to switch among displaying the generated directed graphs (51 to 54, 541, 55 to 58, 591, and 592) in the modes. The output destination may be the display device 75 or may be another display device (a display device of a different information processing device, for example). The processing in Step S703 may be similar to the aforementioned processing in Step S109. If the output processing is completed, then the control unit 71 ends the processing according to the modification example. According to the modification example, it is possible to separately configure a computer that executes the processing of specifying the dependency relations among the device variables 31 and a computer that executes the processing of outputting the specification result.

<4.4>

In the aforementioned embodiment, the analysis device 1 and the PLC 2 are configured with separate computers. However, the system configuration to which the present invention can be applied may not be limited to such an example. The analysis device 1 and the PLC 2 may be configured with an integrated computer.

Figure 24:
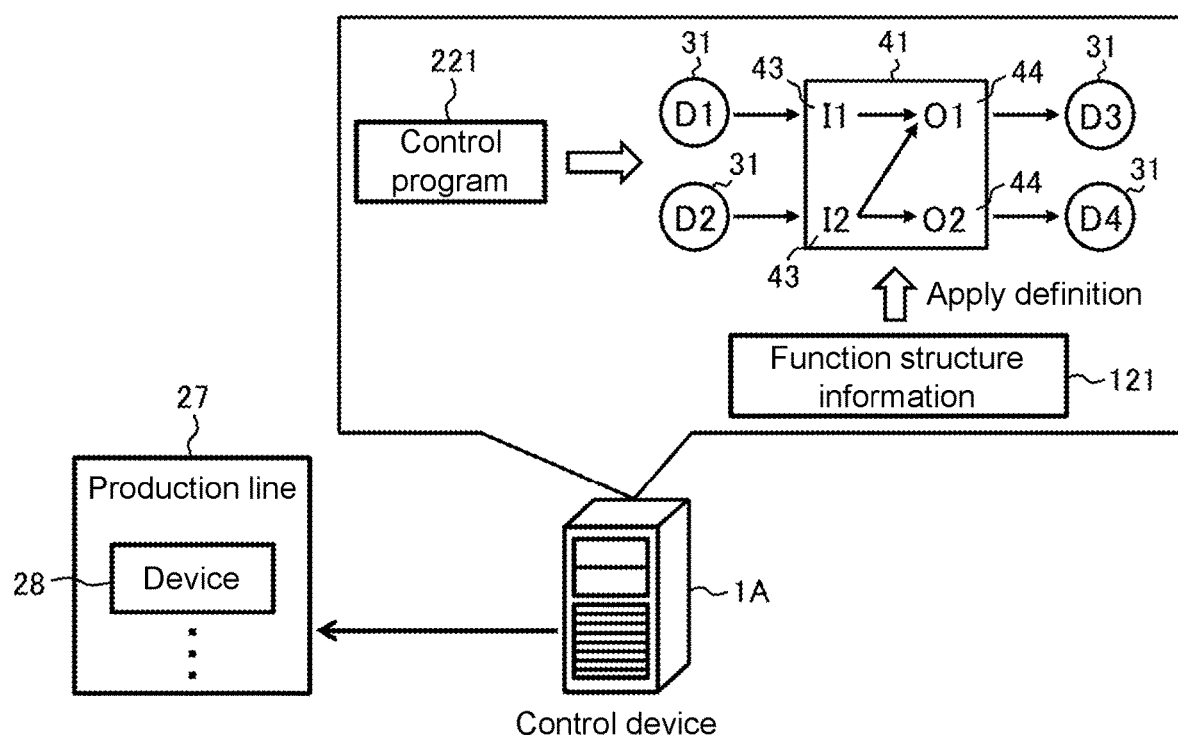
FIG. 24 schematically illustrates an example of another situation to which the present invention is applied.

FIG. 24 schematically illustrates an application situation of a control device 1A according to the modification example. The control device 1A according to the modification example is a computer configured to serve both as the analysis device 1 according to the aforementioned embodiment and as the PLC 2. The hardware configuration of the control device 1A may be obtained by adding the input/output interface 23 of the PLC 2 to the aforementioned hardware configuration of the analysis device 1. Also, in regard to the processing of specifying the dependency relations among the devices 28, the software configuration of the control device 1A may be similar to the software configuration of the analysis device 1. In this manner, the present invention may be applied to the device (PLC or the like) that controls operations in the production line 27.

The invention claimed is:

1. A graph display device comprising:
a processor configured to:
acquire dependency relation information indicating dependency relations among a plurality of device variables and dependency relations of the device variables with respect to an input parameter and an output parameter of a function and function information indicating a dependency relation between the input parameter and the output parameter of the function specified in a control program, the control program including a plurality of commands for controlling operations of a plurality of devices included in a production line, the plurality of commands including the function and a plurality of variables, and the plurality of variables comprising the plurality of device variables respectively corresponding to the devices;
generate a first directed graph, which comprises a plurality of first nodes respectively representing the device variables, edges representing existence of the dependency relations, and a block that represents the function and is connected to a first node representing a device variable with a dependency relation with respect to an input parameter or an output parameter of the function to be expressed via the edges, and a second directed graph, which comprises the plurality of first nodes, the edges, the block, and a plurality of second nodes that are arranged in the block and respectively represent the input parameter and the output parameter of the function to be expressed, on the basis of the acquired dependency relation information and the function information, the second nodes being connected to the first nodes representing device variables with dependency relations with the input parameter and the output parameter to be expressed via the edges, and the second nodes representing an input parameter and an output parameter that mutually have a dependency relation in the function to be expressed being connected to each other via the edges; and
cause a display device to switch between displaying the generated first directed graph and displaying the generated second directed graph in response to an instruction from a user.

2. The graph display device according to claim 1,
wherein the plurality of commands comprise a plurality of functions,
the plurality of functions comprise a standard function prepared as a standard and a user defined function that is different from the standard function and is defined by the user in the control program, and
each of the first directed graph and the second directed graph is generated by indicating a first block representing the standard function from among the plurality of functions in a first form and indicating a second block representing the user defined function in a second form different from the first form from among the plurality of blocks.

3. The graph display device according to claim 2,
wherein the plurality of variables includes a local variable that is different from each of the device variables and is used between an input parameter and an output parameter that mutually have a dependency relation within the user defined function, and
the processor generates the second directed graph by switching between displaying in a first display form indicating the plurality of second nodes in the second block and displaying in a second display form further indicating a third node that represents the local variable, that is arranged between the second nodes respectively representing the input parameter and the output parameter that mutually have the dependency relation in the second block that represents the user defined function, and that is connected to each of second nodes via the edges.

4. The graph display device according to claim 3,
wherein the plurality of functions comprise a standard function used between an input parameter and an output parameter that mutually have a dependency relation within the user defined function, and
the processor generates the second directed graph by switching between displaying in a first display form indicating the plurality of second nodes in the second block and displaying in a third display form further indicating a first block representing the standard function used within the user defined function by arranging the first block between the second nodes respectively representing the input parameter and the output parameter that mutually have the dependency relation in the second block representing the user defined function and by connecting the first block to each of the second nodes via the edges.

5. The graph display device according to claim 4,
wherein the plurality of functions further comprise an another user defined function used between an input parameter and an output parameter that mutually have a dependency relation within the user defined function, and
the processor generates the second directed graph by switching between displaying in a first display form indicating the plurality of second nodes in the second block and displaying in a fourth display form further indicating an another second block representing the different user defined function used within the user defined function by arranging the another second block between the second nodes respectively representing the input parameter and the output parameter that mutually have the dependency relation in the second block representing the user defined function and by connecting the another second block to each of the second nodes via the edges.

6. The graph display device according to claim 3,
wherein the plurality of functions further comprise an another user defined function used between an input parameter and an output parameter that mutually have a dependency relation within the user defined function, and
the processor generates the second directed graph by switching between displaying in a first display form indicating the plurality of second nodes in the second block and displaying in a fourth display form further indicating an another second block representing the different user defined function used within the user defined function by arranging the another second block between the second nodes respectively representing the input parameter and the output parameter that mutually have the dependency relation in the second block representing the user defined function and by connecting the another second block to each of the second nodes via the edges.

7. The graph display device according to claim 2,
wherein the plurality of functions comprise a standard function used between an input parameter and an output parameter that mutually have a dependency relation within the user defined function, and
the processor generates the second directed graph by switching between displaying in a first display form indicating the plurality of second nodes in the second block and displaying in a third display form further indicating a first block representing the standard function used within the user defined function by arranging the first block between the second nodes respectively representing the input parameter and the output parameter that mutually have the dependency relation in the second block representing the user defined function and by connecting the first block to each of the second nodes via the edges.

8. The graph display device according to claim 7,
wherein the plurality of functions further comprise an another user defined function used between an input parameter and an output parameter that mutually have a dependency relation within the user defined function, and
the processor generates the second directed graph by switching between displaying in a first display form indicating the plurality of second nodes in the second block and displaying in a fourth display form further indicating an another second block representing the different user defined function used within the user defined function by arranging the another second block between the second nodes respectively representing the input parameter and the output parameter that mutually have the dependency relation in the second block representing the user defined function and by connecting the another second block to each of the second nodes via the edges.

9. The graph display device according to claim 2,
wherein the plurality of functions further comprise an another user defined function used between an input parameter and an output parameter that mutually have a dependency relation within the user defined function, and
the processor generates the second directed graph by switching between displaying in a first display form indicating the plurality of second nodes in the second block and displaying in a fourth display form further indicating an another second block representing the different user defined function used within the user defined function by arranging the another second block between the second nodes respectively representing the input parameter and the output parameter that mutually have the dependency relation in the second block representing the user defined function and by connecting the another second block to each of the second nodes via the edges.

10. A graph display method that causes a computer to execute:
acquiring dependency relation information indicating dependency relations among a plurality of device variables and dependency relations of the device variables with respect to an input parameter and an output parameter of a function and function information indicating a dependency relation between the input parameter and the output parameter of the function specified in a control program, the control program including a plurality of commands for controlling operations of a plurality of devices included in a production line, the plurality of commands including the function and a plurality of variables, and the plurality of variable s comprising the plurality of device variables respectively corresponding to the devices;
generating a first directed graph, which comprises a plurality of first nodes respectively representing the device variables, edges representing existence of the dependency relations, and a block that represents the function and that is connected to a first node representing a device variable with a dependency relation with respect to an input parameter or an output parameter of the function to be expressed via the edges, and a second directed graph, which comprises the plurality of first nodes, the edges, the block, and a plurality of second nodes that are arranged in the block and respectively represent the input parameter and the output parameter of the function to be expressed, on the basis of the acquired dependency relation information and the function information, the second nodes being connected to the first nodes representing device variables with dependency relations with the input parameter and the output parameter to be expressed via the edges, and the second nodes representing an input parameter and an output parameter that mutually have a dependency relation in the function to be expressed being connected to each other via the edges; and
causing a display device to switch between displaying the generated first directed graph and displaying the generated second directed graph in response to an instruction from a user.

11. A non-transitory computer readable recording medium storing a graph display program that causes a computer to execute:
acquiring dependency relation information indicating dependency relations among a plurality of device variables and dependency relations of the device variables with respect to an input parameter and an output parameter of a function and function information indicating a dependency relation between the input parameter and the output parameter of the function specified in a control program, the control program including a plurality of commands for controlling operations of a plurality of devices included in a production line, the plurality of commands including the function and a plurality of variables, and the plurality of variables comprising the plurality of device variables respectively corresponding to the devices;
generating a first directed graph, which comprises a plurality of first nodes respectively representing the device variables, edges representing existence of the dependency relations, and a block that represents the function and is connected to a first node representing a device variable with a dependency relation with respect to an input parameter or an output parameter of the function to be expressed via the edges and a second directed graph, which comprises the plurality of first nodes, the edges, the block, and a plurality of second nodes that are arranged in the block and respectively represent the input parameter and the output parameter of the function to be expressed, on the basis of the acquired dependency relation information and the function information, the second nodes being connected to the first nodes representing device variables with dependency relations with the input parameter and the output parameter to be expressed via the edges, and the second nodes representing an input parameter and an output parameter that mutually have a dependency relation in the function to be expressed being connected to each other via the edges; and causing a display device to switch between displaying the generated first directed graph and displaying the generated second directed graph in response to an instruction from a user.

* * * * *